US012574370B2

(12) United States Patent
Cronkright et al.

(10) Patent No.: US 12,574,370 B2
(45) Date of Patent: *Mar. 10, 2026

(54) VERIFYING PARTY IDENTITIES FOR SECURE TRANSACTIONS

(71) Applicant: CertifID, Inc., Grand Rapids, MI (US)

(72) Inventors: Thomas W. Cronkright, Rockford, MI (US); Lawrence R. Duthler, Wyoming, MI (US); Tyler H. Adams, Austin, TX (US)

(73) Assignee: CertifID, Inc., Grand Rapids, MI (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/592,703

(22) Filed: Mar. 1, 2024

(65) Prior Publication Data

US 2024/0205218 A1      Jun. 20, 2024

Related U.S. Application Data

(63) Continuation-in-part of application No. 17/151,591, filed on Jan. 18, 2021, now Pat. No. 11,936,644,
(Continued)

(51) Int. Cl.
*H04L 9/40*      (2022.01)
*G06F 16/951*      (2019.01)
(Continued)

(52) U.S. Cl.
CPC ........ *H04L 63/0838* (2013.01); *G06F 16/951* (2019.01); *H04L 9/0637* (2013.01);
(Continued)

(58) Field of Classification Search
None
See application file for complete search history.

(56) References Cited

U.S. PATENT DOCUMENTS 6,745,196  B1 *  6/2004  Colyer ................... G06Q 10/10
                                                        707/703
8,490,162  B1 *  7/2013  Popoveniuc .......... H04L 63/102
                                                        726/19

(Continued)

*Primary Examiner* — Kambiz Zand
*Assistant Examiner* — Mahabub S Ahmed
(74) *Attorney, Agent, or Firm* — Honigman LLP; Brett A. Krueger

(57)      ABSTRACT

A method for verifying identities of parties to a transaction includes receiving a login attempt from a mobile communication device, the login attempt including a security credential. The method determines that the security credential of the login attempt from the mobile communication device is authentic. The method communicates a one-time access code to the mobile communication device. The method receives a one-time entry code and mobile communication device information from the mobile communication device. The method determines that the one-time entry code and the mobile communication device information from the mobile communication device satisfies the communicated one-time access code and predetermined user mobile communication device information. The method provides by the mobile communication device access to a secure transaction environment.

20 Claims, 64 Drawing Sheets

Related U.S. Application Data which is a continuation of application No. 15/872,656, filed on Jan. 16, 2018, now Pat. No. 10,911,441.

(60) Provisional application No. 62/515,851, filed on Jun. 6, 2017, provisional application No. 62/447,791, filed on Jan. 18, 2017.

(51) Int. Cl.
    *H04L 9/06*         (2006.01)
    *H04L 9/32*         (2006.01)

(52) U.S. Cl.
    CPC .......... *H04L 9/3228* (2013.01); *H04L 63/083* (2013.01); *H04L 63/18* (2013.01); *H04L 2463/102* (2013.01)

(56) References Cited

U.S. PATENT DOCUMENTS

| | | | |
|---|---|---|---|
| 8,640,213 B2 * | 1/2014 | Najafi | G06F 21/31 |
| | | | 709/248 |
| 8,739,260 B1 | 5/2014 | Damm-Goossens | |
| 8,914,842 B2 * | 12/2014 | Mani | G06F 21/6218 |
| | | | 713/160 |
| 9,230,084 B2 | 1/2016 | Robertson | |
| 9,391,982 B1 | 7/2016 | Stead et al. | |
| 9,407,633 B2 * | 8/2016 | Gill | H04L 63/0838 |
| 9,503,453 B2 | 11/2016 | Song et al. | |
| 9,529,987 B2 | 12/2016 | Deutschmann et al. | |
| 9,569,771 B2 | 2/2017 | Lesavich et al. | |
| 9,648,015 B1 * | 5/2017 | Avetisov | H04L 9/3231 |
| 9,660,974 B2 * | 5/2017 | Grajek | H04L 67/563 |
| 10,063,549 B1 * | 8/2018 | Dotan | H04L 63/0838 |
| 10,110,578 B1 * | 10/2018 | Baer | H04W 12/068 |
| 10,158,628 B2 | 12/2018 | Votaw et al. | |
| 10,164,973 B1 * | 12/2018 | Prasad | H04W 4/80 |
| 10,219,154 B1 * | 2/2019 | Hallock | H04L 63/0876 |
| 10,231,128 B1 * | 3/2019 | Ziraknejad | H04W 12/08 |
| 10,291,607 B1 * | 5/2019 | Cifelli | H04L 67/55 |
| 10,313,881 B2 * | 6/2019 | Liu | G06F 21/31 |
| 10,395,223 B2 * | 8/2019 | Muthu | G06Q 20/405 |
| 10,536,436 B1 * | 1/2020 | Barbour | H04L 63/0838 |
| 10,567,385 B2 * | 2/2020 | Quach | H04L 63/08 |
| 10,630,682 B1 * | 4/2020 | Bhattacharyya | H04L 63/0869 |
| 10,679,215 B2 * | 6/2020 | Kurian | G06Q 20/3821 |
| 10,949,841 B2 * | 3/2021 | Wagner | G06Q 20/38215 |
| 2004/0097217 A1 * | 5/2004 | McClain | H04L 63/083 |
| | | | 455/410 |
| 2005/0063357 A1 * | 3/2005 | Wewalaarachchi | |
| | | | H04L 61/2539 |
| | | | 370/352 |

| | | | |
|---|---|---|---|
| 2006/0095290 A1 * | 5/2006 | Chernev | G07F 17/32 |
| | | | 705/44 |
| 2006/0206709 A1 * | 9/2006 | Labrou | G06Q 20/18 |
| | | | 713/167 |
| 2007/0255662 A1 * | 11/2007 | Tumminaro | G06Q 20/10 |
| | | | 705/79 |
| 2011/0145899 A1 * | 6/2011 | Cao | H04L 9/3226 |
| | | | 726/7 |
| 2012/0324242 A1 * | 12/2012 | Kirsch | G06Q 20/384 |
| | | | 713/189 |
| 2013/0060708 A1 * | 3/2013 | Oskolkov | G06Q 20/10 |
| | | | 705/42 |
| 2013/0198516 A1 * | 8/2013 | Fenton | H04L 9/3263 |
| | | | 713/168 |
| 2013/0238492 A1 * | 9/2013 | Muthu | G06Q 20/405 |
| | | | 705/39 |
| 2013/0263211 A1 * | 10/2013 | Neuman | H04L 63/083 |
| | | | 726/1 |
| 2014/0123263 A1 * | 5/2014 | Thun | H04L 63/0853 |
| | | | 726/5 |
| 2014/0149742 A1 * | 5/2014 | Yau | H04L 63/0807 |
| | | | 713/159 |
| 2014/0165171 A1 * | 6/2014 | Meng | G06F 21/31 |
| | | | 726/7 |
| 2014/0189808 A1 * | 7/2014 | Mahaffey | G06F 21/6245 |
| | | | 726/4 |
| 2014/0207672 A1 * | 7/2014 | Kelley | G06Q 20/3223 |
| | | | 705/42 |
| 2014/0317713 A1 * | 10/2014 | Gadotti | G06F 21/36 |
| | | | 726/7 |
| 2015/0026062 A1 * | 1/2015 | Paulsen | G06Q 20/29 |
| | | | 705/44 |
| 2015/0154961 A1 | 6/2015 | Warford et al. | |
| 2015/0188858 A1 * | 7/2015 | Nagata | H04L 67/10 |
| | | | 715/758 |
| 2015/0295930 A1 * | 10/2015 | Dixon | H04L 63/0807 |
| | | | 713/181 |
| 2015/0304110 A1 * | 10/2015 | Oberheide | H04L 9/3215 |
| | | | 713/155 |
| 2016/0140550 A1 * | 5/2016 | Keys | H04L 63/18 |
| | | | 726/9 |
| 2017/0041309 A1 | 2/2017 | Ekambaram et al. | |
| 2017/0171195 A1 * | 6/2017 | Chang | G06F 21/32 |
| 2017/0230495 A1 * | 8/2017 | Gupta | H04M 1/2748 |
| 2017/0270517 A1 * | 9/2017 | Vasu | G06Q 20/4018 |
| 2017/0331896 A1 * | 11/2017 | Holloway | H04L 67/04 |
| 2018/0232514 A1 * | 8/2018 | Brown | H04L 63/107 |
| 2018/0308101 A1 * | 10/2018 | Valencia | G06F 21/32 |
| 2019/0392427 A1 * | 12/2019 | Wilson | G06Q 20/20 |
| 2020/0175488 A1 * | 6/2020 | Kulpati | G06Q 20/386 |
| 2021/0200899 A1 * | 7/2021 | Brannon | G06F 21/6245 |

* cited by examiner

FIG. 6A

| USER COMPUTER | ST SERVER(S) |
|---|---|

602
User Controls Device to Access SWP Hosted by ST Server(s)

604
Control SWP to Display User Registration GUI

608
Create User Account and Store Email and Password in User's Account Data

606
User Controls Device to Access SWP Hosted by ST Server(s)

610
Control SWP to Display User Information GUI

612
User Enters User ID, Mobile Device and Billing Information In User Information GUI

614
Store User ID, Mobile Device, and Billing Information in User Account Data Execute User Info Verification Process

616, 616a-b

618
UVF = P or F?    F

P    620
Execute User Authentication Process

624
Display Fail Message and Terminate

622
UAF = P or F?    F

P    626
Display Pass Message and Display ST Option GUIs

616b

620b

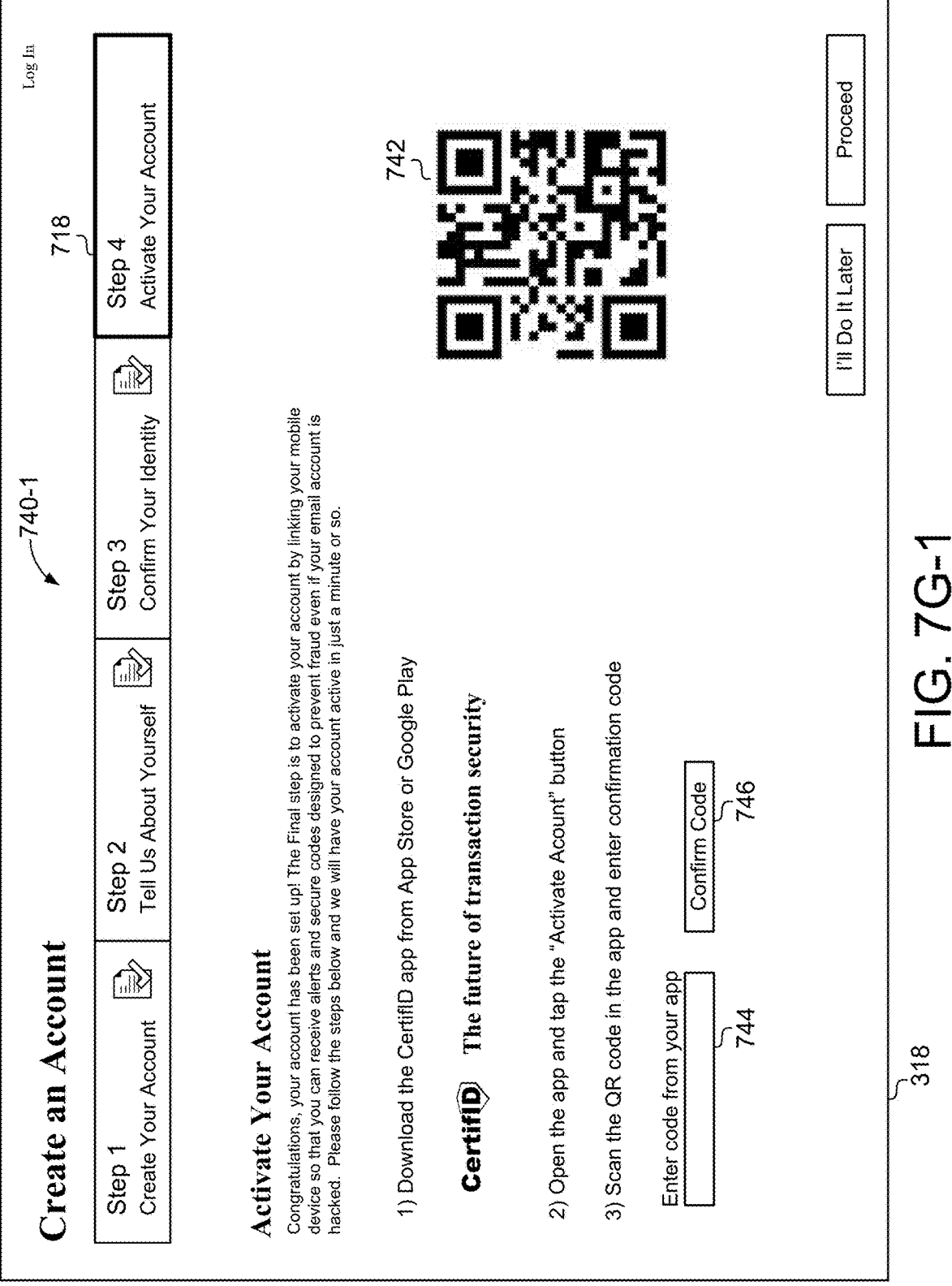

Create an Account　　　　　　718　　　Log In 740-1

| Step 1 | Step 2 | Step 3 | Step 4 |
|--------|--------|--------|--------|
| Create Your Account | Tell Us About Yourself | Confirm Your Identity | Activate Your Account |

Activate Your Account

Congratulations, your account has been set up! The Final step is to activate your account by linking your mobile device so that you can receive alerts and secure codes designed to prevent fraud even if your email account is hacked. Please follow the steps below and we will have your account active in just a minute or so.

1) Download the CertifID app from App Store or Google Play

CertifID　The future of transaction security

2) Open the app and tap the "Activate Account" button

3) Scan the QR code in the app and enter confirmation code

742

Enter code from your app

744

Confirm Code

746

I'll Do It Later　　Proceed

CertifiD

What CertifID Does   How CertifID Does It   How To Get Started   Log In

760

Congratulations, your account is setup!
Click Here to get Started.

762

318

CertifiD

What CertifID Does   How CertifID Does It   How To Get Started   Log In

770

Select Activity

Start a Transaction    Send a CertifID Request    View Dashboard 772                    774                         776

318

1200

1400

2300B

2320

102A

230

2330

2400A

2410

102A

230

2400B

2420

102A

230

2430

VERIFYING PARTY IDENTITIES FOR SECURE TRANSACTIONS

CROSS REFERENCE TO RELATED APPLICATIONS

This U.S. patent application is a continuation-in-part of, and claims priority under 35 U.S.C. § 120 from, U.S. patent application Ser. No. 17/151,591, filed on Jan. 18, 2021, which is a continuation of U.S. patent application Ser. No. 15/872,656, filed on Jan. 16, 2018, which claims priority under 35 U.S.C. § 119(e) to U.S. Provisional Application 62/447,791, filed on Jan. 18, 2017 and U.S. Provisional Application 62/515,851, filed on Jun. 6, 2017. The disclosures of these prior applications are considered part of the disclosure of this application and are hereby incorporated by reference in their entireties.

TECHNICAL FIELD

This disclosure relates generally to systems and methods for verifying identities of parties to a transaction, and further to systems and methods for conducting the transaction in a secure environment.

BACKGROUND

Electronic communications have provided a tremendous amount of convenience and efficiency throughout the world, and have also allowed people on different continents to connect with each other in real time. Inherent in these communications is trust—the idea that a person can rely on the identity of, and information being provided by, a third party. As individuals and companies have leveraged electronic communications and the Internet to engage in commerce, the need for trust has grown exponentially.

While the need for trust between individuals continues to grow, the security of a person's identity and information is declining. Social media and the proliferation of public databases available via the Internet have created a world where once-private information is now stored in digital formats and available to anyone with an Internet connection. This trend has provided an opportunity for criminals to exploit information and trust to perpetrate fraud on individuals and companies. Over the past decade, incidents of electronic fraud have grown at staggering levels and the type, number and sophistication of such frauds are now a real threat to businesses and individuals engaged in commerce.

Examples of some common fraud schemes include: (1) Hacking and Fracking—fraud that involves exploiting vulnerabilities of a computer system where information is stored or accessed to obtain the unauthorized use of a victim's account, whereby the fraudster makes changes to or impersonates the account owner in a way that benefits the fraudster and harms the owner; (2) Phishing—fraud that begins with a solicitation sent electronically and that is crafted in such a way as to obtain engagement by the recipient. This typically involves providing a user name and password to an account or other personal information. Once the response is made, the fraudster will typically have enough information to gain access to the recipient's accounts and possibly impersonate the recipient to third parties. The types and severity of these frauds vary, but they are all geared toward benefiting the fraudster; (3) Social Engineering—this new implementation of legacy social manipulation tactics represents the fastest growing fraud technique. It includes the creation of a fake identity of a known person and impersonating that person to others—typically those involved in a financial transaction. This type of fraud is extremely sophisticated and targets others in a known transaction or a synthetic transaction created by the fraudster. Fraudsters use the fake identity and knowledge of the transaction to trick a victim into doing something they would not otherwise do, a typical example of which is to perpetrate or facilitate wire fraud; and (4) Combined Fraud—sophisticated and potentially long-term fraud in which fraudsters combine some or all of the techniques listed above for the purpose of stealing property or funds. These frauds can last weeks or months and typically involve large dollar values.

In a world where electronic communications prevail and instant messaging is the norm, there is a decreasing likelihood that the identities of individuals interacting with each other can be ascertained by one or the other with any degree of certainty. For example, a fraudster hacking an email account will gain access to an entire log of communications involving a transaction in which the true email address holder may be involved, and will therefore have the ability to interact with the transacting parties in real time to influence or re-direct funds or assets in a manner that was not intended by the original transaction participants. Put simply, with access to electronic communications, things are stolen and people are harmed and there is no system in the industry to recognize the breach of security or trust while it is happening. By their nature, digital communication platforms provide an incredible amount of convenience and efficiency, but fail to ensure trust of all parties throughout a transaction or information exchange.

Criminals prey on this fact and have become increasingly sophisticated, particularly in industries where large sums of money or valuable property are being exchanged. Most recently, such frauds are being conducted in real-time as a transaction is nearing a close and property and funds are changing hands. Without a system to quickly and accurately validate, verify and authenticate the identities of the parties involved as well as the documents and information being shared, transaction participants are exposed to fraud.

One example of a real-time fraud scheme takes place during the wire transfer of funds process. Most wire transfer requests are sent via email from an account holder to an institution holding the funds. The standard industry protocol is for the institution to verify the request by calling the account holder. Unfortunately, there have been numerous cases where a fraudster has provided a bogus phone number or has hacked into the profile of the account holder and changed the number so that when the institution calls to verify the wire transfer request, they end up speaking with the fraudster who impersonates the account holder and approves the transfer. The wire transfer is then sent by the institution to an account controlled by the fraudster. What is therefore needed is a system that allows parties to verify and authenticate in real-time the identities of all participants to, as well as all documents, bank account credentials and other information being exchanged in the course of a transaction.

SUMMARY

One aspect of the disclosure provides a method for verifying identities of parties to a transaction. The method includes receiving, at data processing hardware, a login attempt from a mobile communication device, the login attempt including a security credential. The method also includes determining, by the data processing hardware, that the security credential of the login attempt from the mobile communication device is authentic. The method further includes communicating a one-time access code from the data processing hardware to the mobile communication device. The method includes receiving, at the data processing hardware, a one-time entry code and mobile communication device information from the mobile communication device. The method also includes determining, by the data processing hardware, that the one-time entry code and the mobile communication device information from the mobile communication device satisfies the communicated one-time access code and predetermined user mobile communication device information and providing, by the data processing hardware, the mobile communication device access to a secure transaction environment.

Implementations of the disclosure may include one or more of the following optional features. In some implementations, the security credential includes a login and a password, and determining that the security credential of the login attempt from the mobile communication device is authentic includes determining that the login and the password satisfies stored user account data of a secure transaction database. In some configurations, the security credential includes a biometric identifier, and determining that the security credential of the login attempt from the mobile communication device is authentic includes determining that the biometric identifier satisfies at least one of stored user account data of a secure transaction database or stored biometric data of a third party database. Optionally, the security credential includes a secure token and a private key, and determining that the security credential of the login attempt from the mobile communication device is authentic includes determining that the secure token matches at least one stored token and the private key matches the private key of the user. In some examples, the mobile communication device information includes at least one of: a unique telephone number assigned to the mobile communication device; an electronic serial number; an international mobile equipment indicator unique to the mobile communication device; a cellular provider of the mobile communication device; an internet protocol address from the mobile communication device; or a service provider providing internet services to the mobile communication device. In some configurations, the security credential includes user information including at least one of a name, an address, personal mobile communication device information, a date of birth, a biometric identifier, or a portion of a social security number, and determining that the security credential of the login attempt from the mobile communication device is authentic includes determining that the user information satisfies stored user account data of a distributed ledger database. In these configurations, the distributed ledger database includes a blockchain database.

Another aspect of the disclosure provides a system for verifying identities of parties to a transaction. This aspect may include one or more of the following optional features. The method includes receiving, at data processing hardware, personal information of a user. The method may also include communicating the personal information from the data processing hardware to a fraud database including known fraudulent personal information. The method may further include determining, by the data processing hardware, that the personal information fails to satisfy the known fraudulent personal information of the fraud database. The method may include receiving, at the data processing hardware, mobile communication device information corresponding to a mobile communication device of the user. The method may also include communicating the mobile communication device information from the data processing hardware to a mobile communication device information database including known mobile communication information. The method may further include determining, by the data processing hardware, that the mobile communication device information satisfies known mobile communication device information of the mobile communication device information database. Additionally, the method may include identifying, by the data processing hardware, user account data stored within a secure transaction database that satisfies the mobile communication device information and generating, by the data processing hardware, a plurality of private information questions corresponding to private information of the identified user account data.

In some configurations, the method includes receiving, by the data processing hardware, in response to user interaction with a display screen of the mobile communication device, answers to the generated plurality of private information questions from the mobile communication device. The method may further include determining, by the data processing hardware, that the received answers corresponding to the generated plurality of private information questions are correct answers and authenticating, by the data processing hardware, the user communication device associated with the received correct answers. The personal information may include at least one of a name, an address, personal mobile communication device information, a date of birth, or a portion of a social security number. The secure transaction database may include a distributed ledger database where the distributed ledger database may include a blockchain database.

Another aspect of the disclosure provides a system for verifying identities of parties to a transaction. This aspect may include one or more of the following optional features. The method includes receiving, at data processing hardware, personal information of a user. The method may further include generating, by the data processing hardware, a plurality of personal questions based on the personal information of the user. The method may also include instructing, by the data processing hardware, a display screen of a user communication device of the user to display more than one personal question. The method may include receiving, at the data processing hardware, in response to user interaction with the display screen of the user communication device, answers to the displayed more than one personal question from the user communication device. The method may further include determining, by the data processing hardware, that the received answers corresponding to the more than one personal questions are correct answers and authenticating, by the data processing hardware, the user communication device. In some examples, the method includes receiving, at the data processing hardware, private information about the user from at least one third party database based on the personal information of the user and generating, by the data processing hardware, the plurality of personal questions based on the private information about the user.

In some configurations, the method includes communicating, from the data processing hardware, the personal information of the user to a fraud database. The method may include determining by the data processing hardware, that the personal information does not match known personal information in the fraud database. The method may further include receiving, at the data processing hardware, user communication device information relating to the user communication device of the user. The method may also include communicating, from the data processing hardware, the user communication device information to a user device information database. Additionally or alternatively, the method may include determining, by the data processing hardware, that the user communication device information includes unknown user communication device information based on the user device information database. The method may further include communicating, by the data processing hardware, a verification failure message to the user communication device based on the unknown user communication device information.

In some examples, generating the plurality of personal questions corresponding to the personal information about the user further includes the following: communicating, from the data processing hardware, the personal information of the user to a fraud database; determining by the data processing hardware, that the personal information does not match known personal information in the fraud database; receiving, at the data processing hardware, user communication device information relating to the user communication device of the user; communicating, from the data processing hardware, the user communication device information to a user device information database; and determining, by the data processing hardware, that the user communication device information includes known user communication device information based from the user device information database.

In some configurations, the method includes communicating, from the data processing hardware, the personal information of the user to a fraud database. The method may also include determining by the data processing hardware, that the personal information does not match known personal information in the fraud database. The method may further include receiving, at the data processing hardware, user bank account information from the user of the user communication device. With the user bank account information, the method may communicate, from the data processing hardware, the user bank account information to a bank account credential database including a plurality of bank accounts and bank account owners associated with the plurality of bank accounts. The method may include determining, by the data processing hardware, that the user bank account information from the user is inconsistent with the bank account credential database. Additionally or alternatively, the method may also include communicating, from the data processing hardware, a verification failure message to the user communication device based on the inconsistent user bank account information.

In some implementations, the method includes communicating, from the pro data processing hardware, the personal information of the user to a fraud database. The method may also include determining by the data processing hardware, that the personal information does not match known personal information in the fraud database. In some examples, the method includes receiving, at the data processing hardware, user bank account information from the user of the user communication device. The method may further include communicating, from the data processing hardware, the user bank account information to a bank account credential database including a plurality of bank accounts and bank account owners associated with the plurality of bank accounts and determining, by the data processing hardware, that the user bank account information matches at least one bank account and corresponding bank account owner within the bank account credential database.

Optionally, the method when authenticating the user communication device associated with the received correct answers includes generating, by the data processing hardware, a one-time access code. The data processing hardware may communicate the one-time access code to the user communication device associated with the received correct answers. In some examples, the method includes receiving, at the data processing hardware, a code entry from the user communication device. The method may further include determining, by the data processing hardware, that the code entry from the user communication device matches the one-time access code communicated to the user communication device.

In some examples, when authenticating the user communication device associated with the received correct answers, the method includes receiving, at the data processing hardware, a barcode or glyph captured by the user communication device, the barcode or glyph including user information corresponding to the user of the user communication device. The method may also include comparing, by the data processing hardware, the user information of the barcode or glyph to stored user account information. In some implementations, the method may also include determining, by the data processing hardware, that the user information of the barcode or glyph satisfies the stored user account information. In some configurations, the data processing hardware generates a one-time access code. The method may include communicating, from the data processing hardware, the one-time access code to the user communication device associated. The method may further include receiving, at the data processing hardware, a code entry from the user communication device. Additionally or alternatively, the method may also include determining, by the data processing hardware, that the code entry from the user communication device satisfies the one-time access code communicated to the user communication device. Optionally, the user communication device may be a mobile phone. In some configurations, the method also includes registering, by the data processing hardware, the user for access to a secure transaction environment. The user communication device may be a mobile phone. In some examples, the method further includes registering, by the data processing hardware, the user for access to a secure transaction environment.

In some examples, the method, when authenticating the user communication device, further includes receiving, at the data processing hardware, a biometric identifier captured by the user communication device, the biometric identifier including at least one of a fingerprint, a facial image, vein scan, ear lobe scan, retina scan, iris scan, walking gait, a voice recording, or similar biometric input corresponding to the user of the user communication device. The method may further include comparing, by the data processing hardware, the biometric identifier to at least one of stored user account information or stored biometric identifiers in a third party database. The method may also include determining, by the data processing hardware, that the biometric identifier satisfies at least one of stored user account information or stored biometric identifiers in a third party database. The method may include generating, by the data processing hardware, a one-time access code or security token. The method may further include communicating, from the data processing hardware, the one-time access code or security token to the user communication device. The method may also include receiving, at the data processing hardware, a code entry or security token from the user communication device and determining, by the data processing hardware, that the code entry from the user communication device satisfies the one-time access code or security token communicated to the user communication device.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6A is a flow diagram of an example arrangement of a user registration process for establishing a user account and verifying an identity of a user via a user computer.

FIGS. 6B-1 and 6B-2 are flow diagrams of example arrangements of a user information verification process.

FIGS. 6C-1, 6C-2, and 6C-3 are flow diagrams of examples of a user authentication process.

FIGS. 7C-1 and 7C-2 are schematic views of example user information entries GUI produced by one or more secure transaction servers as part of a user registration process.

FIGS. 7D-1 and 7D-2 are schematic views of example user information entries GUI produced by one or more secure transaction servers as part of a user registration process.

FIGS. 7G-1 and 7G-2 are schematic views of example user authentication GUIs produced by one or more secure transaction servers as part of a user authentication process.

FIG. 7I is a schematic view of an example user authentication success GUI produced by one or more secure transaction servers as part of a user authentication process.

FIGS. 10C-1 and 10C-2 are schematic views of example user login GUIs produced by one or more secure transaction servers following successful matching of a user's email and a password as part of a user login process.

FIGS. 17D-1 and 17D-2 are schematic views of example information verification request GUIs produced by one or more secure transaction servers or by a secure transaction application within a secure transaction environment.

Like reference symbols in the various drawings indicate like elements.

DETAILED DESCRIPTION

Figure 1:
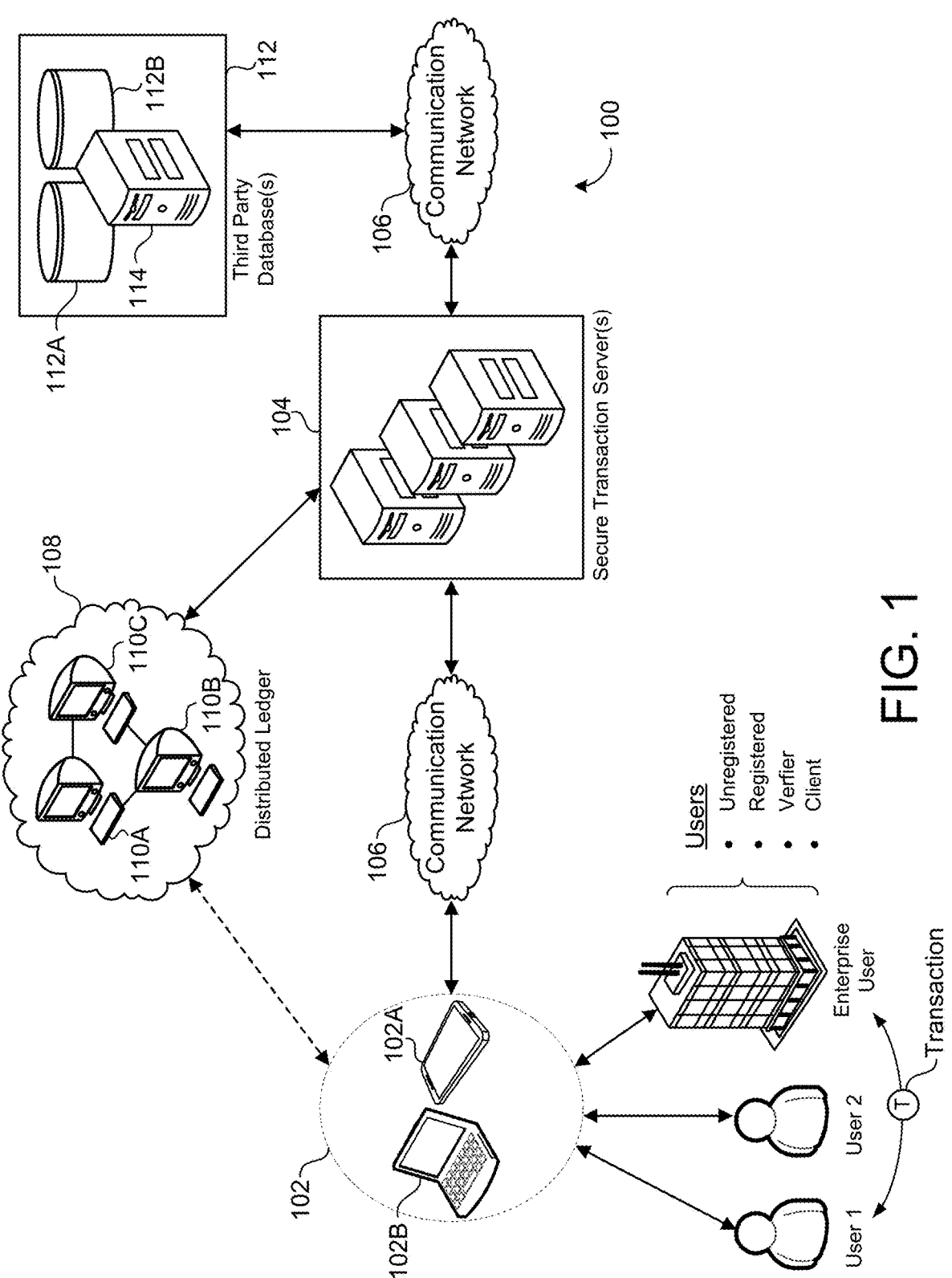
FIG. 1 is a schematic view of an example system for verifying identities of parties to a transaction and for conducting the transaction in a secure environment.

While the concepts of the present disclosure are susceptible to various modifications and alternative forms, specific exemplary examples thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one example", "an example", example, etc., indicate that the example described may include a particular feature, structure, or characteristic, but every example may not necessarily include the particular feature, structure, or characteristic. Moreover, such phrases may or may not necessarily refer to the same example. Further, when a particular feature, structure, process, process step or characteristic is described in connection with an example, it is submitted that it is within the knowledge of one skilled in the art to effect such feature, structure, process, process step or characteristic in connection with other examples whether or not explicitly described. Further still, it is contemplated that any single feature, structure, process, process step or characteristic, and/or any subset of features, structures, process, process steps or characteristics, disclosed herein may be combined with any one or more other disclosed feature, structure, process, process step or characteristic, whether or not explicitly described, and it will be understood that no limitations on the types and/or number of such combinations are therefore intended or should be inferred.

Examples of the transaction process may be implemented in hardware, firmware, software, or any combination thereof. Examples of the transaction process implemented in a computer system may include one or more bus-based interconnects between components and/or one or more point-to-point interconnects between components. Examples of the transaction process may also be implemented as instructions stored on one or more machine-readable media, which may be read and executed by one or more processors. A machine-readable medium generally refers to mean a non-transitory machine-readable medium, i.e., one that does not include transitory signals, and such a machine-readable medium may be as any device or physical structure for storing or transmitting information in a form readable by a machine (e.g., a computing device). For example, and without limitation, a machine-readable medium may be any one or combination of read only memory (ROM); random access memory (RAM); magnetic disk storage media; optical storage media; flash memory devices; and others.

System Components

FIG. 1 is an example of a secure environment system 100 that includes identities of parties to a transaction and for conducting the transaction in a secure environment. The illustrated system 100 includes user devices 102 that can be communicatively coupled to one or more secure transaction ("ST") servers 104 (hereinafter "ST server 104") via a communication network 106. The user devices 102 may include, but are not limited to, mobile communication devices 102A and user computers 102B. As will be described in detail below, the ST server 104 control(s) and manage(s) a user registration process via which an identity of a "user" is established and verified, and in which such an identity-verified user is then tethered to a secure transaction environment also controlled and managed by the ST server 104 via the user device 102 (e.g., communication device 102A). Registered users may access a secure transaction environment hosted by the ST server 104 via a multi-factor-authentication login process executed, at least in part, by the user's device 102A and the ST server 104. For example, the multi-factor authentication login process uses a security credential hosted by the ST server 104. Secure transactions between registered users may then be subsequently conducted within the secure transaction environment. During the execution of secure transactions, the secure transaction system 100 may repeat processes described below to ensure the identity and/or the authenticity of a party or a component of a transaction. For example, to execute documents, a user may be asked within the secure transaction environment to validate an identity and/or authenticate a document. Although some examples of the disclosure describe the secure transaction environment with respect to a real estate transaction, the secure transaction environment may perform any secure transaction, financial or non-financial.

In some examples, as will be described in detail below users may establish a secure user account with the ST server 104 according to a user registration process involving at least one user device 102 (e.g., the mobile communication device 102A or the user computer 102B). In some examples, such as FIGS. 6A-11B, the user registration process involves a combination of the mobile communication device 102A and the user computer 102B. In other examples, as will be described in detail below with respect to FIGS. 12-15C, users may establish a secure user account with the ST server 104 according to a user registration process involving solely a mobile communication device 102A.

As used herein, the term "user" may be a "verifier" or a "client." A "verifier," also be referred to as an "enterprise user," is generally an individual who works for a business enterprise and, in the course of business, will conduct, or be involved in conducting, at least one secure transaction with at least one individual during which the verifier will verify the identity of the at least one individual and/or will confirm documents and/or other information. A "client" is generally an individual, such as a consumer, who will conduct, or be involved in conducting, at least one secure transaction with at least one verifier. Verifiers will generally establish verifier accounts with the ST server 104 according to a verifier registration process and clients will generally establish client accounts with the ST server 104 according to a client registration process. The term "secure transaction," as used hereinafter, generally refers to a transaction conducted between one or more verifiers and/or one or more clients within the secure transaction environment managed by the ST server 104.

The system 100 illustrated in FIG. 1 further includes a distributed ledger 108 communicatively coupled to the ST server 104. In some examples, as illustrated by dashed-line configuration in FIG. 1, the user device 102 (e.g., either or both of the user devices 102A, 102B) may be communicatively coupled to the distributed ledger 108. The ST server 104 can also be communicatively coupled to one or more third-party databases and/or systems 112 via a communication network 106.

The communication network 106 may represent any one or combination of a cellular telephone network, a cloud network, a local area network (LAN), personal area network (PAN), storage area network (SAN), backbone network, global area network (GAN), wide area network (WAN), and a collection of any such computer networks such as an intranet, extranet and/or the Internet (i.e., a global system of interconnected computer networks that use, e.g., the internet protocol suite (TCP/IP), to link computer devices worldwide). In some examples, the communication network 106 may be strictly wireless. In other examples, the communication network 106 is wired or a combination of wired and wireless. In either case, the communication network 106 may be a public network, a private network, or some combination of both a public and private network. Generally, each component connectable to the communication network 106 in the system 100 illustrated in FIG. 1 includes communication circuitry configured to use any one or combination of secure and/or unsecure communication protocols to communicate via the communication network 106. As such, the communication network 106 may include any number of additional devices, such as additional computers, routers, and switches, to facilitate communications between the various components of the system 100 connectable thereto.

The distributed ledger 108, as illustrated, may be a plurality of peer-to-peer network of computer nodes (e.g., three computer nodes 110A-C) each executing instructions to ensure replication of data across the nodes. In some examples, the distributed ledger 108 is implemented in the form of a blockchain database. In other examples, the distributed ledger 108 may take other conventional forms. In some examples of the system 100, information may be stored to the distributed ledger 108 only by the ST server 104. In other examples, information is stored to the distributed ledger 108 by the user device 102 (e.g., either or both of the user devices 102A, 102B). An example protocol for storing information to the distributed ledger 108 by one or more devices (e.g., user devices 102) in the system 100 within the context of example real estate transactions will be described in greater detail below with respect to FIG. 21.

The third-party database systems or systems 112 may include any number of databases. For example, FIG. 1 depicts two databases 112A, 112B. In some examples, one or more such databases or systems 112 may further include one or more conventional servers, e.g., server 114 shown in FIG. 1. In some implementations, the ST server 104 accesses third-party databases to retrieve or otherwise provide information. In other implementations, third-party databases provide a database service configured to provide specified information to the ST server 104. Information may, in some examples, be limited to information stored in one or more databases 112A, 112B, and in other examples such information may include sorting and/or processing of information stored in one or more databases 112A, 112B.

Mobile Communication Device Components

Figure 2:
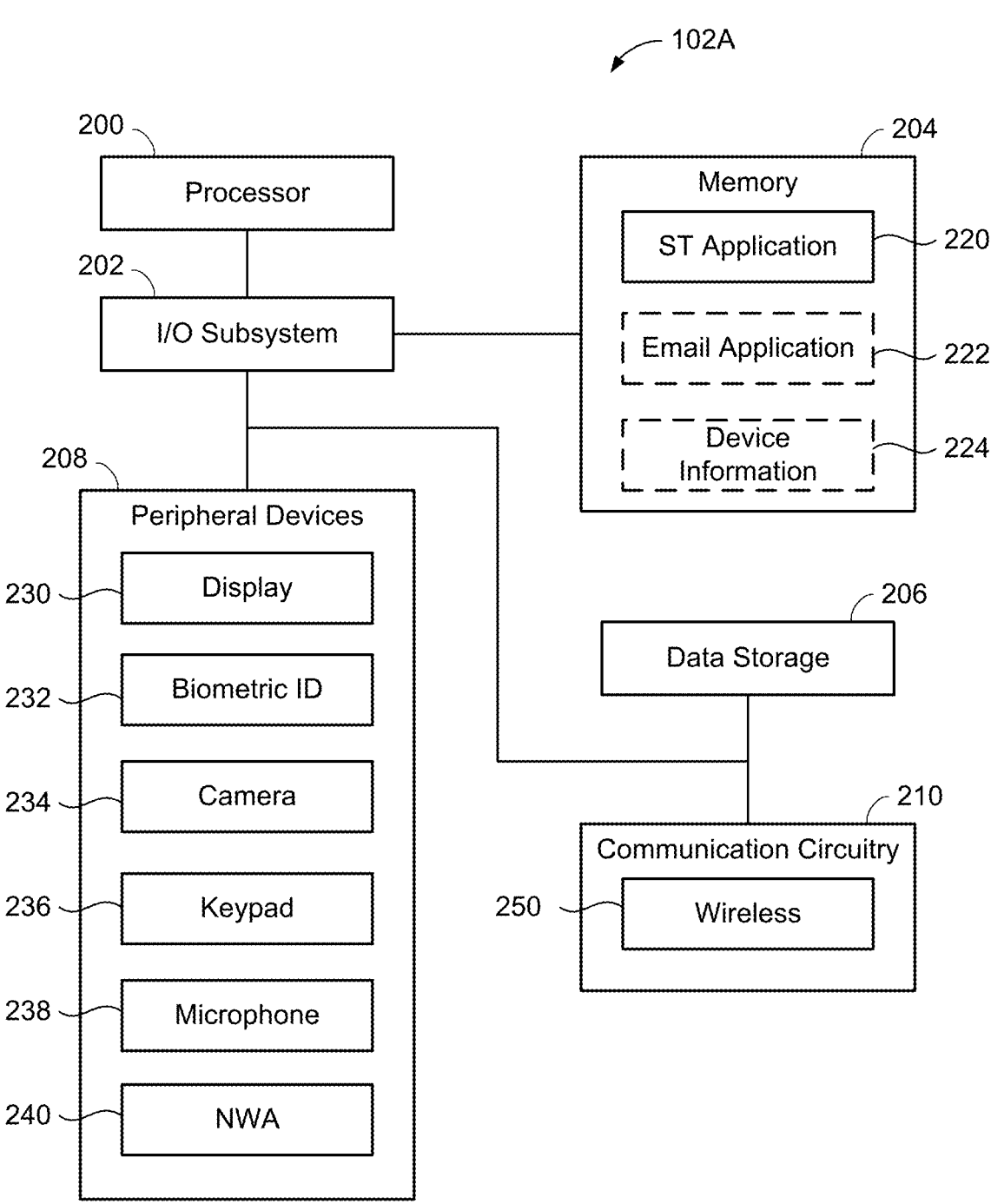
FIG. 2 is a block diagram of an example arrangement for a mobile communication device.

FIG. 2 is an example of a mobile communication device 102A that includes a processor 200, an input/output (I/O) subsystem 202, a memory 204, a data storage device 206, a number of peripheral devices 208, and communication circuitry 210. The mobile communication device 102A may include other components, sub-components, and devices commonly found in a computer and/or computing device, but which are not included in FIG. 2 for clarity of the illustrated components.

The processor 200 of the mobile communication device 102A may be any type of processor capable of executing software/firmware, such as a microprocessor, digital signal processor, microcontroller, or the like. The processor 200 may be a single processor or include multiple processors. The I/O subsystem 202 coupled to the processor 200 may circuitry and/or components to facilitate input/output operations with the processor 200 and/or other components of the mobile communication device 102A.

The memory 204 of the mobile communication device 102A may include one or more volatile and/or non-volatile memory devices. The memory 204 is communicatively coupled to the I/O subsystem 202 via a number of signal paths. Although FIG. 2 illustrates only a single memory device 204, the mobile communication device 102A may include any number of memory devices. Various data and/or software may be stored in the memory 204. For example, the memory 204 includes a secure transaction application 220 ("ST App") stored therein in the form of, e.g., instructions executable by the processor 200. In some examples, a user may establish a user account, e.g., a verifier account or a client account, a user may log into a pre-established user account and/or a user may conduct one or more aspects of a secure transaction within a secure transaction environment managed and controlled by the ST server 104. Examples of processes executed by the processor 200 of the mobile communication device 102A according to the ST App 220 as illustrated in FIGS. 8A-8C and 12-20 will be described in further detail below.

In some implementations, the memory 204 further stores a conventional email application 222, e.g., in the form of instructions executable by the processor 200, linked to a unique email address associated with and established by or for the user of the mobile communication device 102A and via which the user may send and receive email communications to and from other email addresses in a conventional manner. The memory 204 may further store device information 224 that identifies the mobile communication device 102A or one or more operational aspects thereof. Some examples of device information 224 include a unique telephone number ("phone number") assigned to the mobile communication device 102A (e.g., area-code and 7-digit number) when the mobile communication device 102A has cellular or other phone communication capabilities, an electronic serial number (ESN) or International Mobile Equipment Indicator (IMEI) unique to the mobile communication device 102A, the identity of a cellular or other carrier providing cellular or other phone service to the mobile communication device 102A identified by the phone number, Internet protocol (IP) address used by the mobile communication device 102A to communicate with other electronic devices and/or systems, Internet service provider (ISP) and/or wireless Internet service provider (WISP) providing Internet services to the mobile communication device 102A, and the like. Such device information 224 may be referred to hereinafter as "MCD information," and may be understood to include any one or combination of the foregoing examples.

As illustrated by FIG. 2, the data storage 206 may be communicatively coupled to the I/O subsystem 202 via a number of signal paths, and may be any type of device or devices configured for the short-term or long-term storage of data, such as, for example, memory devices and circuits, memory cards, hard disk drives, solid-state drives, or other data storage devices.

The peripheral devices 208 coupled to the I/O subsystem 202 may include any number of input/output devices. Some examples include a display screen 230 (e.g., with or without touch-screen input capability), a biometric identification device 232, a camera 234, at least one keypad 234 (e.g., separate from or integrated with the display screen 230), a microphone 238, and a network adapter (NWA) 240 via which some or all communications with the ST server 104 may be conducted. Other peripheral devices typically carried by mobile communication devices 102A and coupled to the I/O subsystem 202 thereof are possible as well. Moreover, such peripheral devices, and any application instructions executable by the processor 200, may be included in the peripheral devices 208 although not specifically shown in FIG. 2. For example, other peripheral devices may include, but are not limited to, a global positioning system (GPS) receiver, a magnetometer, an accelerometer, and the like.

In some examples, the biometric identification device 232 is a fingerprint detection device such as a sensor. In such examples, the memory 204 and/or data storage 206 stores instructions executable by the processor 200 to learn and to identify a unique fingerprint and/or thumbprint placed in contact with the sensor 232 of the biometric ID device, and to grant access to other applications, executed by the processor 200, upon successful identification of the fingerprint or the thumbprint in lieu of a password or personal identification number (PIN). In other examples, the biometric identification device 232 includes other biometric devices and/or one or more of the peripheral devices 208 (e.g., a camera 234). Additionally or alternatively, the biometric identification device 232 may include facial, ear, retina, or iris recognition (e.g., via the camera 234 and associated application software executed by the processor 200), voice verification or recognition (e.g., via the microphone 238 and associated application software executed by the processor

200), signature recognition (e.g., via finger or stylus, touch-sensitive display screen 230 and associated application software executed by the processor 200), and the like. Some advantages to biometric identification are that a user identity may be tied to the user via his/her own biometric rather than a device, login name, and/or password. The biometric may be a unique verifiable identity that when verified by biometric authentication can be confirmed as an established and vetted digital identity. For example, a user is linked to a single unique verifiable identity rather than multiple security credentials to prevent a creation of fraudulent identities.

The communication circuitry 210 may include conventional wireless communication circuitry 250. In some examples, the wireless communication circuitry 250 is configured to conduct and to facilitate cellular telephone communications with other cellular and land-based communication devices. Alternatively or additionally, the wireless communication circuitry 250 may be configured to conduct and to facilitate communication with other devices, servers and/or systems via the communication network 106. The wireless communication circuitry 250 may include communication circuitry for conducting and facilitating any such communication, and the mobile communication device 102A may use any suitable communication protocol to communicate with other cellular and/or land-based communication devices and/or with one or more other electronic devices, servers and/or systems.

Although only one mobile communication device 102A is depicted in FIG. 1, the system 100 illustrated in FIG. 1 is configured to accommodate any number of users and user devices 102. In this regard, the mobile communication device 102A depicted in FIG. 1 represents any number of mobile communication devices each specifically and uniquely associated with a different one of the number of different users. There is no limit on the total number of users, and/or of the number of users that may use the system 100 at any given time.

The mobile communication device 102A may be referred to herein as a "mobile device," "MCD," or similar shorthand descriptor, and is intended to depict a personal mobile communication device that is owned and/or operated typically solely by a single individual or by a small, defined group of trusted individuals (e.g., family members, co-workers, etc.). There is no limit on the total number of such mobile communication devices 102A that may be owned and/or operated by any one user. The mobile communication device 102A may be any mobile electronic device capable of executing one or more software application programs and of communicating with at least the ST server 104 via the communication network 106.

While the mobile communication device 102A is depicted and described in some portions of the following description, as a mobile phone, such figures and descriptions are examples and should not be limiting in any way. Some examples of the mobile communication device 102A include mobile phones (e.g., cellular, satellite, voice over internet protocol (VOIP) phones, etc.), smart phones, tablet computers, personal data assistants (PDAs), e-readers, wearable electronic communication devices (e.g., eye glasses, watches, devices attached to and/or integral with clothing, headwear and/or footwear), implanted electronic communication devices, and the like. Other examples include any one or more such mobile communication devices 102A mounted to or integral with a mobile structure and configured to communicate with, or to at least wirelessly exchange some amount of information with, any of the foregoing example mobile communication devices 102A, and some examples of such mobile structures include motor vehicles, watercrafts, aircrafts, electrically powered or motorized vehicles, wheelchairs, and the like.

User Computer Components

Figure 3:
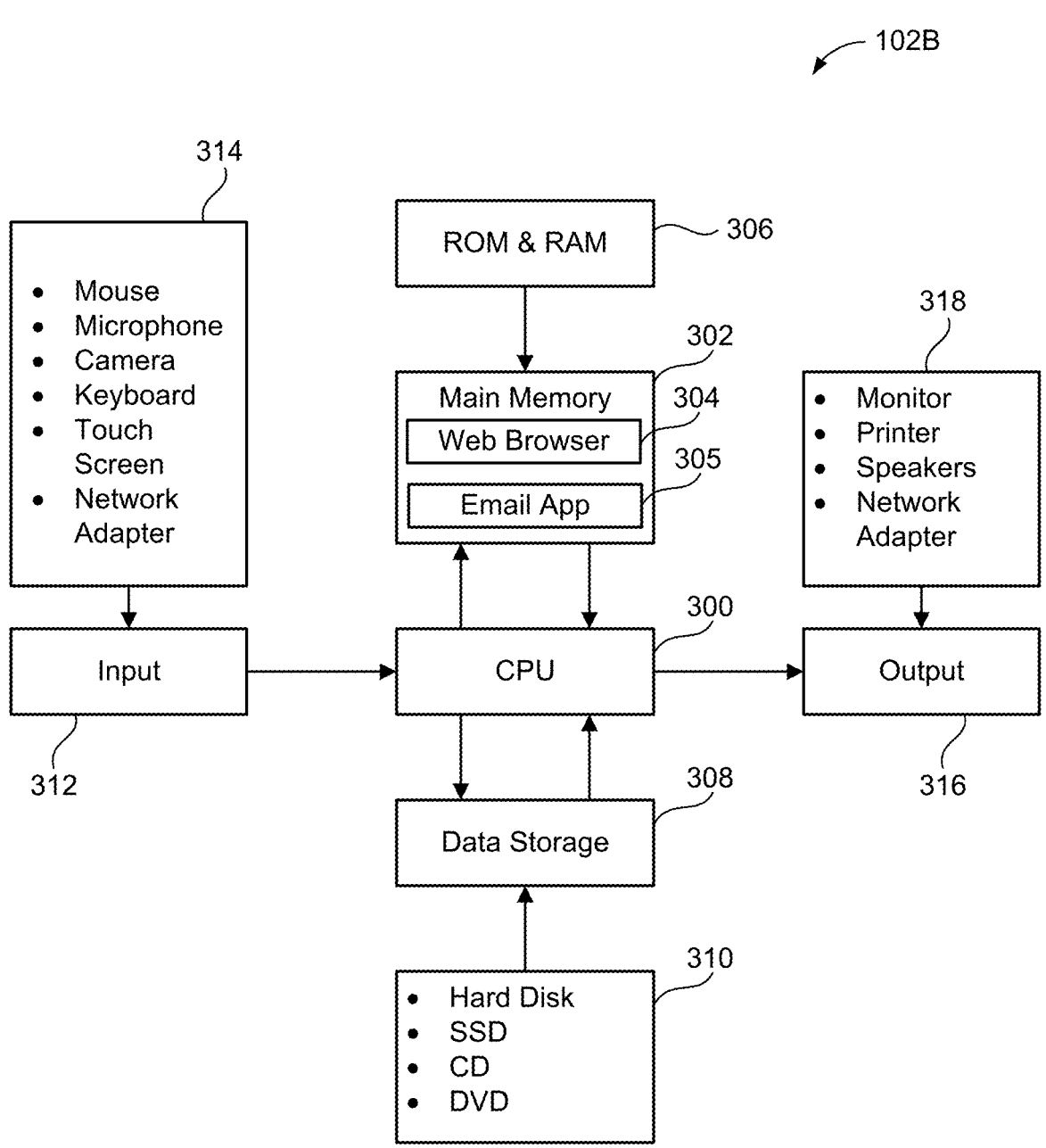
FIG. 3 is a block diagram of an example arrangement for a user computer.

FIG. 3 is an example of the user computer 102B that includes a processor 300, e.g., in the form of a central processing unit or CPU coupled to a main memory 302 that may include supplemental read-only memory (ROM) and/or random access memory (RAM) 306 coupled thereto, coupled to a data storage 206 (e.g., include supplemental hard disk and/or portable disk drive(s) 310), coupled to a input subsystem 312 and coupled to a output subsystem 316. A number of input peripheral devices 314 may be coupled to the input subsystem 312. Some examples include a point-and-click device, such as a mouse, a microphone, a camera, a keyboard, a touch-screen monitor and a network adapter. A number of output peripheral devices 318 are likewise coupled to the output subsystem 316. Some examples of output peripheral devices 318 include a monitor, a printer, one or more speakers and a network adapter. In some examples, the input subsystem 312 and the output subsystem 316 may be combined into a single input/output (I/O) subsystem (e.g., illustrated in FIG. 2). In any case, the foregoing components of the user computer 102B are configured and operable in a conventional manner.

With further reference to the example shown in FIG. 3, the memory 302 stores a web browser via which a user may access the secure transaction website hosted and managed by the ST server 104 as will be described in further detail below. In some examples, the memory 302 further stores an email application 305, e.g., in the form of instructions executable by the processor 300, that a user may access with a unique email address associated with and established by or for the user of the user computer 102B and via which the user may send and receive email communications to and from other email addresses. In some examples, the user of the user computer 102B alternatively or additionally accesses the user's unique email address to send/receive email communications via the web browser 304.

Although only one user computer 102B is depicted in FIG. 1, the system 100 illustrated in FIG. 1 is configured to accommodate any number of users. In this regard, the user computer 102B depicted in FIG. 1 represents any number of user computers each used by a different one of the number of different users. There is no limit on the total number of users of the system 100, and/or of the number of users that may use the system 100 at any given time.

The user computer 102B may include any of personal, privately owned and/or accessed computers, such as desktop or workstation computers residing in user's residences and/or mobile computers carried by users, and to include semi-privately owned and/or accessed computers, such as desktop or workstation computers residing at multiple-employee business enterprises and/or mobile computers carried by business enterprise employees. There is no limit on the total number of such user computers 102B that may be owned and/or operated by any one user. The user computer 102B may be any personal computer capable of executing one or more software programs and of communicating with at least the ST server 104 via the communication network 106. Some examples of the user computer 102B include personal, fixed-location, e.g., desktop or workstation, computers (PCs), laptop computers, notebook computers, netbook computers, tablet computers, and the like, whether or not networked with one or more other computing devices.

ST Server Components

Figure 4:
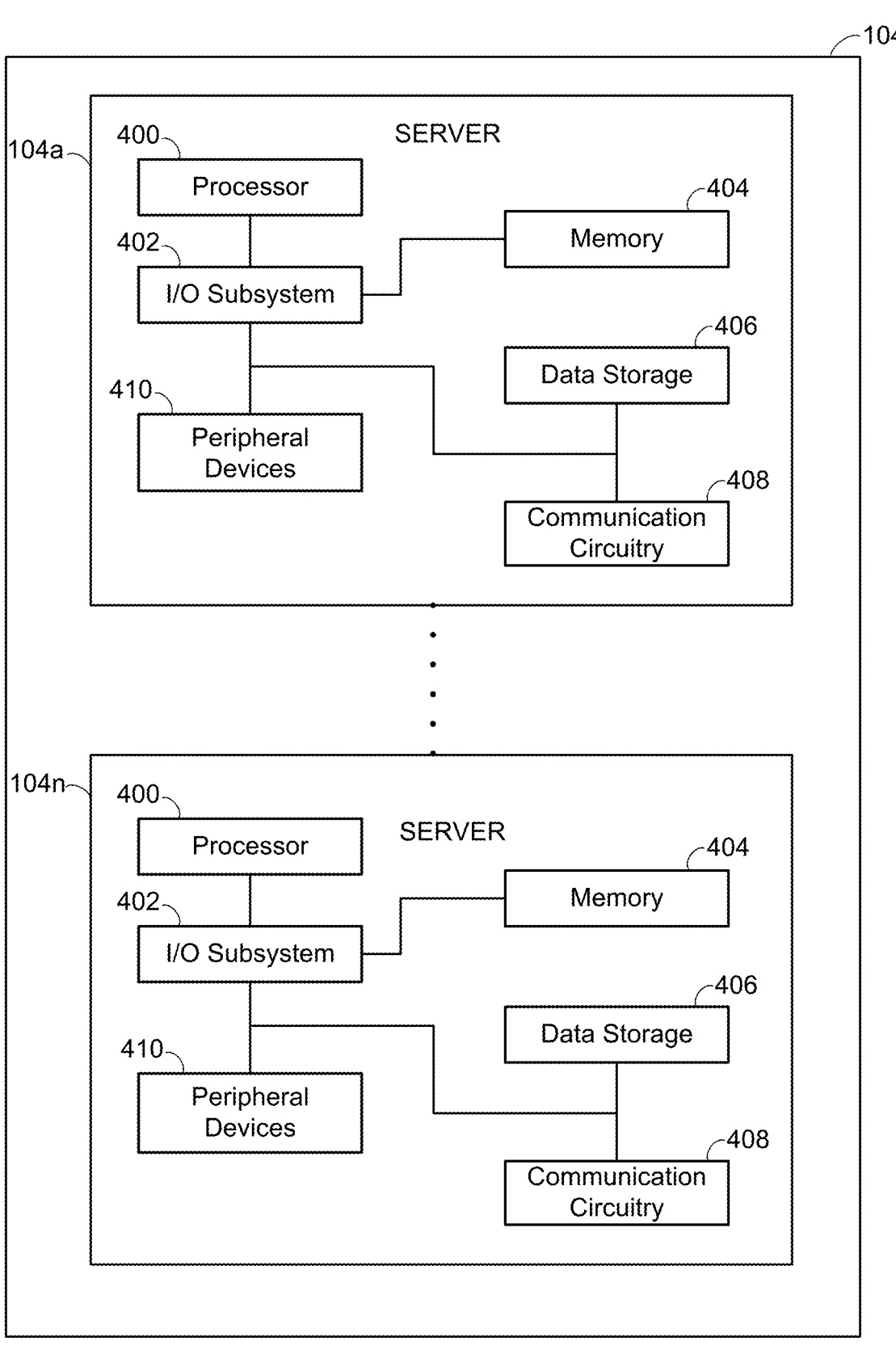
FIG. 4 is a block diagram of an example arrangement for one or more secure transaction servers.

FIG. 4 is an example of the ST server 104. In this example, the ST server 104 includes any number, N, servers $104_1$-$104_N$, where N may be any positive integer. In some examples in which the ST server 104 includes more than one server, such as FIG. 4, all of the servers $104_1$-$104_N$ are identical. In other examples, where the ST server 104 includes more than one server, at least one of the servers $104_1$-$104_N$ may be different from others of the servers $104_1$-$104_N$, e.g., at least one of the servers $104_1$-$104_N$ may be configured to operate differently and/or may include additional, fewer and/or different hardware components than others of the servers $104_1$-$104_N$.

Referring to FIG. 4, each of the one or more servers $104_1$-$104_N$ may be embodied as any type of server (e.g., a web server) or similar computing device capable of performing the functions described herein. In the illustrated example, each of the one or more servers 1041-104N includes a processor 400, an I/O subsystem 402, a memory 404, a data storage 406, communication circuitry 408, and one or more peripheral devices 410. Additionally or alternatively, each server 1041-104N may include other components, sub-components, and devices commonly found in a server and/or computing device, although for simplicity not illustrated in FIG. 4.

The processor 400 of each of the one or more servers 1041-104N may be any type of processor or combination of processors capable of executing software/firmware, such as a one or more microprocessors, digital signal processors, microcontrollers, or the like. The processor 400 may be a single processor or may include multiple processors. The I/O subsystem 402 of the one or more servers 1041-104N may be circuitry and/or components to facilitate input/output operations with the processor 400 and/or other components of the one or more servers 1041-104N. The processor 400 is communicatively coupled to the I/O subsystem 402.

The memory 404 of each of the one or more servers 1041-104N may include one or more volatile and/or non-volatile memory devices. The memory 404 is communicatively coupled to the I/O subsystem 402 via a number of signal paths. Although a single memory device 404 is illustrated in FIG. 4, each of the one or more servers 1041-104N may include any number of memory devices $404_{1-N}$. Various data and software may be stored in the memory 404. The data storage 406 is also communicatively coupled to the I/O subsystem 402 via a number of signal paths, and may be any type of device or devices configured for short-term or long-term storage of data, such as, for example, memory devices and circuits, memory cards, hard disk drives, solid-state drives, or other data storage devices.

The communication circuitry 408 of each of the one or more servers 1041-104N may include any number of devices and circuitry for enabling communications between the one or more servers 1041-104N and any of the other devices, servers and/or systems of the system illustrated in FIG. 1, e.g., via the network 106. Generally, the communication circuitry 408 may be configured to use any one or more, or combination, of secure and/or unsecure communication protocols to communicate with any of the other devices, servers and/or systems of the system 100.

In some examples, each of the one or more servers 1041-104N may also include one or more peripheral devices 410. Examples of such peripheral devices 410 may include, but are not limited to, any number of additional input/output devices, interface devices, and/or other peripheral devices including any of the peripheral devices illustrated in FIGS. 2 and/or 3 or otherwise described above.

Secure Transition Server Environment

Figure 5:
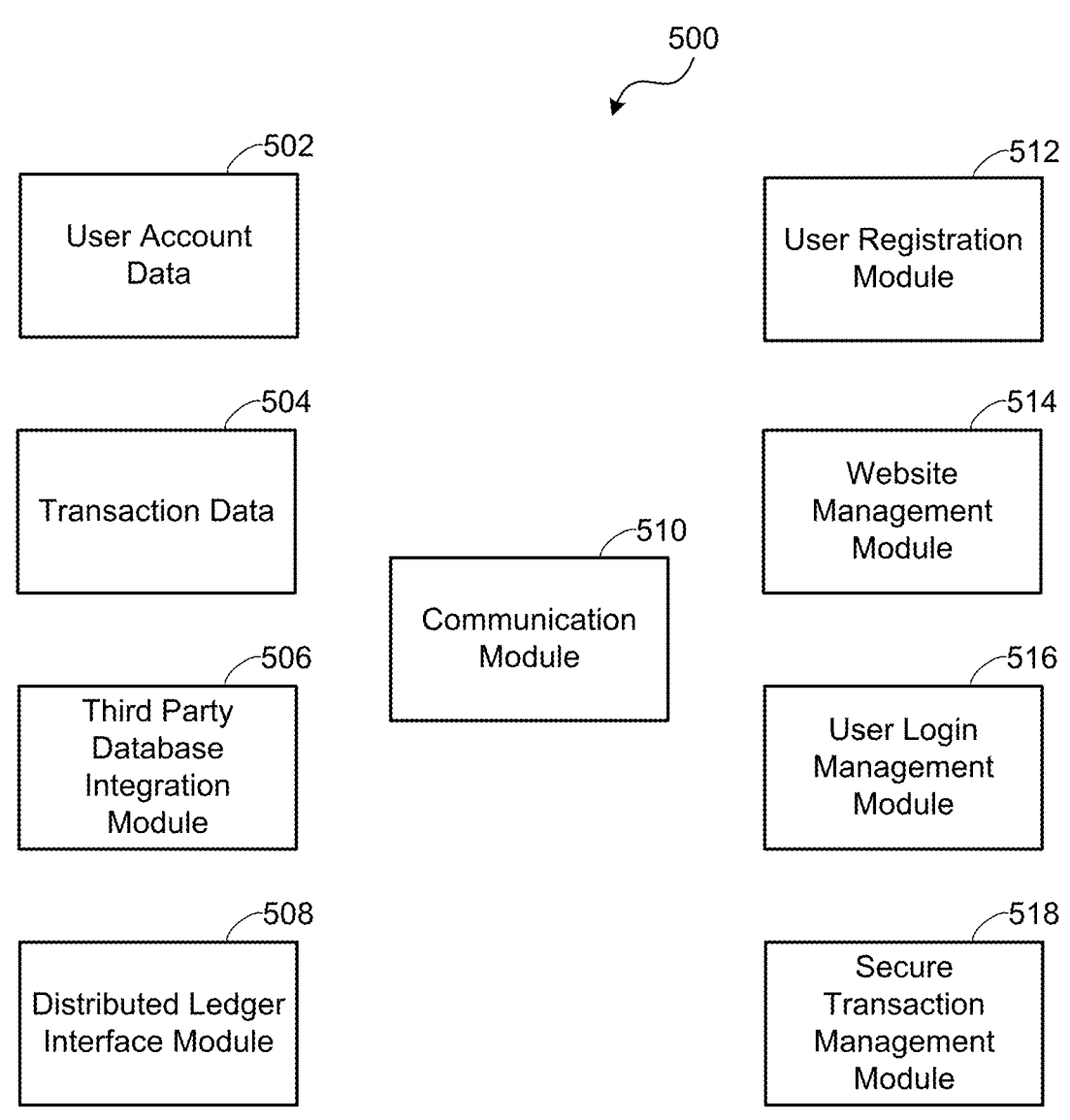
FIG. 5 is a block diagram of example components of the one or more secure transaction servers.

FIG. 5 is an example of a block diagram of environment 500 of the ST server 104. In some examples, the environment 500 represents the memory 404, data storage, and/or other information storage structure or component where information may be stored and/or where one or more processes may be stored in the form of instructions executable by the processor 400. In other examples, the environment 500 represents circuitry designed and/or programmed to store information and/or execute one or more processes. In yet other examples, the environment 500 represents a combination of memory, software, firmware and/or circuitry for storing information and/or executing one or more processes.

The environment 500 includes a user account database or data storage area 502 that stores user account data (e.g., user registration information). The environment 500 further includes a transaction database or data storage area 504 that stores transaction data. For example, the transaction database 504 stores information relating to secure transactions carried out within a secure transaction environment controlled and managed by the ST server 104. In some examples, the database(s) that stores the data 502 and/or 504 is configured according to a multi-tenant architecture. In some examples, at least some data to be stored therein may be encrypted in transit and/or at rest.

Referring further to FIG. 5, the environment 500 may also include a third party database integration module 506 and a distributed ledger interface module 508. The third party database integration module 506 is configured to control and manage communications and information transfer with the ST server 104 and the third party databases and/or systems 112 (FIG. 1). Examples of one or more processes executed by the third party integration module 506 will be described in detail below with respect to FIG. 6B. The distributed ledger interface module 508 is configured to control and manage transfer and storage of information to the distributed ledger (FIG. 1). An example of an architecture and a process for storing such information will be described in detail below with respect to FIG. 21.

The environment 500 further includes a communication module 510. The communication module 510 is configured to control and manage communications conducted between the ST server 12 and each of the remaining devices, servers and systems of the system 100.

The environment 500 also includes a user registration module 512, a website management module 514, a user login management module 516 and a secure transaction management module 518. The user registration module 512 is configured to control and to manage registration, such as account setup and activation of new users of the secure transaction system 100. Some examples below of processes executed by the user registration module 512 are illustrated and described further with respect to FIGS. 6A-8C and FIGS. 12-13D.

The user login management module 516 is configured to manage and to control a login process where registered users may log into the secure transaction environment to conduct or participate in a secure transaction managed by the ST server 104. In some implementations, users log in to the secure transaction environment with a security credential. The security credential may include a login and a password. Some processes executed by the user login management module 516 are illustrated and described below with respect to FIGS. 9-11B and 14-15C

The website management module 514 is configured to manage and to control a user interface, such as an ST website or web-based interface, for the user registration process within the registered user secure transaction environment described above. Illustratively, a new user may access the ST website to set up a new user account by completing the user registration process, and existing, i.e., registered, users may access the ST website to log into the secure transaction environment to conduct or participate in a secure transaction managed by the ST server 104.

The secure transaction management module 518 is configured to control and to manage secure transactions between verifiers and clients, i.e., registered users, within a secure transaction environment. Some examples of processes executed by the secure transaction management module 518 are illustrated and described further below with respect to FIGS. 16-20, and 6A-8C and FIGS. 12-13D.

User Registration Process: 1St Example

FIG. 6A is an example flow diagram of a registration process 600 where new users of the system 100 may establish and set up a user account. In other words, with the registration process 605 new users may register for access to the secure transaction environment managed and controlled by the ST server 104. In some examples, the registration process 600 occurs via the secure transaction website or web interface hosted by the ST server 104 accessed with the user device 102. For example, the registration process 600 is carried out primarily at the secure transaction website or web interface hosted by the ST server 104 accessed with the user computer 102B. As will be described in other examples, such as FIG. 6C, at least one part of the registration process 600 (e.g., the user account activation process) involves other user devices 102, such as the user's mobile communication device 102A.

As indicated by the framework of the registration process 600 illustrated in FIG. 6A, a portion of the registration process 600 represents operations carried out by the registering user via interaction by the user with user interfaces (e.g., graphical user interfaces GUIs) displayed on the monitor 318 of the user computer 102B. This portion of the registration process 600 carried out by the user computer 102B is designated by the portion to the left of central vertical line and centered under the heading "User Computer." In some examples, the ST server 104 controls these user interfaces through the website or web interface accessed by the user via the user computer 102B, based on user interaction with one or more of the user computer input peripherals 314, such as, mouse, keyboard, touch screen, microphone, etc. Another portion of the registration process 600 designated to the right of the central vertical line in FIG. 6A under the heading "ST Server" illustratively represents a portion of the registration process 600 where the processor(s) 400 are configured to execute one or more software applications. In some examples, this portion of the registration process 600 stores instructions executable by the processor(s) 400 of the ST server in the user registration module 512 (see FIG. 5).

Some portions of the registration process 600 are additionally illustrated in FIGS. 7A-7E. Generally, FIGS. 7A-7E are schematic diagrams in the form of screenshots as examples to graphically represent the secure transaction web interface or website hosted by the ST server 104. Where applicable, the following description of the registration process 600 will refer to these schematic diagrams. For example, these screenshots are in the form of GUIs generated and controlled by the ST server 104 and displayed on the monitor 318 of the user computer 102B.

Figures 7A, 7B:
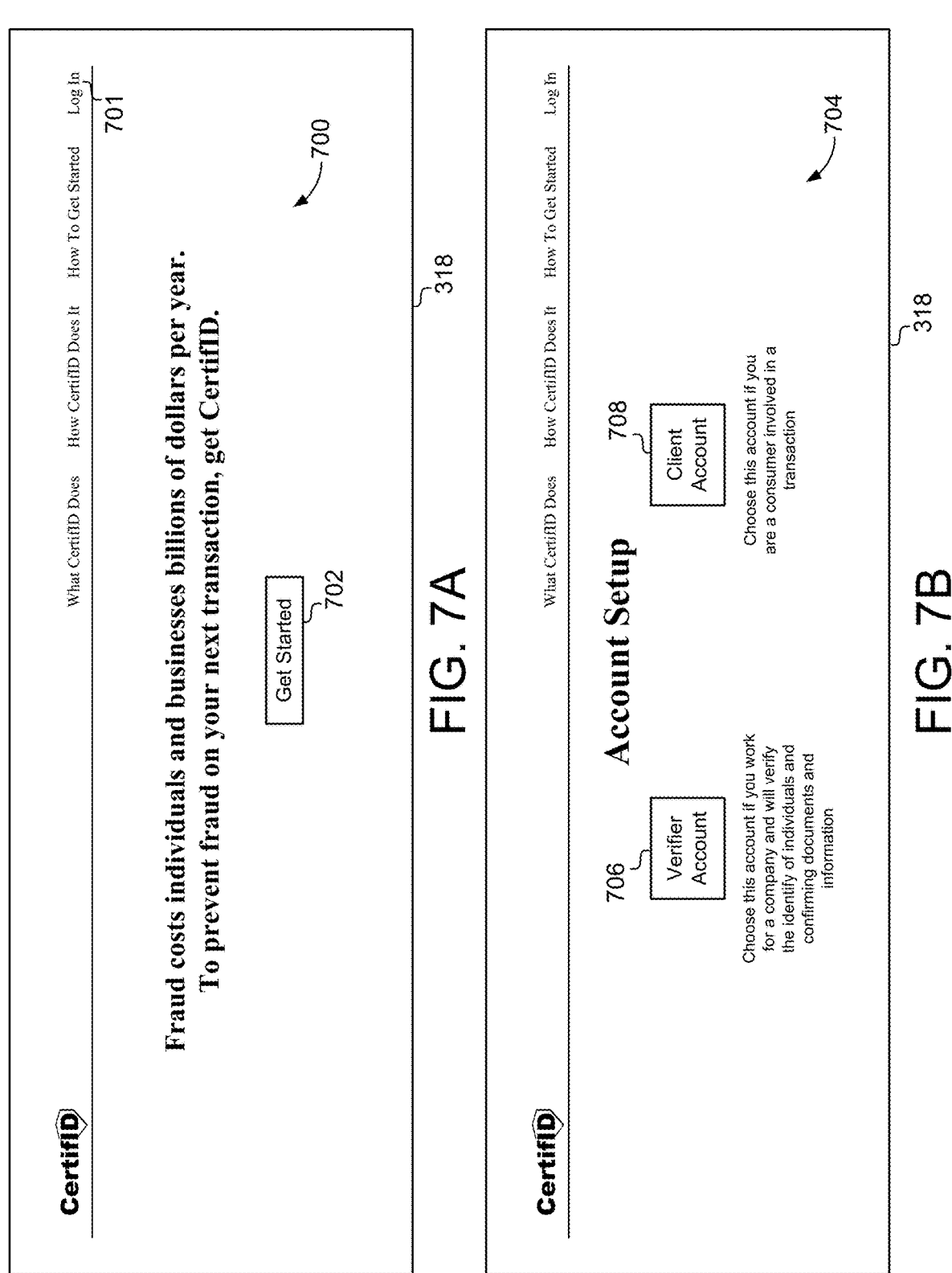
FIG. 7A is a schematic view of an example home page of a secure transaction website hosted by one or more secure transaction servers.
FIG. 7B is a schematic view of an example user registration GUI produced by one or more secure transaction servers as part of a user registration process.
Figures 1, 7C:
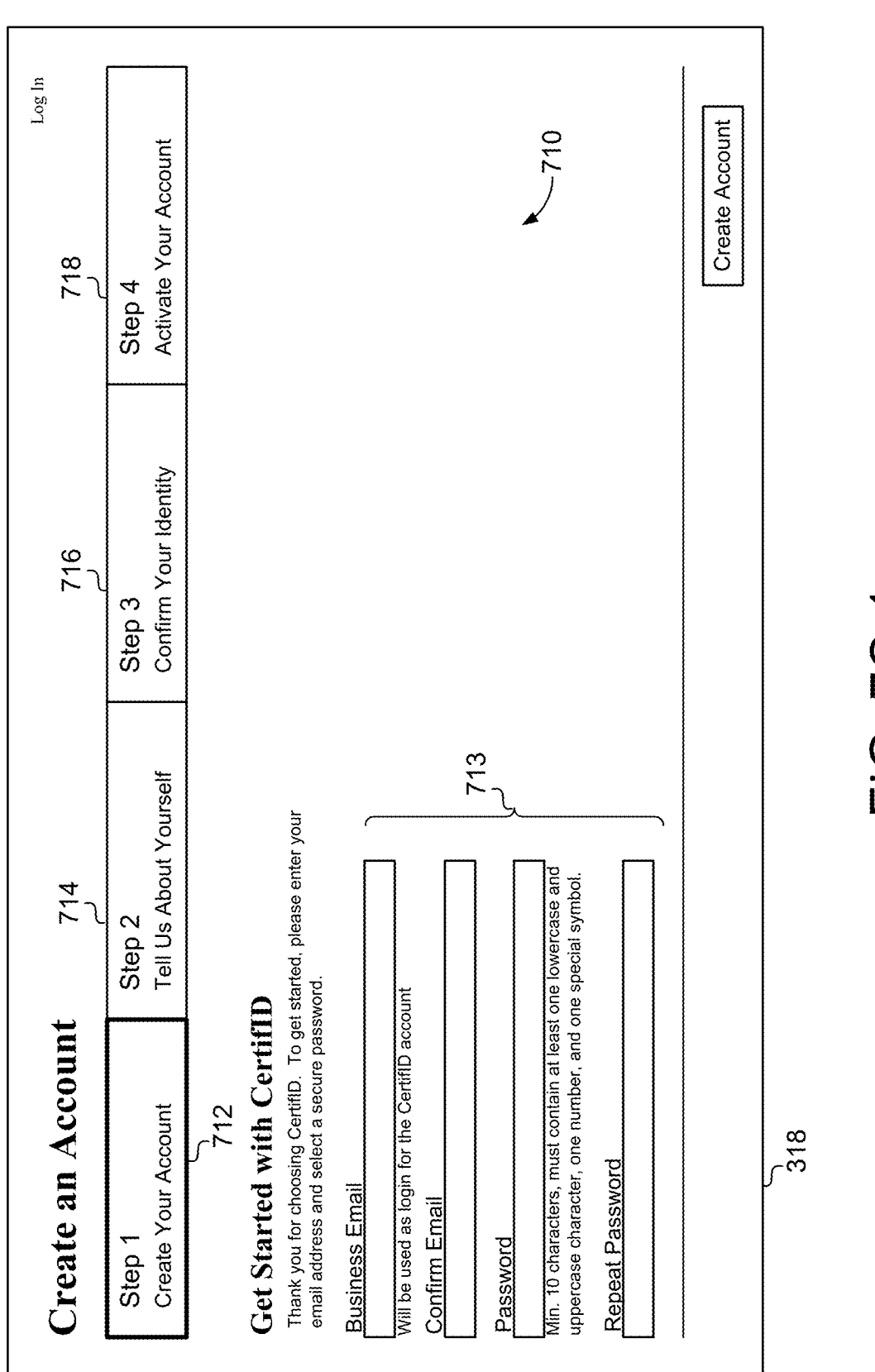
Figures 2, 7C:
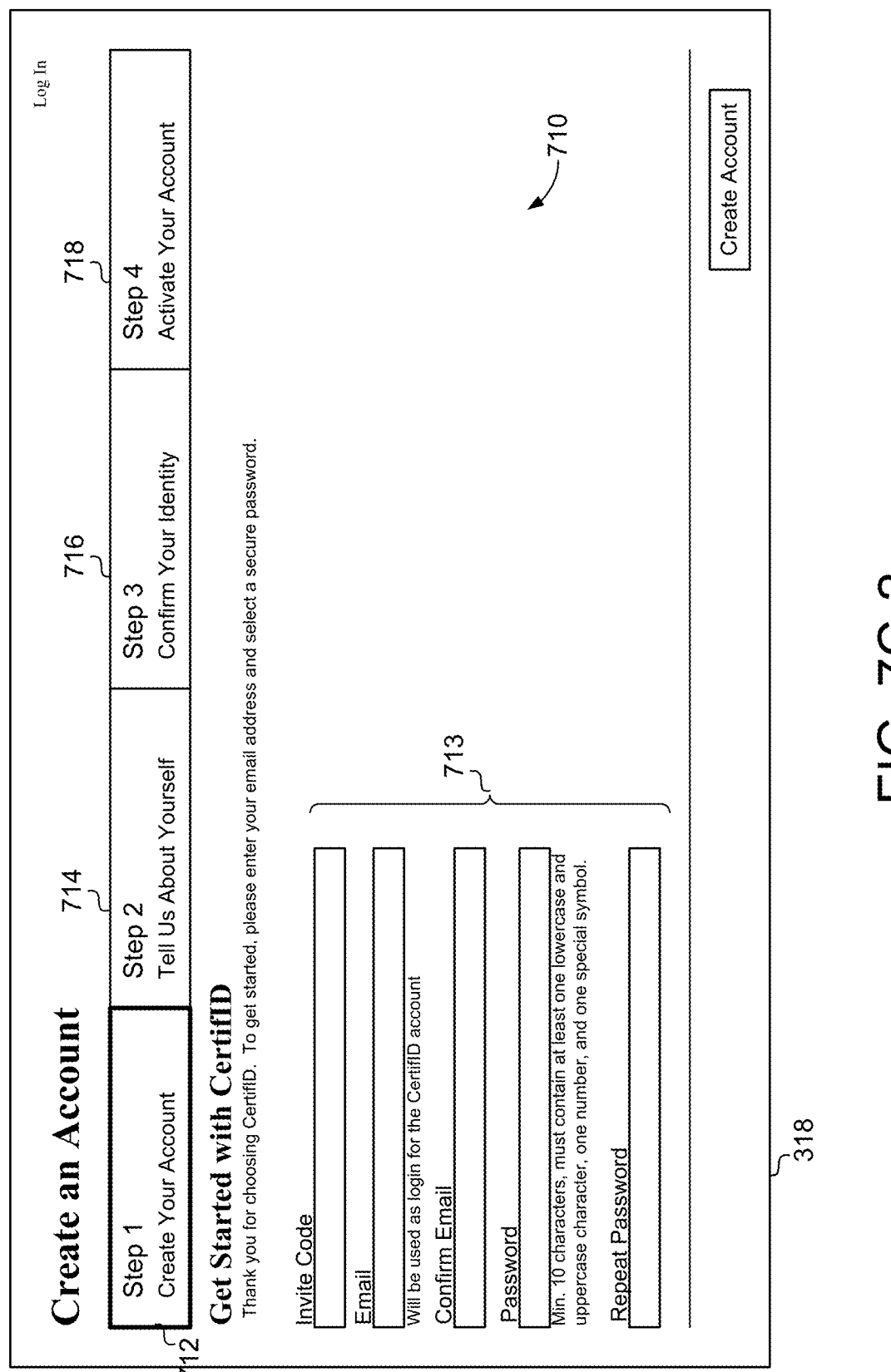
Figures 1, 7D:
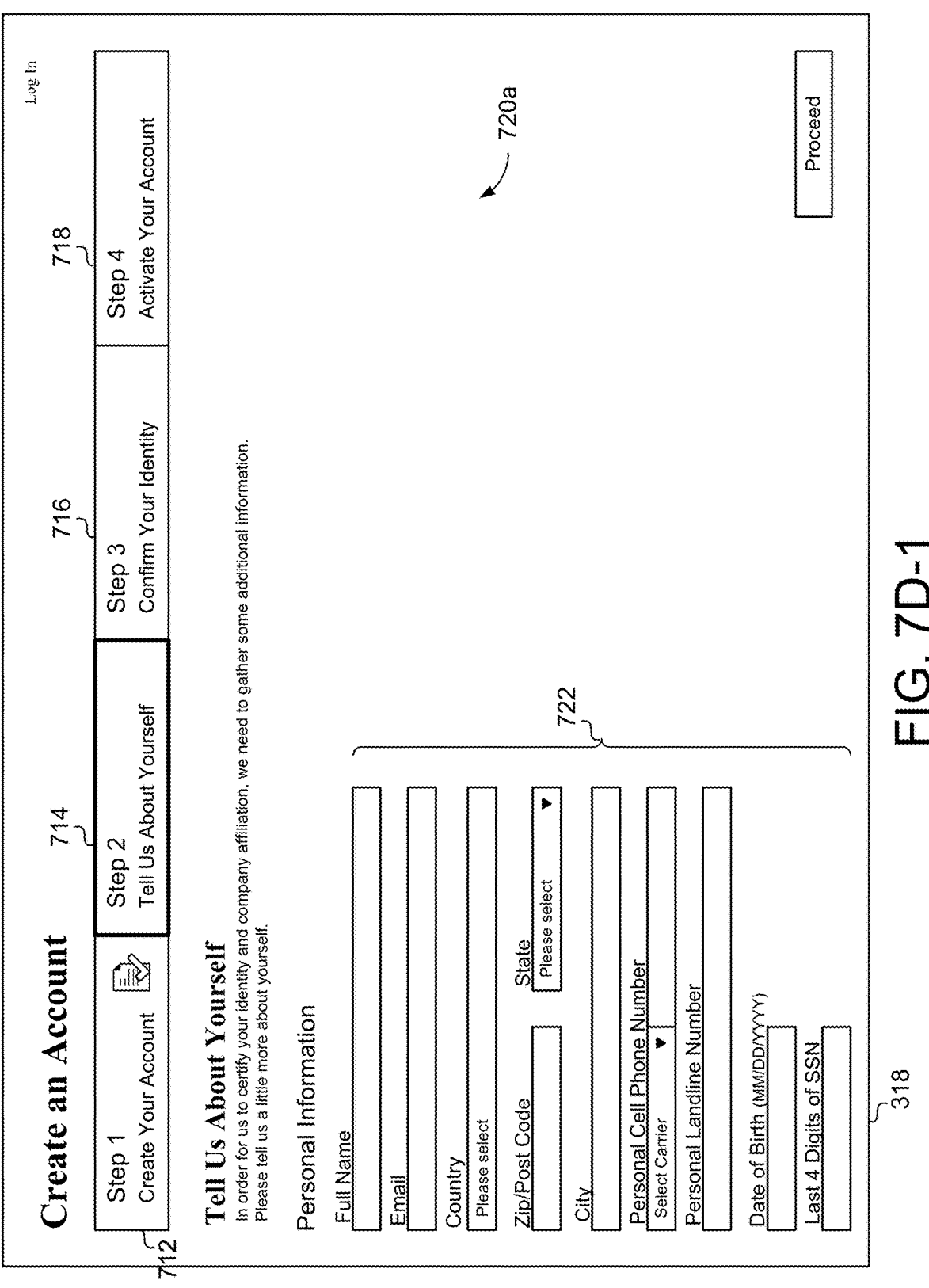
Figures 2, 7D:
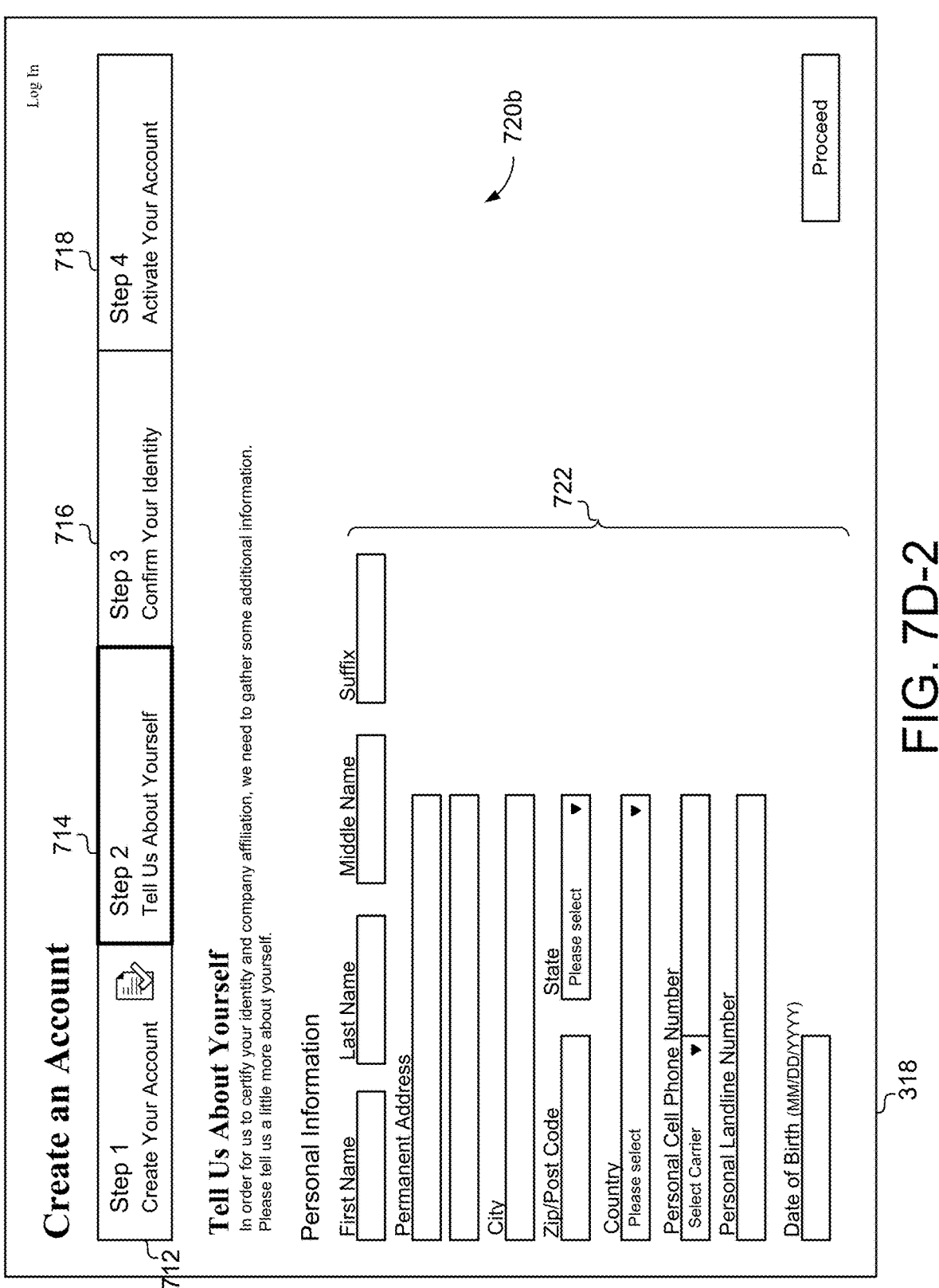
Figure 7E:
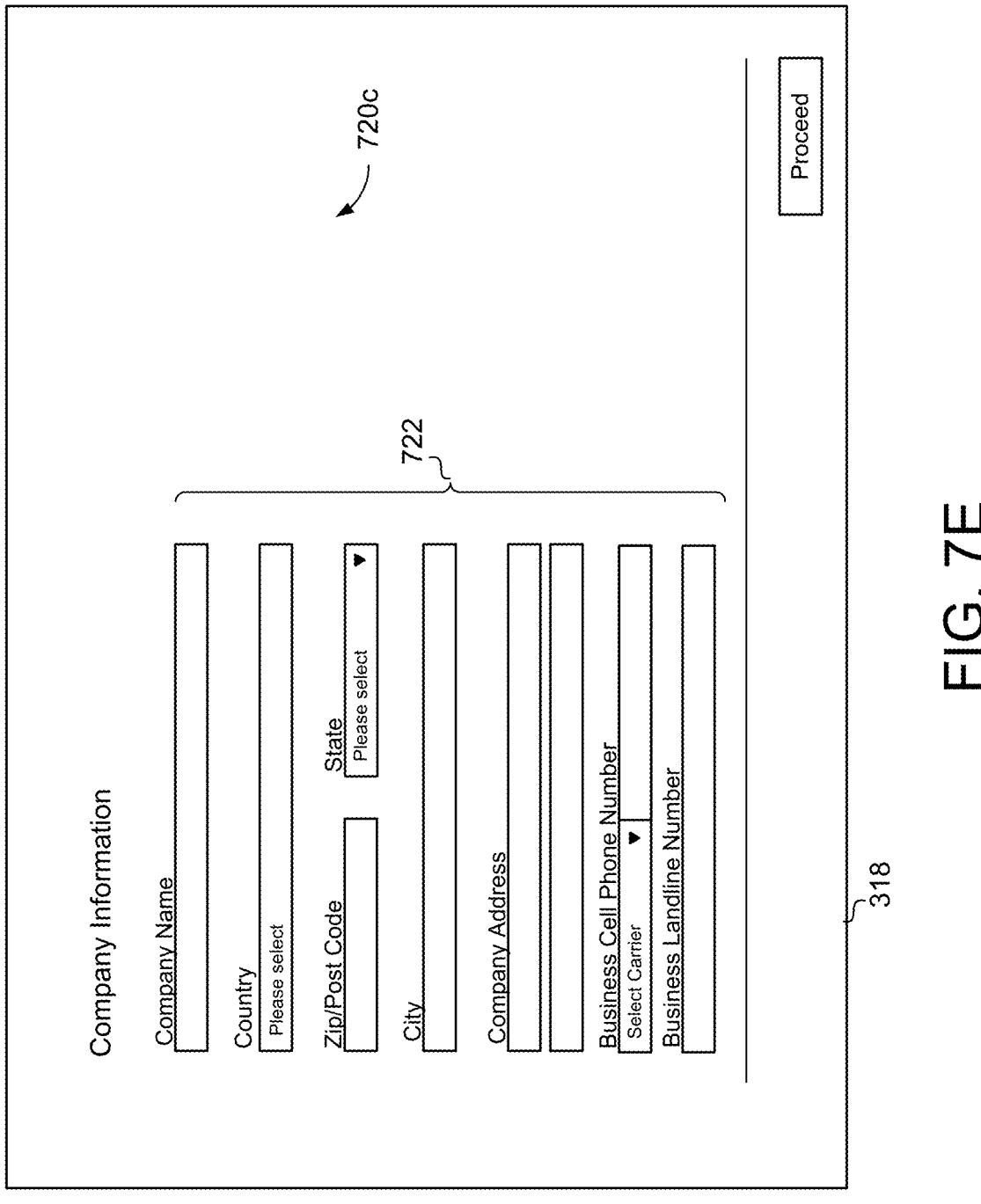
FIG. 7E is a schematic view of an example user information entry GUI produced by one or more secure transaction servers as part of a user registration process.

At step 602 of the registration process 600, a new user of the secure transaction system 100 controls a user device 102 (e.g., a user computer 102B) to access the secure web page (SWP) or web interface hosted by the ST server 104. For example the new user types the URL of the SWP into the web browser 304. At step 604, the ST server 104 is operable to control the secure web page or web interface to display a user registration interface. For example, FIG. 7A depicts the SWP displaying a home page 700 including a selectable GUI element 702 (e.g., shown as "Get Started"). In response to a user selection of the GUI element 702, the ST server 104 is operable to control the SWP to display an account setup page 704 (FIG. 7B) including a selectable verifier account GUI element 706 and a selectable client account GUI element 708. To reiterate, verifier users are distinguishable from client users in that "verifiers" or "enterprise user," are generally individuals who work for a business enterprise and, in the course of business undertaken by the enterprise, will conduct, or be involved in conducting, at least one secure transaction with at least one individual during which the verifier will verify the identity of the at least one individual and/or will confirm documents and/or other information. "Clients" are generally individuals who will conduct, or be involved in conducting, at least one secure transaction with at least one verifier. The account setup processes for verifiers and clients are identical in many respects, and the following description will set forth an example of the registration process 600 for a verifier account setup. For example, at step 604, a user who is a verifier will select the "verifier account" GUI element 706, and, in response, the ST server 104 is operable to control the SWP to display a first account creation GUI 710 (FIGS. 7C-1 AND 7C-2). Where appropriate, differences between the registration process 600 for verifiers and clients will be noted.

Referring to FIGS. 7C-1 and 7C-2, the account creation GUI 710 includes a number, e.g., four, of selectable tab GUIs 712, 714, 716 and 718 each identifying and corresponding to a different step in the user registration process 600. In the examples illustrated in FIGS. 7C-1 and 7C-2, the user email and password setup GUI tab 712 is selected (default) and displays user email and password entry/selection GUI elements 713. In the example shown in FIG. 7C-1, the user email and password setup GUI tab 712 for a verifier account illustratively differs from that for a client account, shown in FIG. 7C-2. FIG. 7C-2 differs in that the email GUI element refers to a business email address whereas a similar GUI tab 712 in the client account registration process refers to a personal email address. At step 606 of registration process 600, the user controls a user device (e.g., user computer 102B) to enter the user's email address and selected password into the corresponding displayed email and password GUI elements. For example, the user types the requested information into the corresponding GUI elements with the keyboard or keypad of the user computer 102B.

At step 608, the ST server 104 creates an account for the user by storing the user-entered email and password in the user account data 502. At step 610, the ST server 104 is operable to control the SWP to display a user information GUI 720a, 720b, and 720c, as illustrated by examples in FIGS. 7D-1, 7D-2 and 7E, corresponding to the user information tab 714 of the user account creation GUI 700. As illustrated by the example in FIG. 7D-1, the user information tab 714 illustratively includes GUI elements 722 (e.g., entry fields) for entering the verifier user's personal information, such as, name, address, personal MCD information, date of birth or last four digits of the verifier user's social security number. In some examples, the client user information tab 714 for entering personal information is identical to that illustrated in FIG. 7D-1, although in other examples the client user information tab 714 for entering personal information may be different in that it may require less, more and/or different information, such as the example shown in FIG. 7D-2. For example, the entry fields 722 of FIG. 7D-1 include email while FIG. 7D-2 instead includes an address entry field 722. As further illustrated by the example of FIG. 7E, the verifier user information tab includes GUI elements 722 for entering the verifier user's business information, such as, company name, company address, or business MCD information. Additionally or alternatively, the entry fields 722 may include admin fields that identify an administrator associated with the verifier user information. In some examples, the client user information tab 714 for entering business information differs from that illustrated in FIG. 7E in that similar or identical employer information may not be required or may be optional. In other examples, the client user information tab 714 for entering business information may be identical to that illustrated in FIG. 7E. In any case, at step 612 of the registration process 600, the user controls a user computer 102B to enter the user's personal and (optionally for a client user) business information into the corresponding displayed GUI elements (e.g., by typing the requested information into the corresponding GUI elements via the keyboard or keypad of the user computer 102B).

At step 614, the ST server 104 stores certain user-entered personal and (optionally for a client user) business information in the user account data 502 associated with the user. With the user entered information, the ST server 104 is operable to execute a user information verification process indicated by steps 616A and 616B.

Figures 1, 6B:
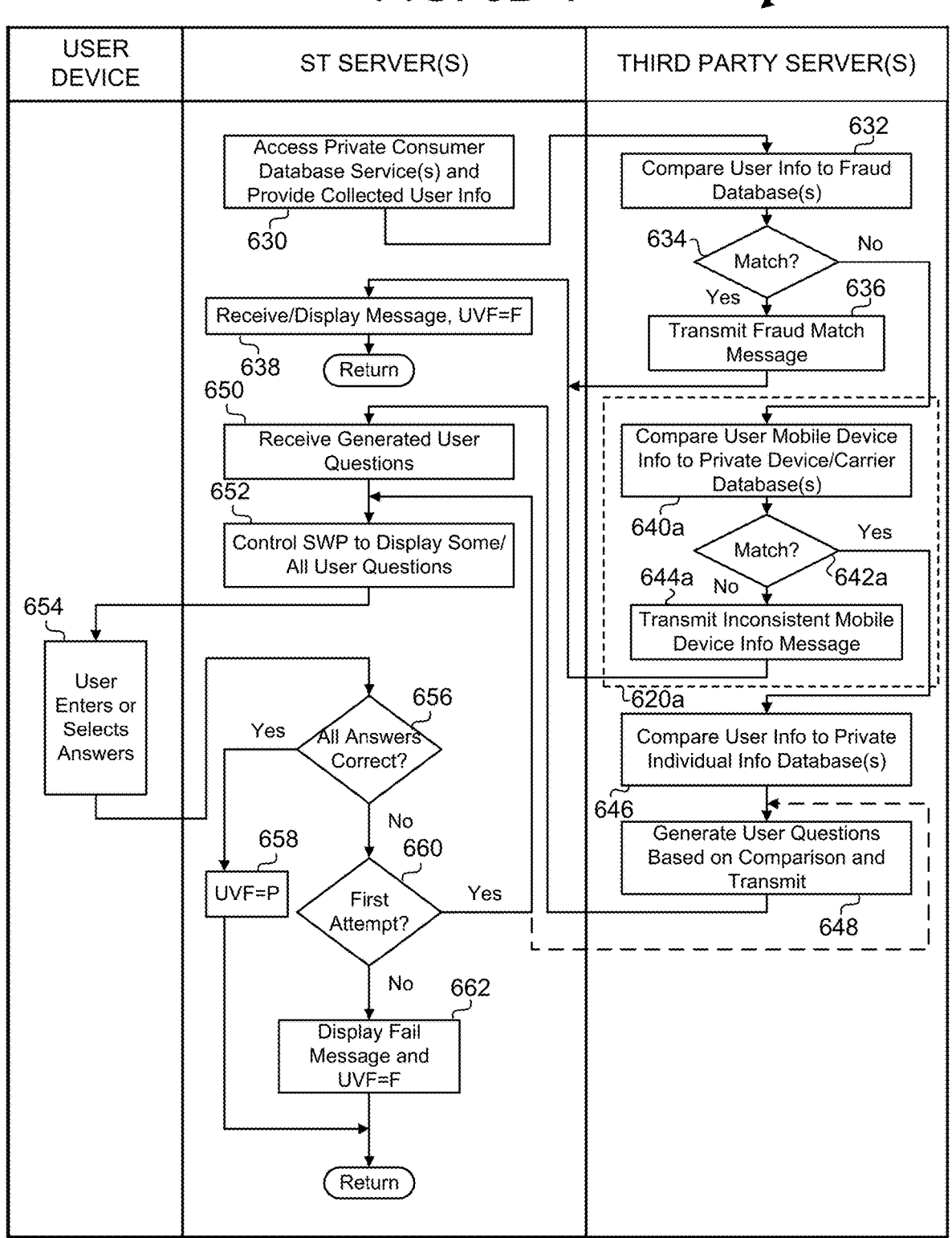
Figures 2, 6B:
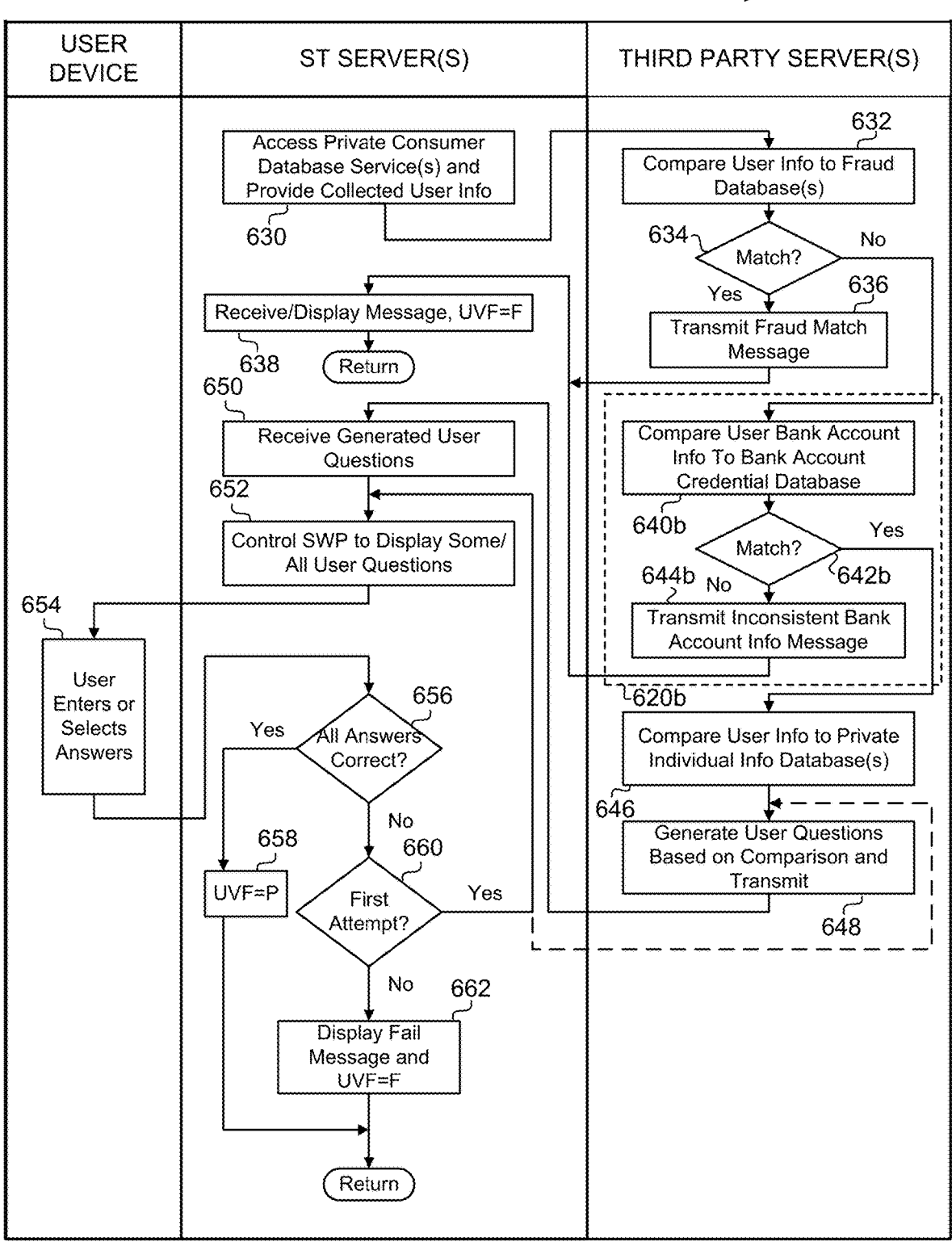

FIGS. 6B-1 and 6B-2 are example flow diagrams of the user information verification process carried out by the ST server 104 at step 616A, 616B of the user registration process 600. In these examples, a combination of the ST server 104, the third party database/systems 112 (see FIG. 1) and the secure transaction website or web interface carries out the user information verification process 616A and 616B.

Like FIG. 6A, FIGS. 6B-1 and 6B-2 are example flow diagrams that divide the user information verification process into columns. Each column represents a component (e.g., ST servers, third party server, user device, etc.) that performs at least one step within the process. A heading at the top of each column designates the component performing the step of the process within each column. Referring to FIGS. 6B-1 and 6B-2, the heading "UC/MP," represents operations carried out by the registering user via interaction by the user with graphic user interfaces (GUIs) displayed on the monitor 318 of the user device (e.g., user computer 102B), although in other examples such operations may alternatively be carried out via the user's mobile communication device as will be described below with respect to FIG. 12.

The heading "ST Server," designates another portion of the process 616A, 616B and is located between the left-most vertical line and the right-most vertical line in FIGS. 6B-1 and 6B-2. The ST server portion represents one or more software applications executed by the processor(s) 400 of the ST server 104. In some implementations, this portion of the process 616A, 616B is stored in the user registration module 512 (see FIG. 5) in the form of instructions executable by the processor(s) 400 of the ST server.

The heading "Third Party Server," designates another portion of the process 616A, 616B, and is located to the right of the right-most vertical line in FIGS. 6B-1 and 6B-2. The third party server portion represents one or more software applications executed by one or more processors of at least one third party server 114. In some examples, this portion of the process 616A, 616B is stored in memory accessible by the third party server 114 in the form of instructions executable by the one or more processor(s), and the process steps of this portion of the process 616A, 616B will therefore be described as such below. In such examples, the third party database/systems 112 operate as one or more database services operable to conduct database searches, process search results, produce one or more reports or other compilation(s) of such results, and provide such report(s) or compilation(s) to the ST server 104. In other examples, the third party database/systems 112 operate more as one or more searchable databases accessible by the ST server 104. In such examples one or more of the steps of the process 616A, 616B shown under the "Third Party Server" heading may alternatively be carried out by the ST server 104.

The one or more third party databases 112 may be so-called private or closed databases in that information about individuals stored therein is (i) generally not freely accessible by the public, but rather is accessible only on a subscription or one-time pay basis, and (ii) generally restricted in its use (e.g., may not be used for fraudulent or unlawful purposes, etc.). Some examples of third party databases include one or more fraud databases, such as, one or more databases containing identities of known fraudsters like the International Fraud Consortium database(s), the National Fraud Database, etc., one or more past and present residential and/or commercial addresses associated with individuals, one or more past and present property (e.g., real estate, motor vehicle, recreational vehicle, etc.), ownership databases, Department (or Bureau) of Motor Vehicles database, one or more financial information databases (e.g., past and present banking, bank account credentials, bank account signatory(ies), credit card, etc.), one or more credit score databases, one or more marital records databases, one or more criminal records databases, and the like. In some implementations, the one or more third party database services related to the process 616A, 616B shown under the "Third Party Server" heading in FIGS. 6B-1 and 6B-2 may include at least one third party database service having access to multiple such closed or private databases. Some examples of such third party database services include TransUnion LLC, Equifax, Inc., LexisNexis Corporation, Fiserv and the like.

The process 616A, 616B illustrated in FIGS. 6B-1 and 6B-2 begins at step 630 where the ST server 104 accesses one or more of the third party database services and provides the user information (UI) collected during the registration process 600. In some examples, the one or more third party database services include a fraud database search service. At step 632, the process 616A, 616B compares the UI to one or more fraud databases (i.e., one or more databases of known fraudsters) using at least one of the one or more third party database servers 114. At step 634, the process 616A-B determines whether a match is found. When a match occurs, the process 616A, 616B, at step 636, transmits a fraud match message to the ST server 104 via the third party database server 114. At step 638, the ST server 104 receives the fraud match message. In some examples, the ST server 104 is further operable, at step 638, to control the SWP to display a suitable message to the user. In any case, the ST server 104 sets a user verification flag (UVF) to "Fail" or "F" at step

638 and the process 616A, 616B is returned to step 616A, 616B of the registration process 600.

Referring to FIG. 6A, the registration process 600 advances from step 616A, 616B to step 618 where the ST server 104 checks the status of the UVF flag. If UVF=F, such as when the identity of the user is found in the process 616A, 616B to exist in one or more fraud databases, the registration process 600 advances to step 624, where the ST server 104 is operable to control the SWP to display a suitable message and then terminate the session. Thus, in the illustrated example, when any registering user is found to exist in one or more fraud databases, the user registration terminates and the user will not be allowed to activate a user account with the secure transaction system 100.

Referring again to FIGS. 6B-1 and 6B-2, when the third party database server 114 determines that the UI does not match any individual in the one or more fraud databases, the process 616A, 616B advances to step 640 where the third party database server 114 is operable to compare the user's MCD information to one or more private MCD information databases. When, at step 642, a match is not found linking the MCD information to the user, the process 616A, 616B advances to step 644A, 644B where the third party database server 114 transmits a suitable inconsistent MCD information message to the ST server 104. At step 638, the ST server 104 receives the inconsistent mobile communication device information message. In some examples, the ST server 104 is further operable, at step 638, to control the SWP to display a suitable message to the user, and in any case the ST server 104 sets a user verification flag (UVF) to "Fail" or "F" at step 638 such that the user registration process 600 terminates.

As briefly described above and as will be described in greater detail below, an example of the process 616A, shown in FIG. 6B-1, includes mobile communication device identification and comparison steps 640A, 642A as part of the user registration process 600, and tethers the user's verified identity to the user's mobile communication device. Thus, a mismatch between the MCD information provided by the user and MCD information found in one or more mobile communication device/carrier databases is a possible indicator that the registering user may be a fraudster. In this case, FIGS. 6A and 6B-1 illustrate the user registration process 600 is thus terminated upon such a finding. In some other examples in the registration process 600, steps 640A and 642A may be carried out earlier, later, or omitted altogether or in favor of one or more other mobile communication device identification steps. In the event that the user mistakenly entered one or more aspects of the MCD information at step 612 of the user registration process 600, the user may correct this mistake by re-starting the user registration process, or at least by re-executing step 612.

Another example of the process 616B, shown in FIG. 6B-2, includes banking information identification and comparison steps 640B, 642B as part of the user registration process 600. Banking information identification and comparison steps 640B, 642B confirm the bank account credentials provided by a user through a third party database server. A mismatch between the bank account information provided by a user (as may be entered by the enterprise user) and the bank account credentials found in one or more third party databases is a possible indicator that the registering user may be a fraudster; thus the user registration process 600 may terminate upon such a finding as shown in FIGS. 6A and 6B-2. Steps 642B and 642B may be carried out earlier or later in the registration process 600 or may instead be omitted altogether or in favor of one or more other bank account credential verification steps. In the event that the enterprise user or user mistakenly entered one or more aspects of the bank account information at step 612 of the user registration process 600, the user may correct this mistake by re-starting the user registration process, or at least by re-executing step 612.

From the "YES" branch of step 642A, 642B, the process 616A, 616B proceeds to step 646 where the third party server 114 is operable to compare the user-entered information (UI) to one or more closed or private individual information databases, and, thereafter at step 648, the third party server 114 is operable to generate, based on results of the comparison, a number of questions designed to test the user's knowledge about the user's past and/or current user information, and to transmit such questions to the ST server 104. The generated user test questions will be so-called "out-of-wallet" questions, such that the answers are not easily obtainable by potential fraudsters. Generally, the one or more questions may relate to any subject of information found about the user in the one or more individual information databases. Some examples include current or prior residential and/or commercial addresses associated with the individual, past or present property (e.g., real estate, motor vehicle, recreational vehicle, etc.), owned or leased by the individual, past or present licenses (e.g., motor vehicle, professional, firearm, etc.) held by the individual, past or present financial information relating to the individual (e.g., bank accounts, credit cards, etc.), past or present spouses and/or other family members, criminal history and/or other legal infractions, etc. Typically, each test question will include one correct answer (i.e., one bit or set of information that is consistent with information found about the individual at step 646), and one or more incorrect answers (i.e., one or more bits or sets of information that is/are not consistent with information found about the individual at step 646).

Figure 7F:
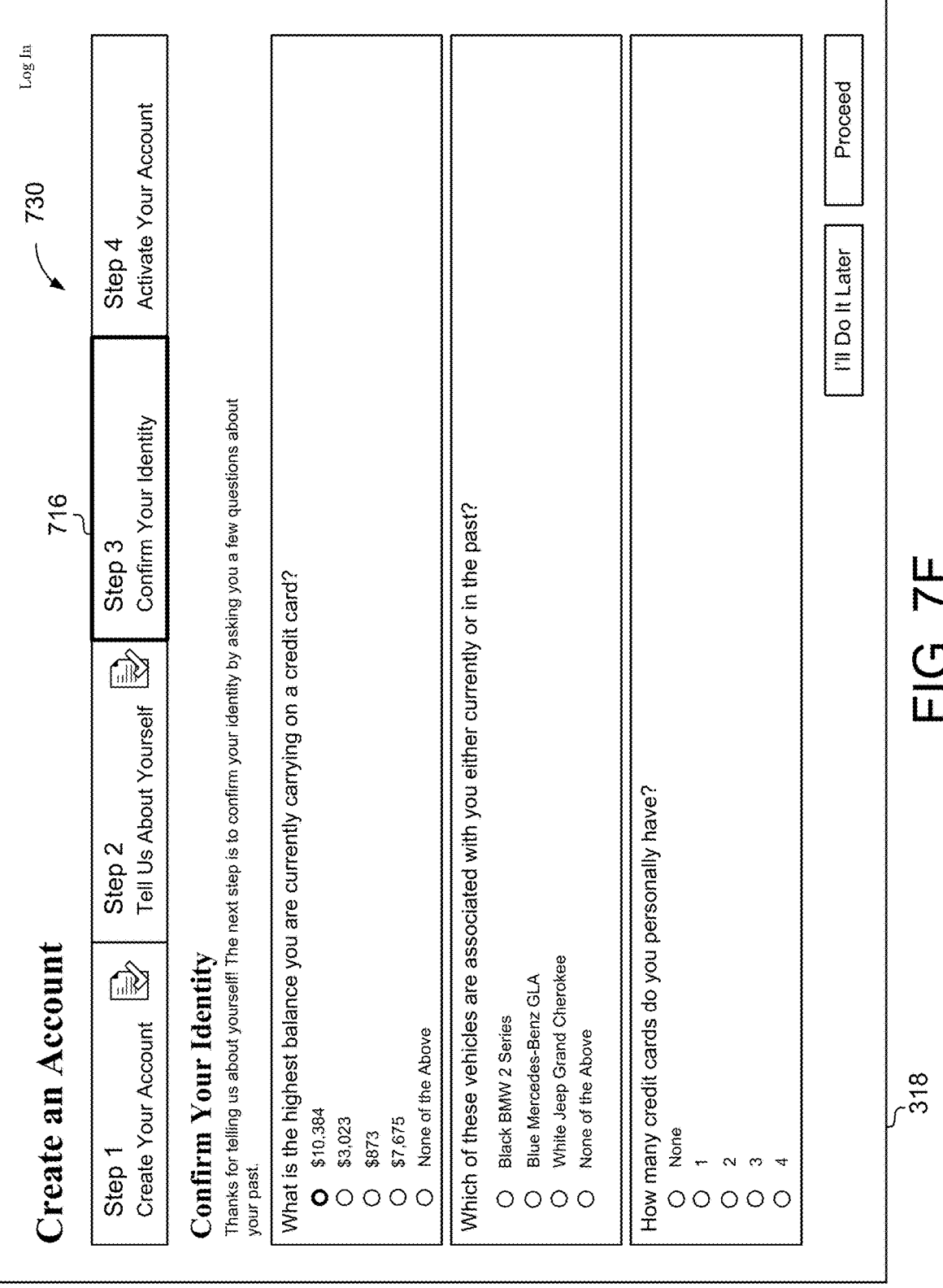
FIG. 7F is a schematic view of an example user questionnaire GUI produced by one or more secure transaction servers as part of a user information verification process.

At step 650, the ST server 104 is configured to receive some or all of the user questions generated by the third party server 114. At step 652, with the user questions, the ST server 104 is configured to control the SWP to display some or all of the received user questions. The third party server 114 may generate any number of questions and transmit all or a subset to the ST server 104. In some examples, the number of user questions displayed at step 652 ranges between three and five. In other examples the ST server 104 controls the SWP at step 652 to display more or fewer questions. In any case, at step 654, the registering user enters or selects answers to the displayed questions. FIG. 7F is an example GUI 730 produced by the ST server 104 at step 652. In FIG. 7F, the identity information confirmation tab 716 includes GUI elements (e.g., entry fields) for entering answers to three user information questions. In this example, the first question relates to current balance(s) carried by the registering user on one or more of the user's credit card(s) and includes five selectable answers, only one of which is correct. The second question relates to vehicles historically owned or leased by the registering user and includes four selectable answers, only one of which is correct. The third question relates to the total number of credit cards currently carried by the registering user, and includes five selectable answers, only one of which is correct.

Referring again to both FIGS. 6B-1 and 6B-2, the process 616A, 616B at step 656, the ST server 104 receives and processes the answers selected by the user at step 654 to determine whether the user has answered all questions correctly. When correct, the process 616A, 616B advances to step 658 where the ST server 104 is operable to set the user verification flag, UVF=Pass or "P," and the process 616A, 616B returns to the registration process 600 of FIG. 6A. When the ST server 104 determines that the user has not answered all questions correctly, the process proceeds to step 660 where the ST server 104 is configured to determine whether the most recent execution of step 654 by the registering user represents a first attempt by the registering user to answer the user information verification questions. If so, the process 616A, 616B may loop back to step 652 where the ST server 104 is operable to re-display the user questions or to display a new set of user questions. When instead the ST server 104 determines at step 660 that the most recent execution of step 654 by the registering user represents a second attempt by the registering user to answer the user information verification questions, at step 662 of the process 616A, 616B, the ST server 104 is configured to display a suitable failure message, to set UVF=F, and to return to the registration process 600 of FIG. 6A. Here the number of attempts until failure is determined is two, however, the process may be configured to accept any number of failure attempts based on design preferences.

Referring back to FIG. 6A, the registration process 600 advances from the user information verification process step 616A, 616B to step 618 where the ST server 104 is operable to determine the status of the user verification flag, UVF. When UVF is set to "F", the registration process 600, as discussed above at step 624, terminates without completing the registration process. When instead UVF is set to "P", The "P" indicates that the registering user successfully completed the user information verification process 616A, 616B. Here, the registration process 600 advances to step 620 where the ST server executes a user authentication process 620A, 620B.

Figures 1, 6C:
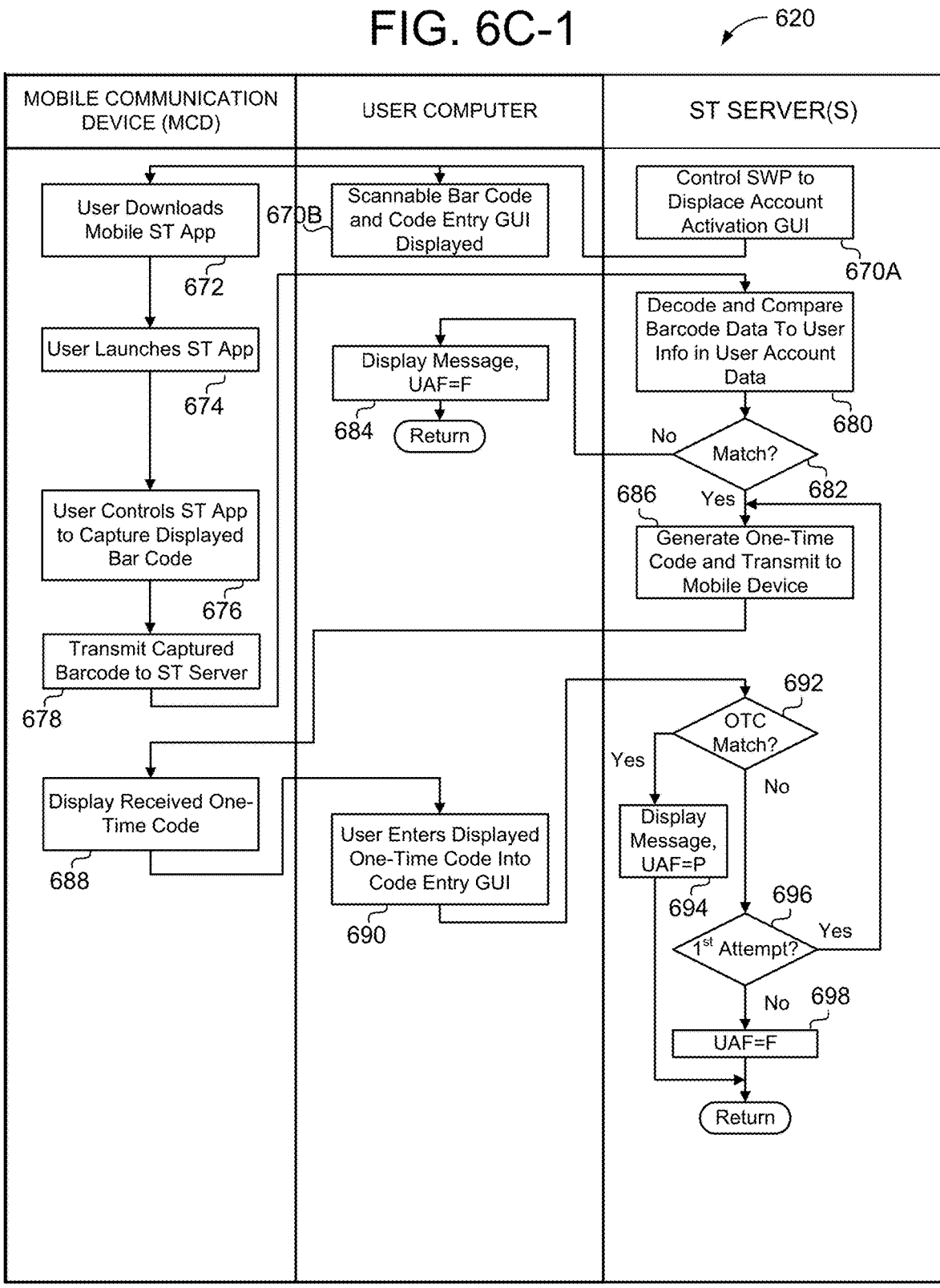
Figures 2, 6C:
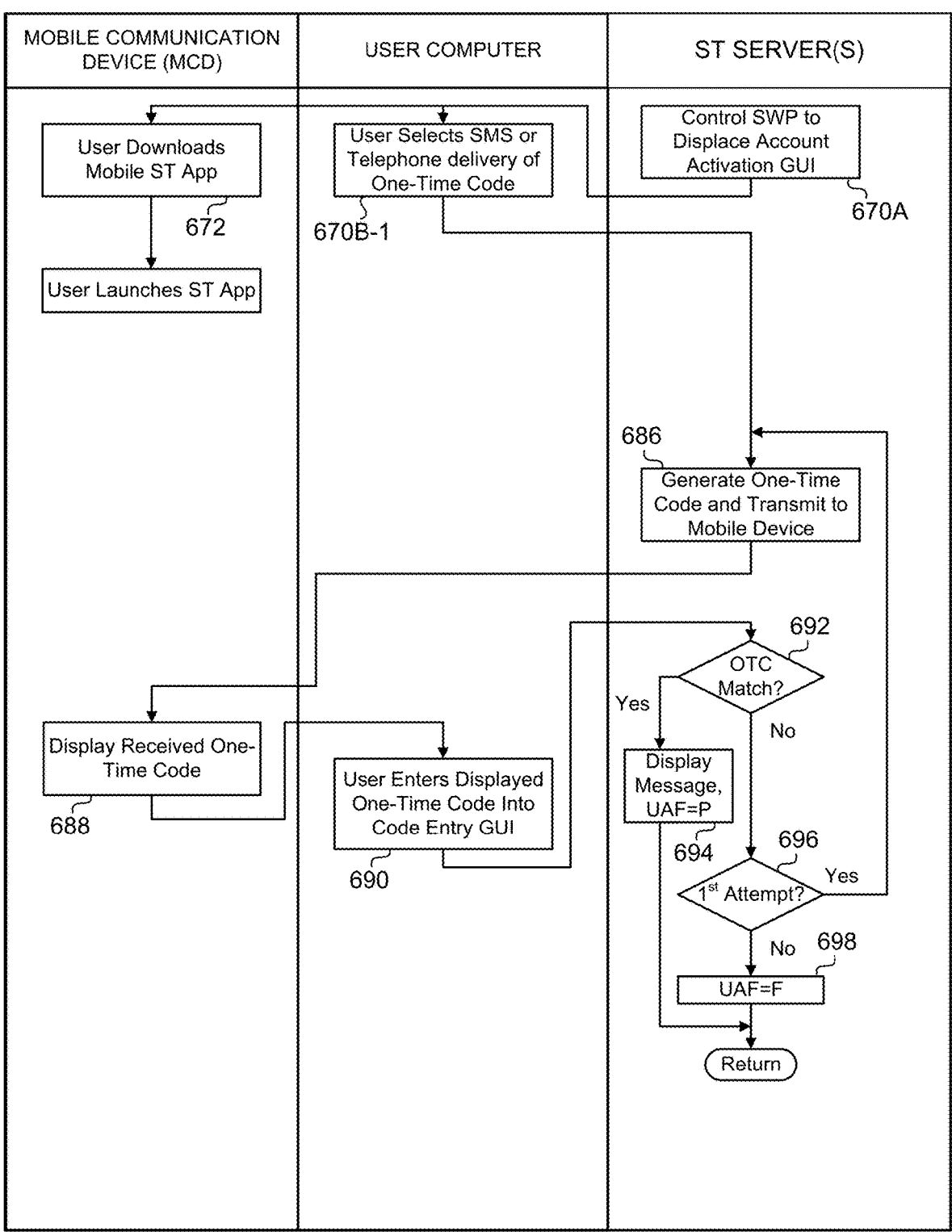
Figures 3, 6C:
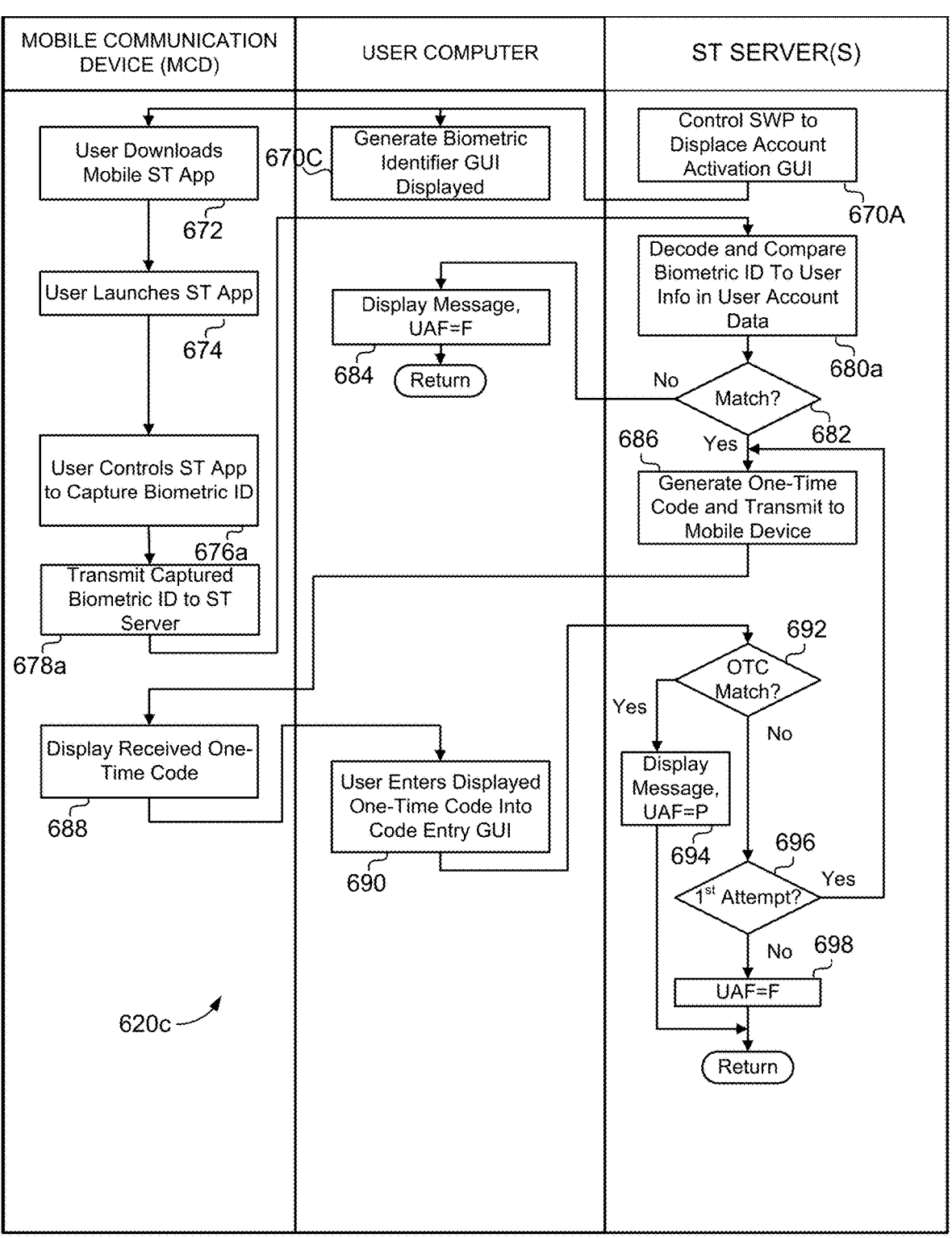

FIGS. 6C-1, 6C-2, and 6C-3 are flow diagrams of three examples of the user authentication process 620 carried out by the ST server 104 at step 620A-C of the user registration process 600. As illustrated by FIGS. 6C-1 and 6C-2, the user authentication process 620A, 620B is carried out via a combination of the ST server 104, the secure transaction website or web interface, and the user's mobile communication device 102A. FIGS. 6C-1, 6C-2, and 6C-3 are example flow diagrams that divide the user verification process into columns. Each column represents a component (e.g., ST servers, third party server, user device, etc.) that performs a step within the process. A heading at the top of each column designates the component performing the process step within each column. Referring to FIGS. 6C-1, 6C-2, and 6C-3, the heading "Mobile Communication Device," represents operations executed by the registering user's mobile communication device 102A and/or operations carried out by the registering user via interaction by the user with the user's mobile communication device 102A. In some examples, this portion of the process 620A, 620B includes the ST App 220 stored in the memory 204 (and/or data storage 206) of the registering user's mobile communication device 102A in the form of instructions executable by the processor 200 of the registering user's mobile communication device 102A.

Figure 12:
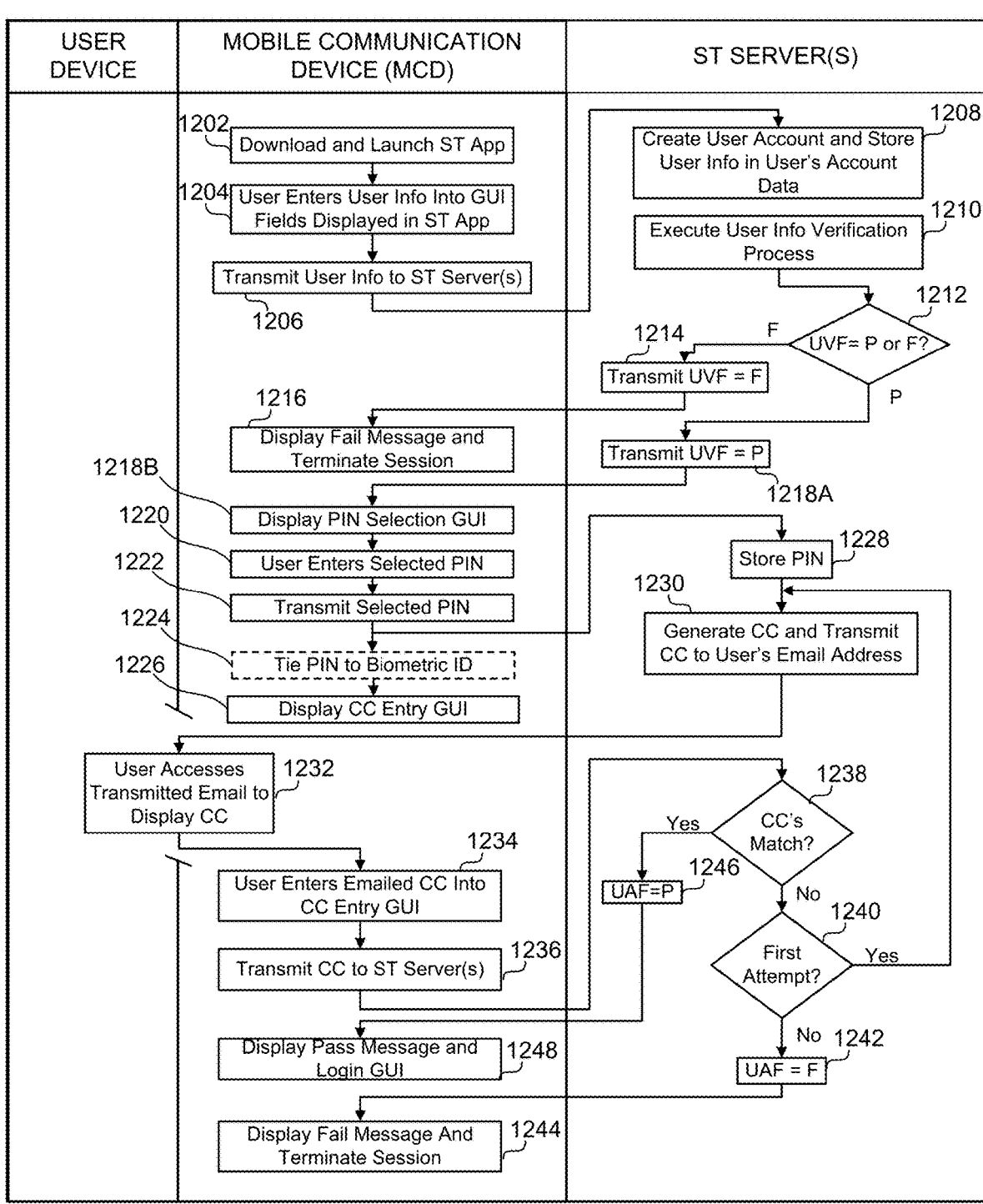
FIG. 12 is a flow diagram of an example of a user registration process for establishing a user account and verifying an identity of the user via a secure transaction application executed by a mobile communication device.

Another portion of the process 620A, 620B, i.e., the portion between the left-most and right-most vertical lines and centered under the heading "User Computer," illustratively represents operations carried out by the registering user via interaction by the user with graphic user interfaces (GUIs) displayed on the monitor 318 of the user computer 102B, although in other examples such operations may alternatively be carried out via the registering user's mobile communication device 102A as will be described below with respect to FIG. 12.

The remaining portion of the process 620A, 620B, i.e., the portion to the right of the right-most vertical line in FIGS. 6C-1, 6C-2, and 6C-3, and centered under the heading "ST Server," illustratively represents one or more software applications executed by the processor(s) 400 of the ST server 104. In one example, this portion of the process 620A, 620B is illustratively stored in the user registration module 512 (see FIG. 5) in the form of instructions executable by the processor(s) 400 of the ST server, and the process steps of this portion of the process 620A, 620B will therefore be described as such below.

Figures 2, 7G:
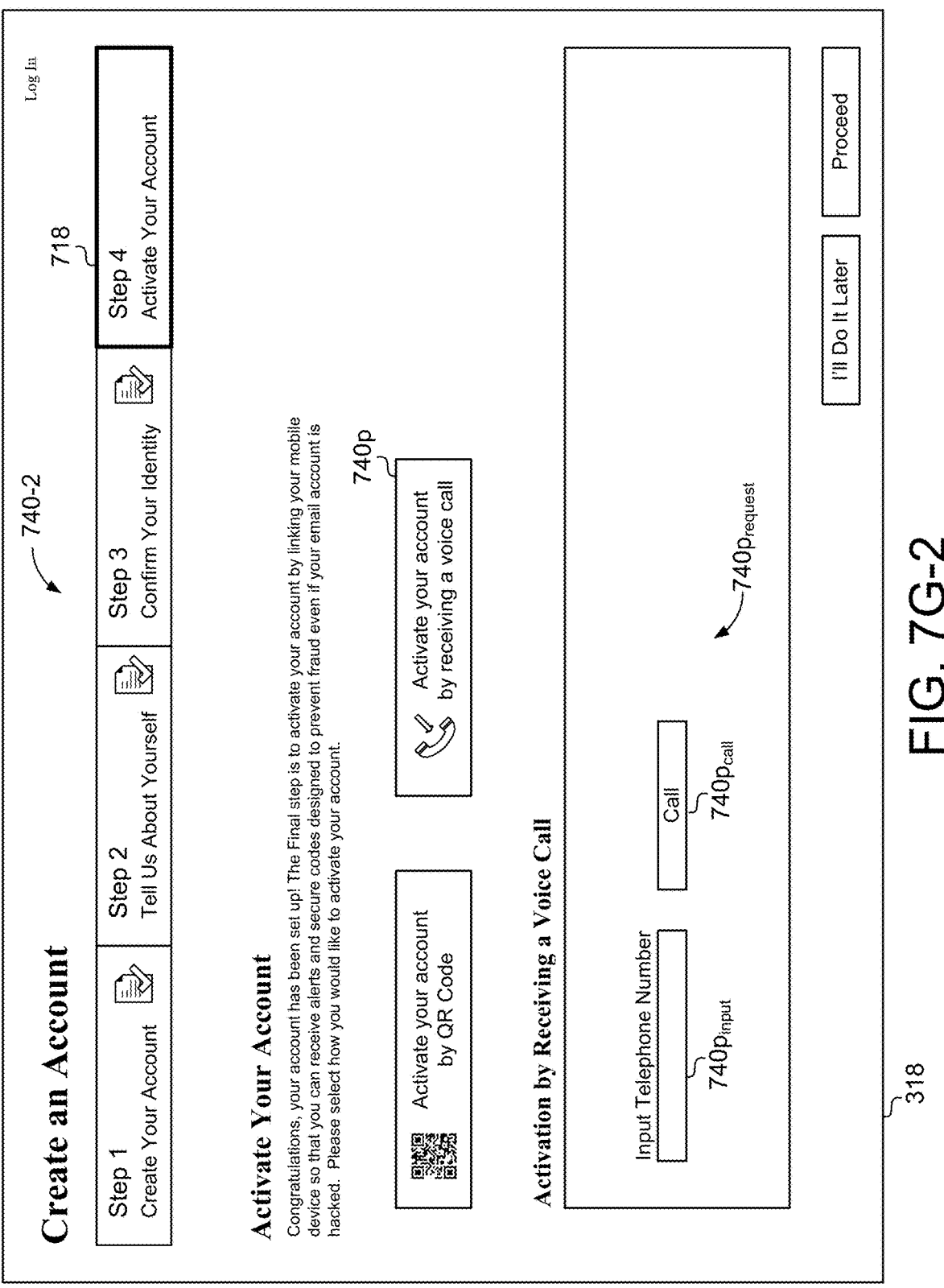
Figure 7H:
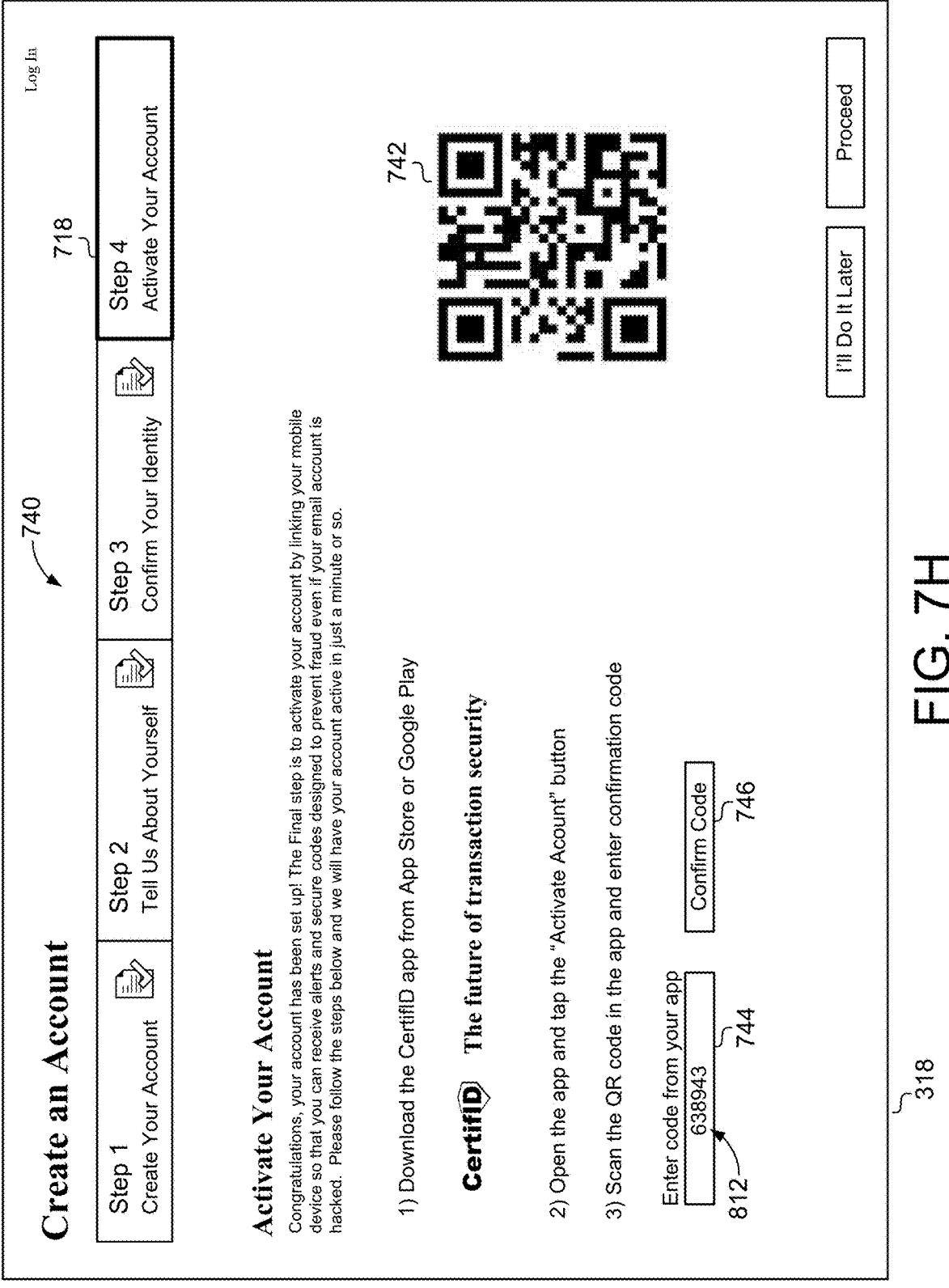
FIG. 7H is a schematic view of a user authentication GUI as an example of a confirmation code entered therein by a user as part of a user authentication process.
Figure 71:
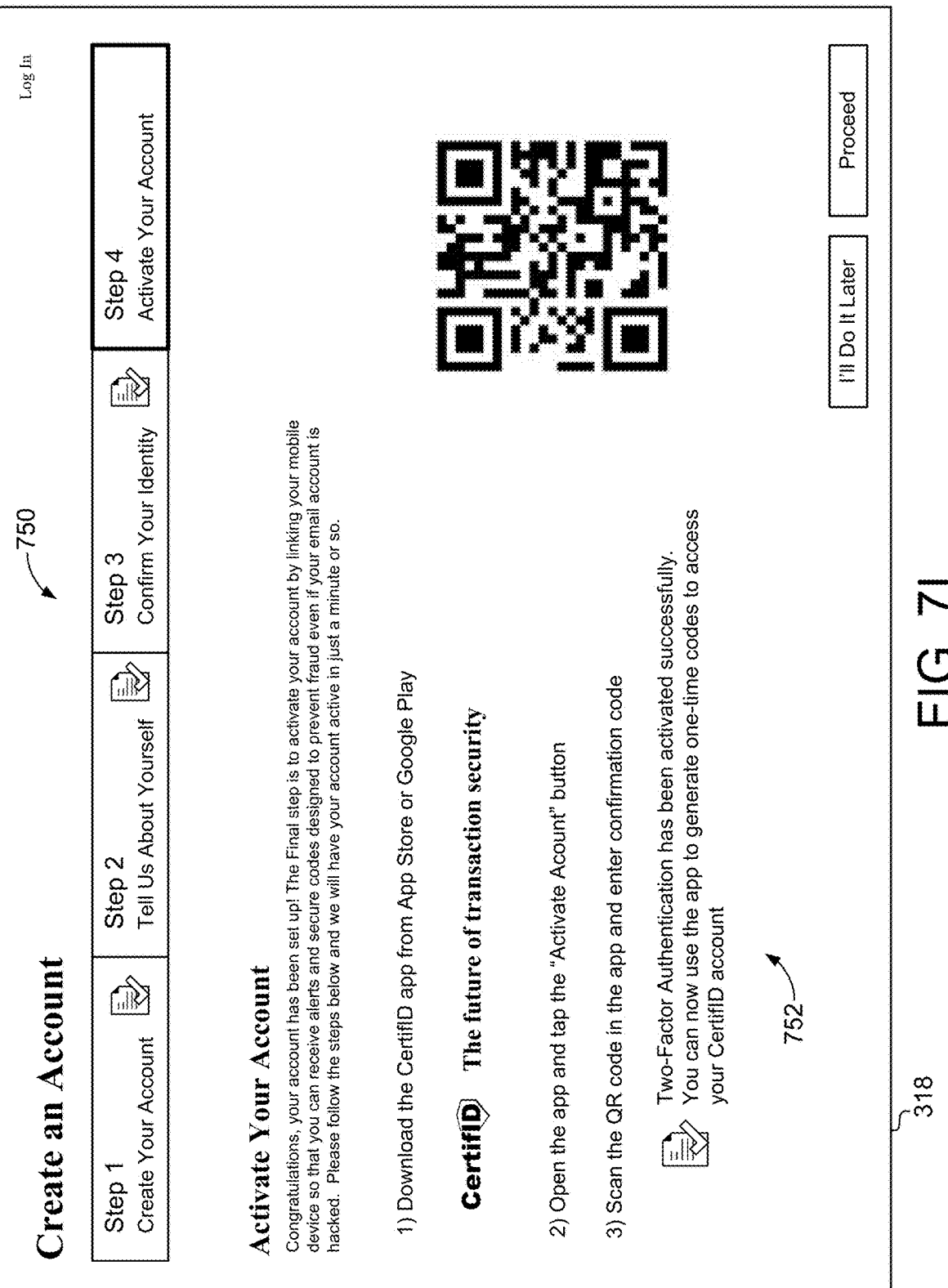
Figures 7J, 7K:
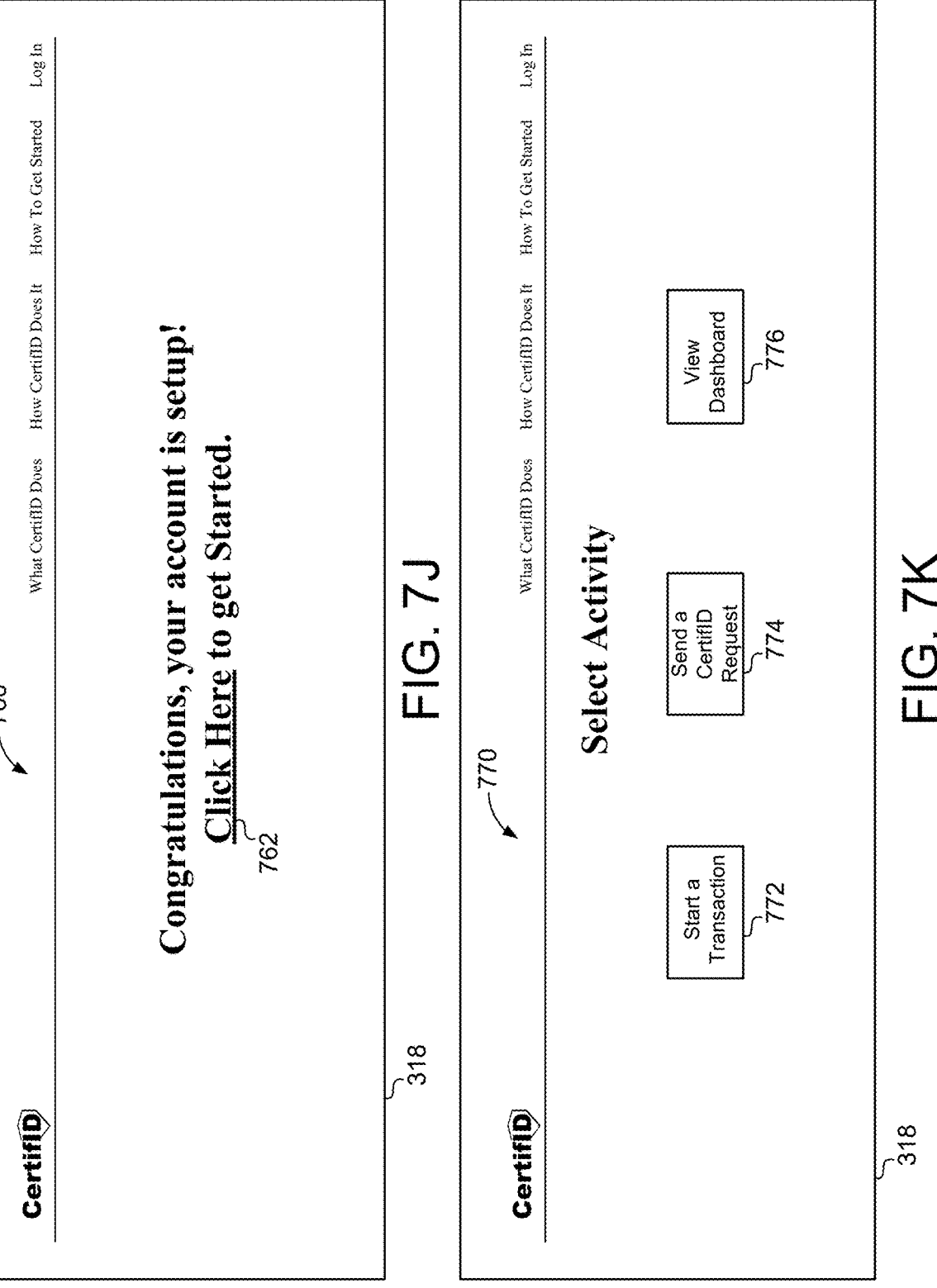
FIG. 7J is a schematic view of an example user registration success GUI produced by one or more secure transaction servers as part of a user registration process.
FIG. 7K is a schematic view of an example secure transaction home page, as part of a secure transaction environment controlled and managed by one or more secure transaction servers, produced by one or more secure transaction servers following successful registration and login by a user of a secure transaction system.
Figure 8A:
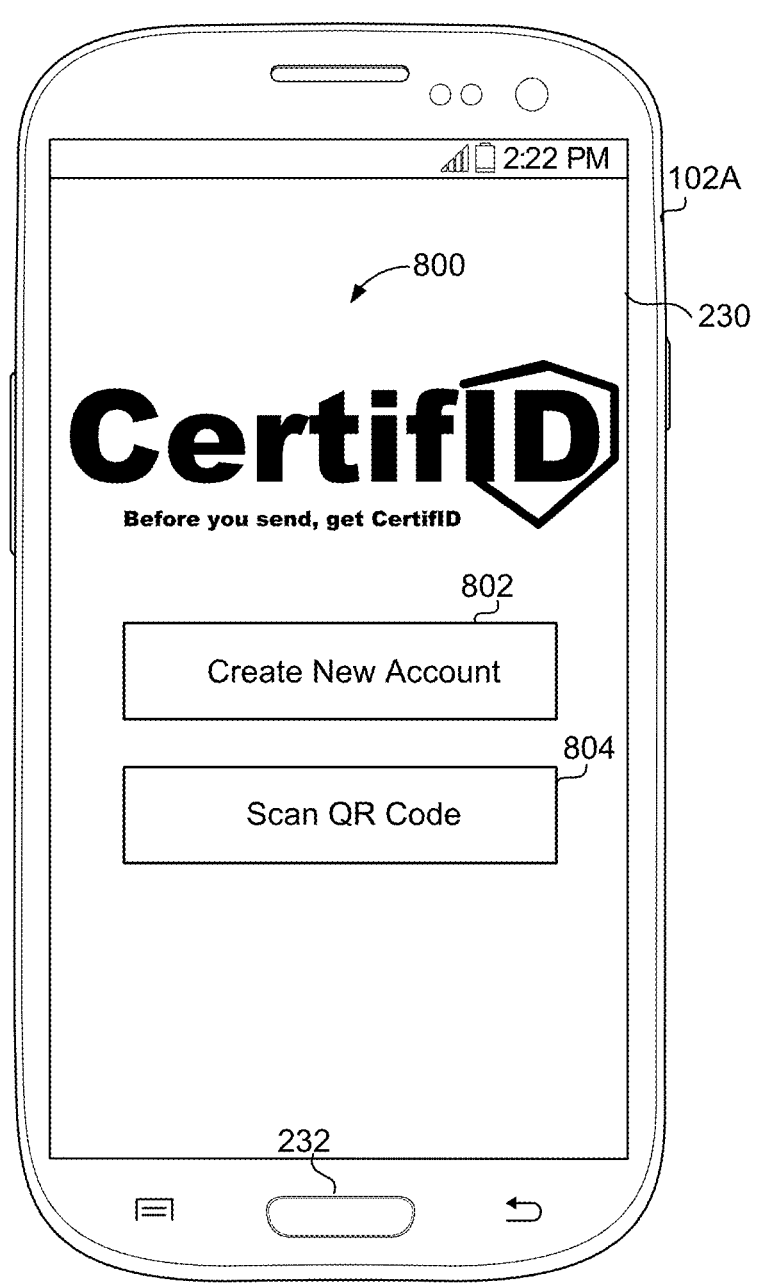
FIG. 8A is a schematic view of an example home GUI produced by a secure transaction application executed by a mobile communication device.
Figure 8B:
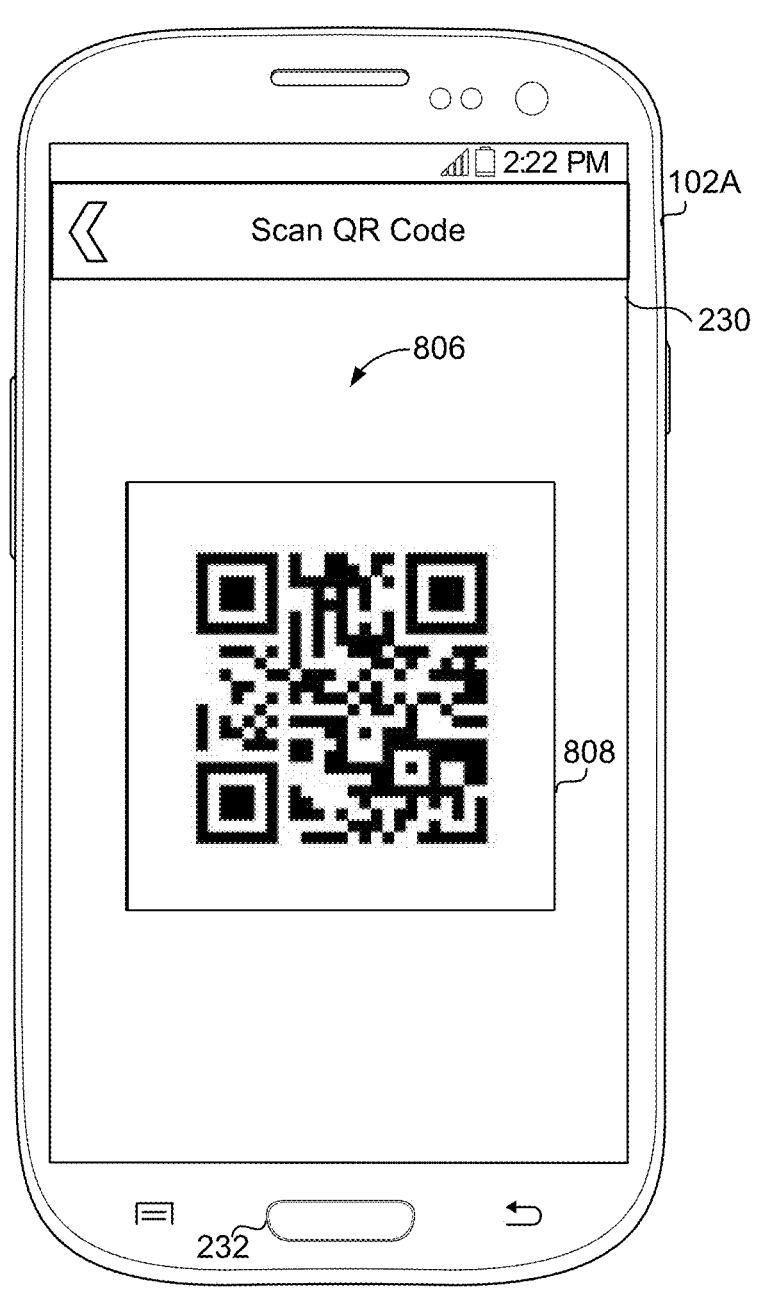
FIG. 8B is a schematic view of an example capture by a mobile communication device of FIG. 8A of a scannable barcode GUI produced by one or more secure transaction servers as part of a user authentication process.
Figure 8C:
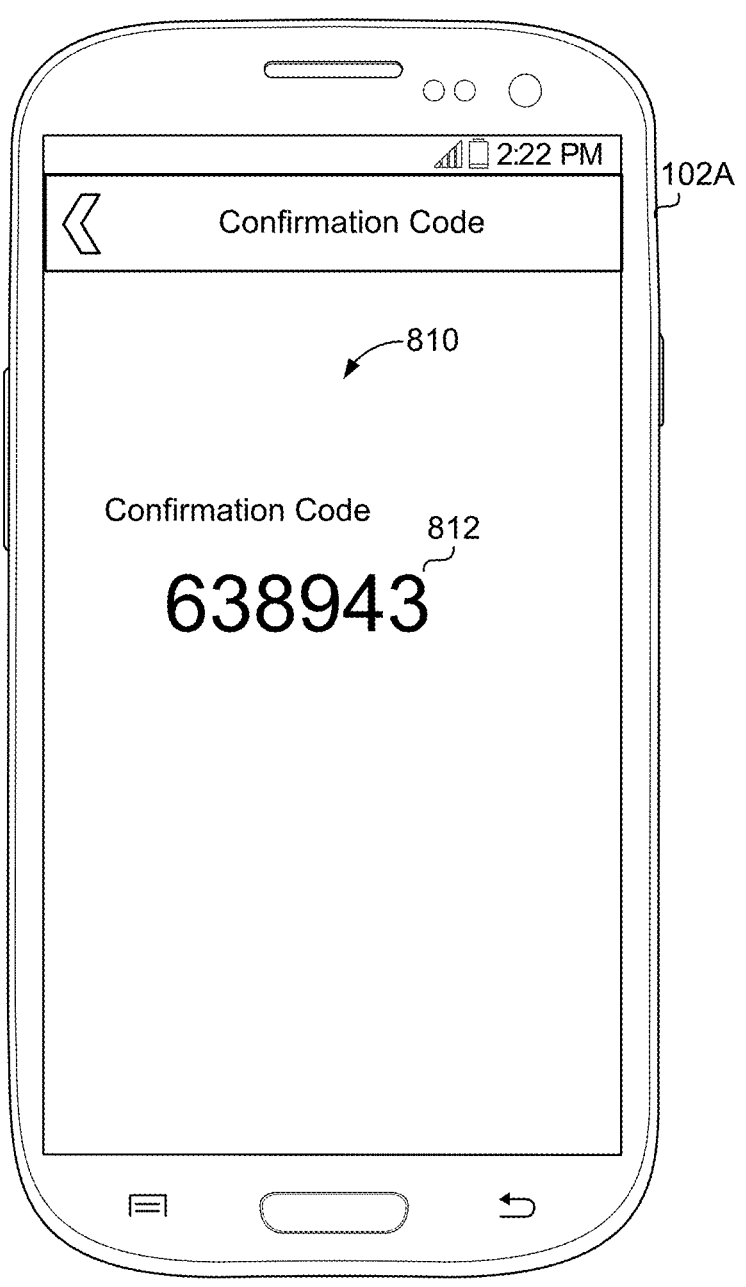
FIG. 8C is a schematic view of an example confirmation code transmitted by one or more secure transaction servers to, and displayed on, a mobile communication device as part of a user authentication process.

FIGS. 7G-7K are examples of graphical representations in the form of screenshots from the GUI relating to steps of the process 620A illustrated in FIG. 6C-1. These graphical representations may be in the form of GUIs generated and controlled by the ST server 104 and displayed on the monitor 318 of the user computer 102B as part of the secure transaction web interface or website corresponding to the process 620. Similarly, FIGS. 8A-8C illustrate other steps of the process 620 in the form of screenshots produced by the processor 200 of the registering user's mobile communication device 102A and displayed on the display screen 230. Where included, such screenshots are shown in the form of GUIs generated by the processor 200 of the registering user's mobile communication device 102A during execution of the ST App 220.

The process 620A illustrated in FIG. 6C-1 begins at steps 670A and 670B where the ST server 104 is operable to control the SWP to display an account activation GUI including a scannable barcode and a code entry GUI, and the same is displayed on the monitor 312 of the user computer 102B. In some examples, such as the process 620B, shown in FIG. 6C-2, the ST Server 104 is operable to control the SWP to display an account activation GUI (e.g., GUI 740-1 and 740-2) including an SMS request GUI and a phone call request GUI 740$p_{request}$, along with a code entry GUI, and the same is displayed on the monitor 312 of the user computer 102B. Referring to FIGS. 7G-1 and 7G-2, examples of the GUI 740-1, 740-2 produced by the ST server 104 at step 670A are shown.

As illustrated by example in FIG. 7G-1, the user authentication tab 718 generates a display including a scannable barcode 742 and GUI elements 744, 746 for entering and sending a code to the ST server 104 by the registering user via interaction with the user computer 102B. The scannable barcode 742 may be provided in the form of a QR code, (as shown in FIG. 7C-1), as one or more scannable matrix barcodes (e.g., an Aztec style matrix code, a photoTAN style matrix code, an EZcode style matrix code, a Shortcode style matrix code, a PDF style matrix code or the like), and/or one or more linear barcodes (e.g., a UPC style barcode, an EAN style barcode, a GS1 style barcode or the like). In some implementations, the ST server 104 is operable to generate the scannable code 742 to include MCD information for the registering user's mobile communication device 102A. In some examples, a scannable barcode with MCD information supplements the identification and/or comparison steps 640A, 640B, 642A, 642B executed as part of the user information verification process 616A, 616B. In other examples, the ST server 104 is operable to generate the scannable code 742 including other information of the registering user, no information relating to the registering user, or information relating to the registering user's mobile communication device. Additionally or alternatively, the scannable code 742 is unique or random to prevent duplication by potential fraudsters.

Referring back to FIGS. 6C-1, 6C-2, and 6C-3 at steps 672 and 674, the registering user downloads the ST App to the registering user's mobile communication device 102A and launches or activates the ST App on the registering user's mobile communication device 102A. For example, FIG. 7G illustrates the account activation GUI 740. At steps 676 and 678, the registering user controls the ST App executing on the registering user's mobile communication device 102A to capture the barcode 742 displayed on the monitor 312 of the user computer 102B to transmit the captured barcode 742 to the ST server 104. The registering user may use the camera 234 or other scanning peripheral of the mobile communication device 102A to capture the barcode 742.

FIG. 8A is an example home GUI 800 launched at step 674. The processor 200 produces and displays the GUI 800 on the display screen 230 of the registering user's mobile communication device 102A. In some examples, such as FIG. 8A, the home GUI 800 includes two selectable GUI elements 802, 804. Here the GUI element 804 executes a barcode scanning process when selected. At step 676, the registering user selects the "Scan QR code" GUI element 804 and the processor 200 responds to execute a barcode scanning process in which a barcode scanning GUI 806 is produced by the processor 200 on the display screen 230. The registering user then positions the camera 234 from the registering user's mobile communication device 102A over the QR code 742 displayed on the monitor 312 of the user computer 102B. The mobile communication device 102A may auto-capture the barcode 742 or scan the barcode 742 in any manner. In some examples, such as FIG. 8B, the GUI 806 aids barcode capture with scanning boundaries 808. At step 678, the processor 200 is operable to control the communication circuitry 210 to transmit the captured code 742 to the ST server 104.

Referring to FIG. 6C-3, the user authentication process 620C is similar to the user authentication processes 620A, 620B except that at 670C, the user computer 102B prompts the user to generate a biometric identifier via a generate biometric identifier GUI. After the user launches the ST App, at step 674, the user controls the ST App to capture a biometric ID at step 676a. At step 678a, the registering user controls the ST App executing on the registering user's mobile communication device 102A to transmit the captured biometric identifier to the ST server 104. The biometric identifier may be converted to an algorithm that is stored on the ST server 104. The registering user may use the camera 234 or other scanning peripheral of the mobile communication device 102A to capture the biometric identifier. At step 680a, the ST server 104 is operable to decode the captured biometric identifier and to compare the biometric identifier to user information within the user account data. In some examples, a biometric identifier algorithm decodes the biometric identifier into a format or template for comparison compatibility with other system(s)/database(s) or a database of the ST server 104. Additionally or alternatively, the ST server 104 is configured to validate the biometric identifier with a third party database 112 (e.g., U.S. Customs, ePassport, National ID, Visa systems, State issued driver's license, State issued identification document, etc.) via the third party database integration module 506. For example, the ST server 104 validates the biometric identifier with at least one third party database 112 much like steps 640-644. In some implementations, the format or template of the biometric identifier encrypts information decoded from the biometric identifier to preserve an identity of the user.

In some examples, when the captured biometric identifier matches a biometric identifier of at least one third party database 112, the ST server 104 is configured to store a validated biometric identifier corresponding to the biometric identifier. The validated biometric identifier may be stored with other user account data within the system 100 or stored within a separate validated biometric identifier database. An advantage to storing validated biometric identifier(s) is that the system 100, over time, may accumulate/build a database to supplement or replace third party database(s) used to validate biometric identifiers. This may lead to an additional revenue source by allowing the system 100 to become a service provider with a database of validated biometric identifiers. In other words, the system 100 may act much like the third party database(s) as a validation and/or authentication source for other systems and service providers requesting biometric identifier validation. Additionally, the databases with validated biometric identifier(s) may streamline biometric identification and allow biometrics to reduce and/or eliminate dependency security credentials that a user may need to remember in order to use the secure transaction environment. In other examples, the ST server 104 is configured to store validated biometric identifiers within a cloud system to contribute to a centralized server of validated biometrics. In other implementations, validated biometric identifiers are disaggregated (e.g., via a distributed ledger or across multiple other databases) by the ST server 104 so that a fraudster may not access a single database.

Referring back to FIG. 8A, the home GUI 800, in some examples, displays on the registering user's mobile communication device 102A only upon any launch or activation of the ST App 220 prior to tethering the registering user's mobile communication device 102A to the registering user's account as part of the user authentication process 620A. After tethering the registering user's mobile communication device 102A to the registering user's account as part of the user authentication process 620A launch or activation of the ST App 220 on the then-registered user's mobile communication device 102A may produce a different home GUI (FIG. 11A) or an additional GUI element.

Referring again to FIG. 6C-1, the ST server 104 is operable to decode the captured barcode 742 at step 680. In configurations where the barcode 742 includes MCD information for the registering user's mobile communication device 102A and/or about the registering user, the ST server 104 is further operable, at step 680, to compare the decoded barcode data to the user information stored in the registering user's account data 502. In other configurations, where the barcode 742 contains no user information, the ST server 104 is further operable, at step 680, to compare the decoded barcode data to the barcode data of the displayed barcode 742. At step 682, the ST server 104 determines whether the comparison is a match. When the comparison does not yield a match, the ST server 104 controls the SWP to display a user authentication failure message and to set a user authentication flag (UAF)=Fail or "F." At step 684, the ST server 104 displays the authentication failure message before returning to the registration process 600 of FIG. 6A.

When, at step 682, the ST server 104 determines that the comparison conducted at step 680 yields a match, the process 620A advances to step 686 where the ST server 104 is operable to generate a one-time-code (OTC) and to transmit the OTC to the registering user's mobile communication device 102A. In the example of the process 620B shown in FIG. 6C-2, the process 620B advances directly to step 686 to generate the OTC when the user selects either SMS or telephone delivery of the OTC at step 670B-1. Accordingly, in the process 620B, the steps relating to producing and verifying the barcode 742 are not present. In some examples, the OTC is a multiple-digit numerical code, yet in other examples the OTC includes any number of digits, letters, or symbols, or any combination thereof. In some implementations, a secure token with a private key is used instead of or in addition to the OTC.

Referring again to FIGS. 6C-1 and 6C-2 at step 688, the registering user's mobile communication device 102A is operable to receive the OTC and the processor 200 is operable to control the display screen 230 to produce an OTC display GUI 810 displays the received OTC 812 (e.g., FIG. 8C). Following step 688, the process 620A, 620B advances to step 690 where the registering user enters the OTC displayed on the OTC display GUI 810 of the registering user's mobile communication device 102A into the code entry GUI element 744 displayed in the account activation GUI 740 (e.g., via interaction by the registering user with the keypad or other input peripheral of the user computer 102B). FIG. 7H depicts an example of the code entry GUI element 744 displayed in the activation account GUI 740. When the user then selects the code confirmation GUI element 746, the process 620A, 620B advances to step 692 where the ST server 104 is operable to compare the user-entered OTC with that generated by the ST server 104 at step 686. When the comparison yields a match, the ST server 104, at step 694, sets UAF=Pass or "P," and controls the SWP to display a suitable message (e.g., the message 752 in the example GUI 750 illustrated in FIG. 7I). When the comparison at step 692 does not yield a match, the process 620A, 620B advances to step 696 where the ST server 104 determines whether the code comparison at step 692 represents a first comparison attempt. When the process 620A, 620B determines the code comparison is the first comparison attempt, the process 620A, 620B loops back to step 686 where the ST server 104 is operable to generate and transmit a new OTC. When instead the ST server 104 determines at step 696 that the code comparison at step 692 represents a second comparison attempt, the process 620A, 620B advances to step 698 where the ST server 104 is operable to set UAF=F and to return to the registration process 600 of FIG. 6A. Here the number of attempts until failure is determined is two, however, the process may be configured to accept any number of failure attempts based on design preferences.

Referring further to FIG. 6A, the registration process 600 advances from step 620 to step 622 where the ST server 104 checks the status of the UAF flag. In a scenario when the scanned barcode does not match the registered user's information, or other comparison criteria, or the received confirmation code does not match the OTC generated by the ST server 104, UAF=F and, at step 624, the ST server 104 is operable to control the SWP to display a message and then terminate the session. When UAF=P at step 622, the registration process 600 proceeds to step 626 where the ST server 104 activates the user account and controls the SWP to display a message. For example, FIG. 7J depicts GUI 760 displaying the message as, "Congratulations, your account is set up! Click here to get started." The GUI 760 may include a selectable GUI element 762 as also illustrated in FIG. 7J. The ST server 104 may respond to a selection of the GUI element 762 to control the SWP to grant access by the now-registered user to the secure transaction environment. In some examples, such as FIG. 7K, this selection results in a secure transaction environment home GUI 770 where three secure transaction processes are selectively available. In FIG. 7K, the home GUI 770 includes a selectable transaction start GUI element 772, a selectable send request GUI element 774 and a selectable dashboard GUI element 776. Selection by the registered user of any of the selectable GUI elements 772, 774, and 776 causes the ST server 104 to control the SWP to display a corresponding GUI in the secure transaction environment managed by the ST server 104. Some examples of each of the different selectable processes illustrated in FIG. 7K will be described below with respect to FIGS. 16-20.

Registered User Login Process: 1st Example

Figure 9:
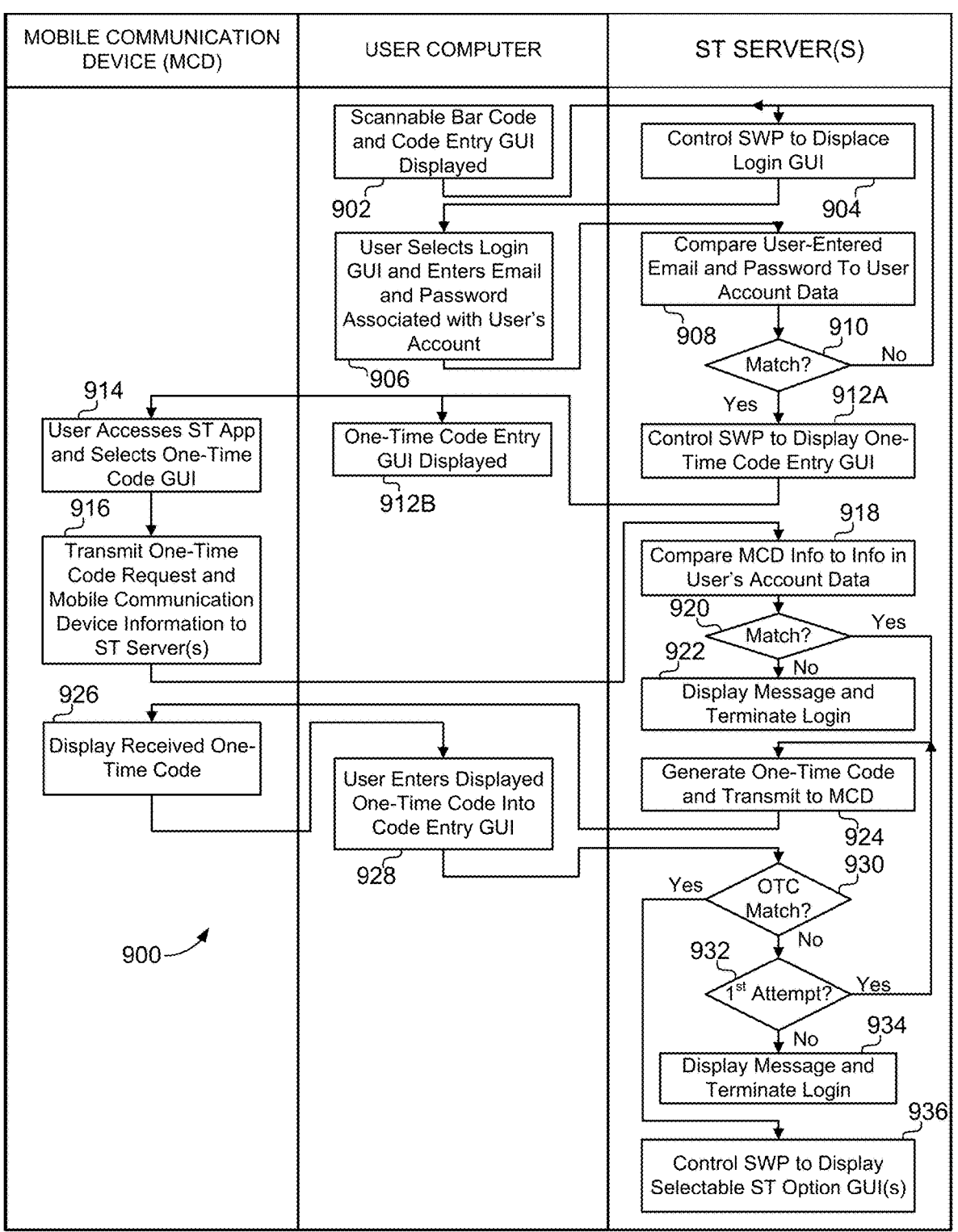
FIG. 9 is a flow diagram of an example of a user login process for accessing a secure transaction environment by a registered user via a user computer.

FIG. 9 is an example flow diagram of a user login process 900 where registered users of the system 100 may gain access to the secure transaction environment managed and controlled by the ST server 104. The login process 900 illustrated in FIG. 9 may be carried out primarily via the secure transaction website or web interface hosted by the ST server 104 accessed with the user device 102 (e.g., the user computer 102B). In other examples, at least one part of the login process 900 (e.g., a user authentication process) additionally involves the use of the user's mobile communication device 102A.

As illustrated by FIG. 9, the login process 900 may be divided into columns by component (e.g., mobile communication device, user computer, and ST Server) where each column corresponds to the step performed by the component. The heading "ST Server," located to the right of the right-most vertical line represents one or more software applications executed by the processor(s) 400 of the ST server 104. In some examples, this ST Server portion of the process 900 is stored in the user login management module 516 (see FIG. 5) in the form of instructions executable by the processor(s) 400 of the ST server.

Another portion of the process 900 located between the left-most and right-most vertical lines and centered under the heading "User Computer," represents operations carried out by a registered user via interaction by the user with graphic user interfaces (GUIs) displayed on the monitor 318 of the user computer 102B. These GUIs may be controlled by the ST server 104 through the website or web interface accessed by the user via the user computer 102B. The user may control interaction with such GUIs with one or more of the user computer input peripherals 314, such as a mouse, a keyboard, a touch screen, a microphone, etc.

The heading "Mobile Communication Device," represents yet another portion of the process 900 where operations are executed by a registered user's mobile communication device 102A and/or carried out by the registered user via interaction by the user with the user's mobile communication device 102A. This portion is shown in FIG. 9 to the left of the left most vertical line. In some examples, this portion of the process 900 includes the ST App 220 stored in the memory 204 (and/or data storage 206) of the registered user's mobile communication device 102A in the form of instructions executable by the processor 200 of the registered user's mobile communication device 102A.

Figure 10A:
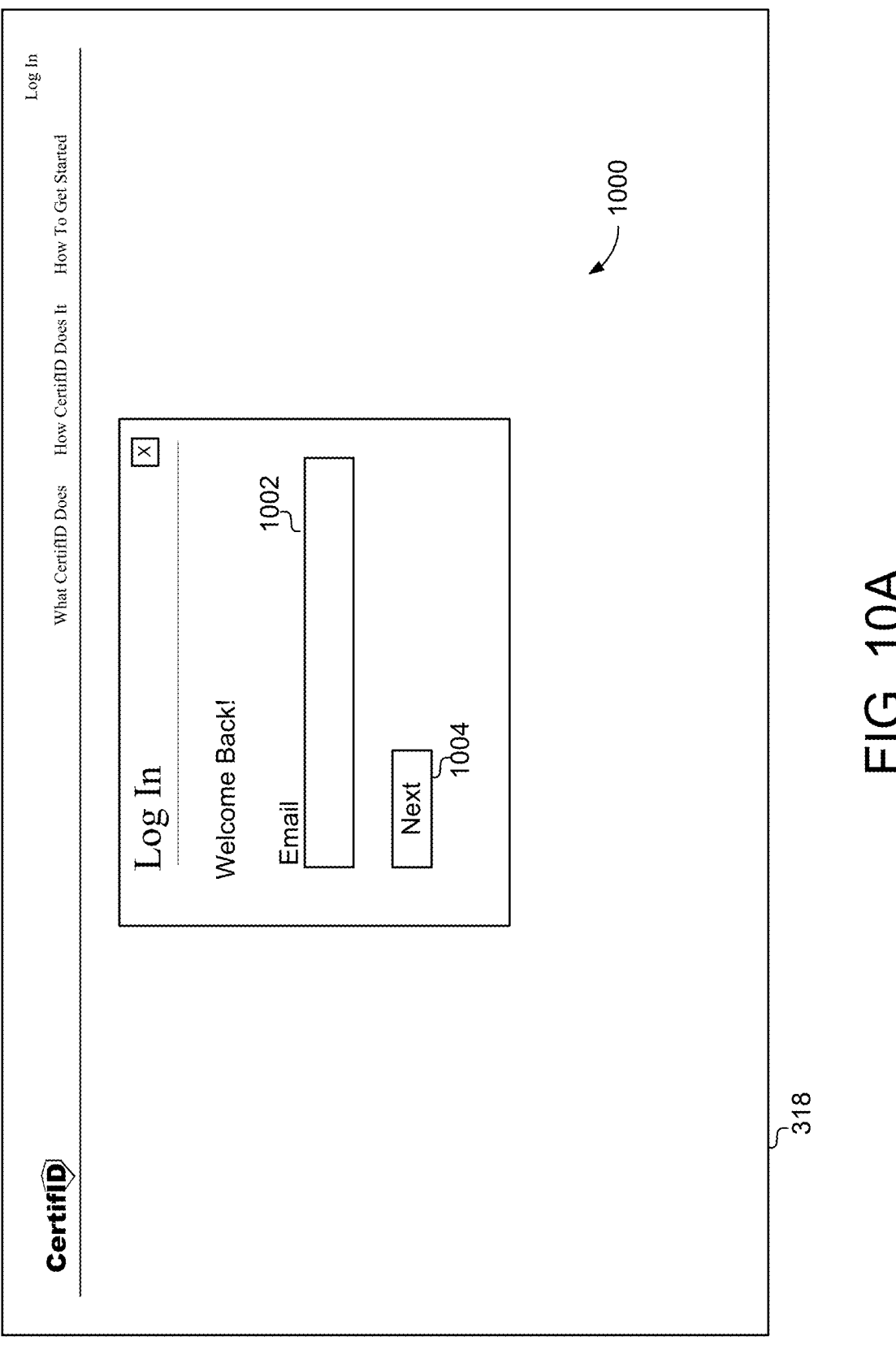
FIGS. 10A and 10B are schematic views of example user logins GUI produced by a secure transaction website hosted by one or more secure transaction servers.
Figure 10B:
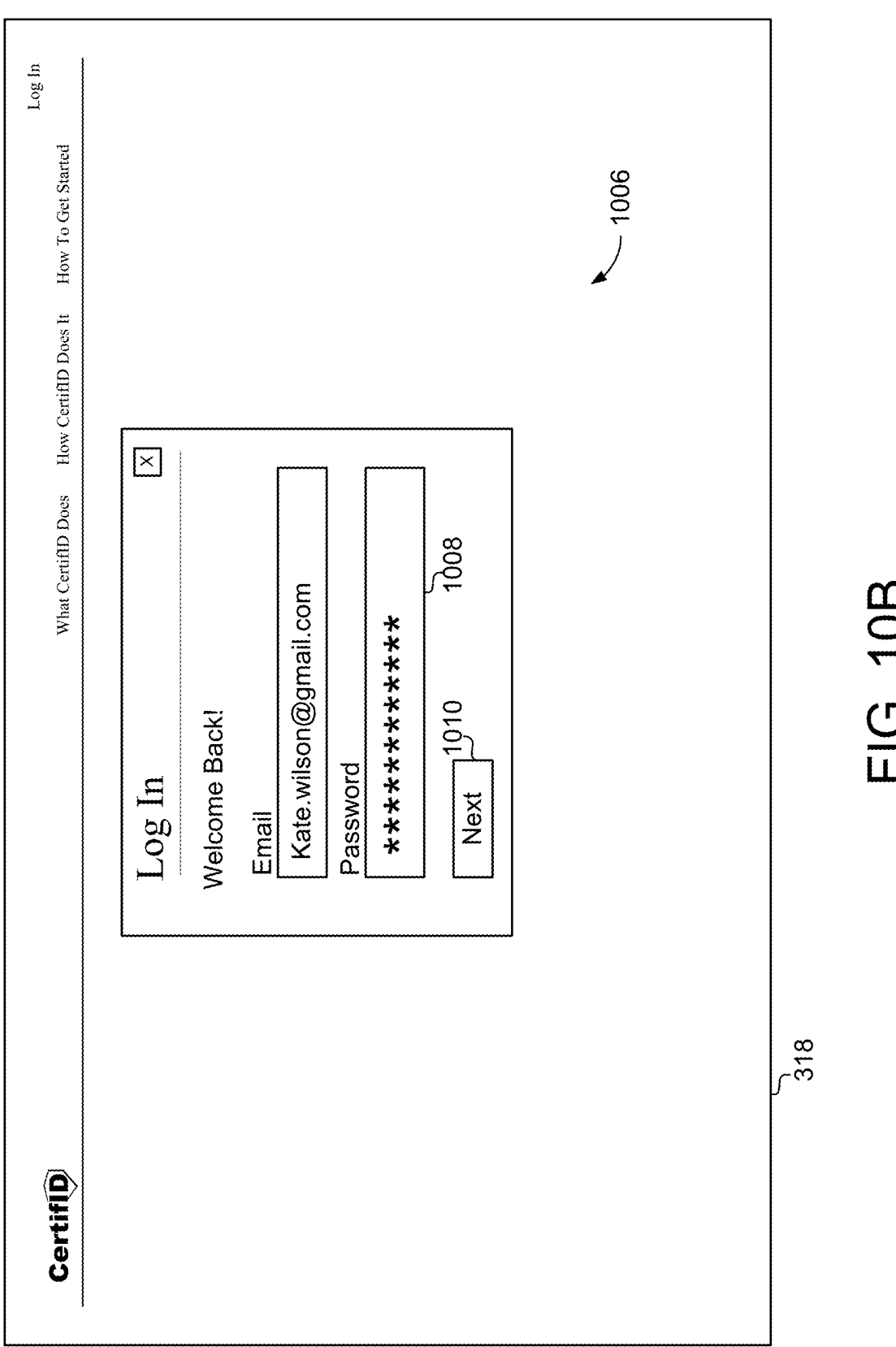
Figures 1, 10C:
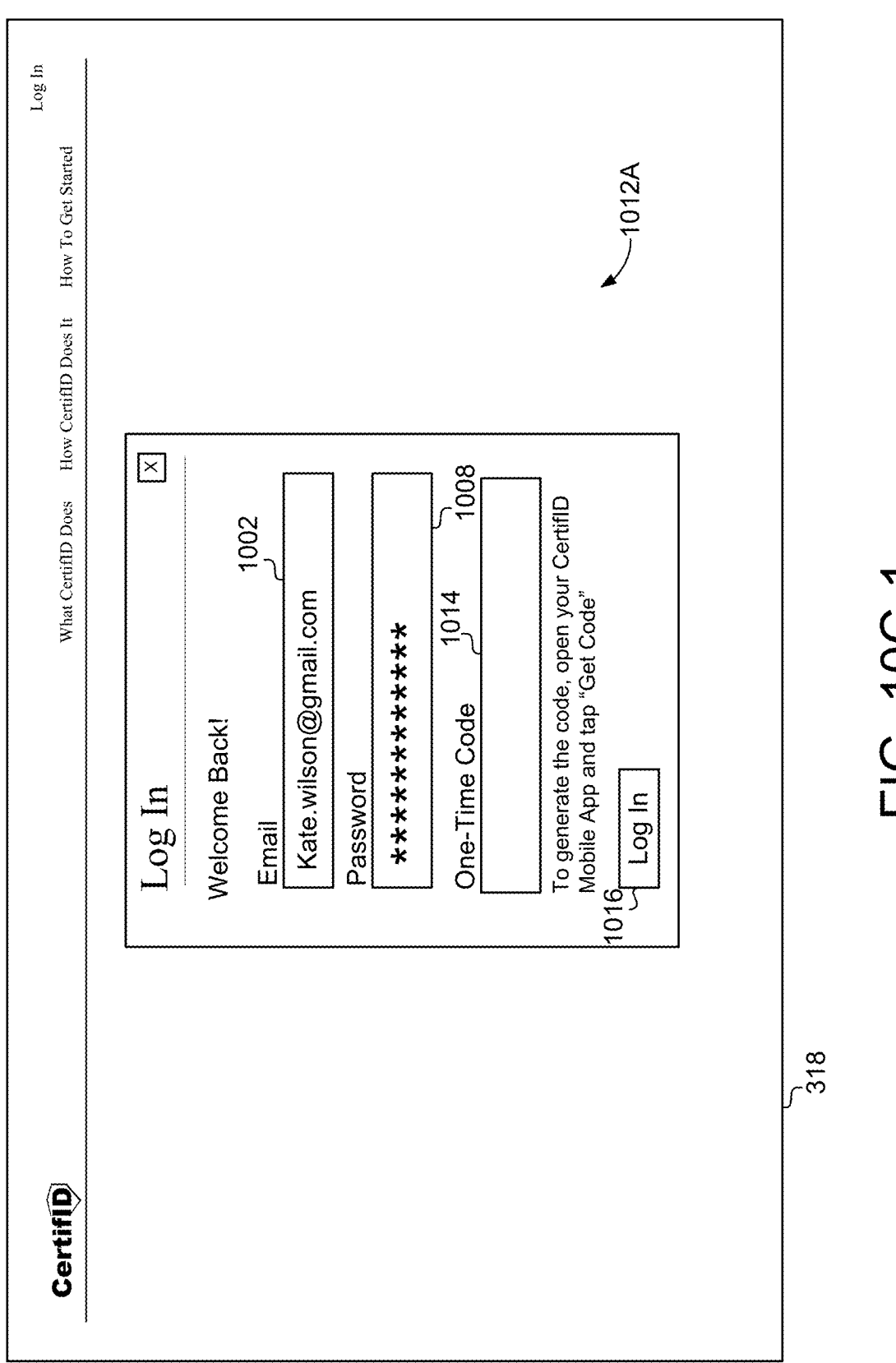
Figures 2, 10C:
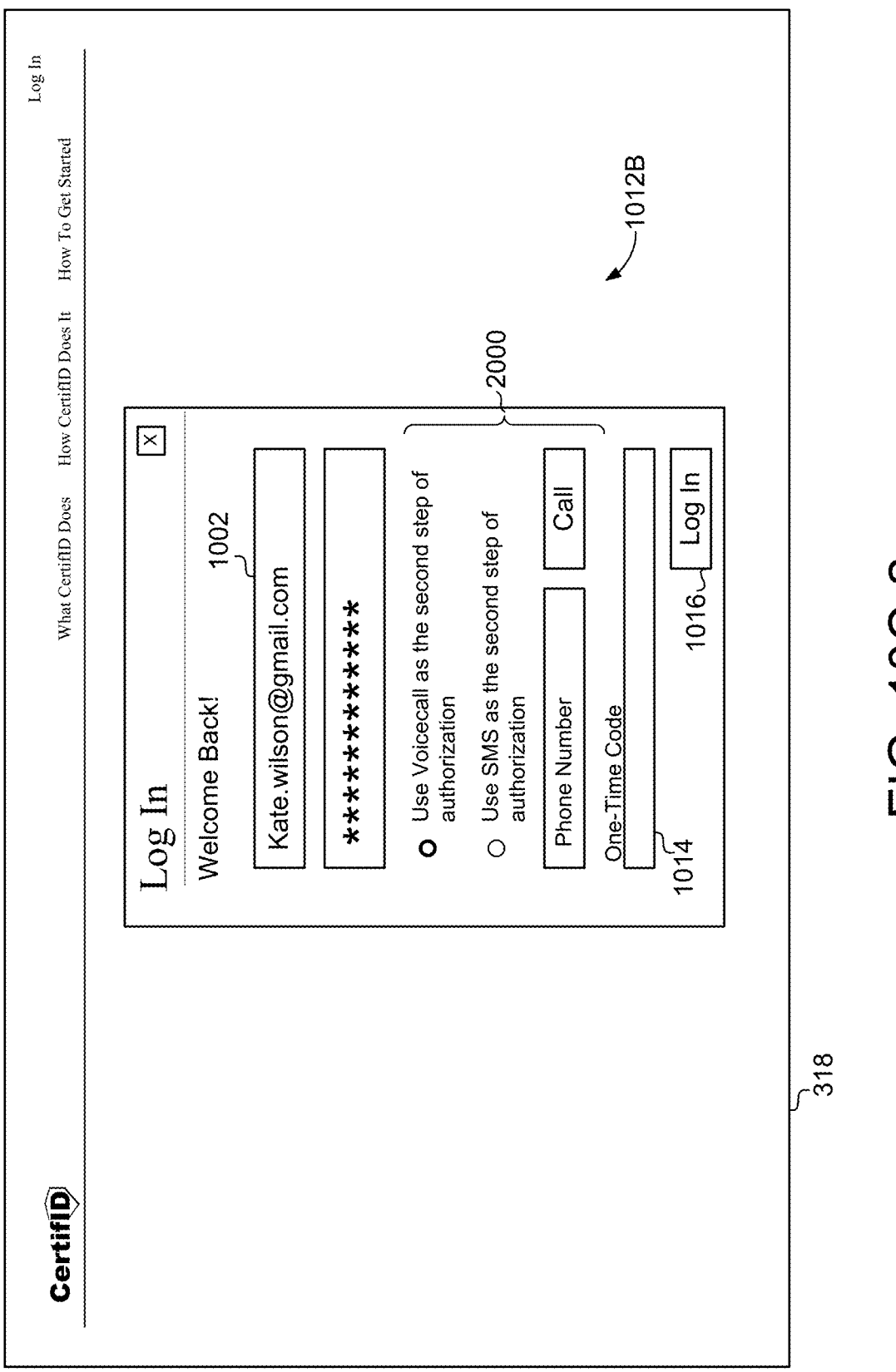
Figure 10D:
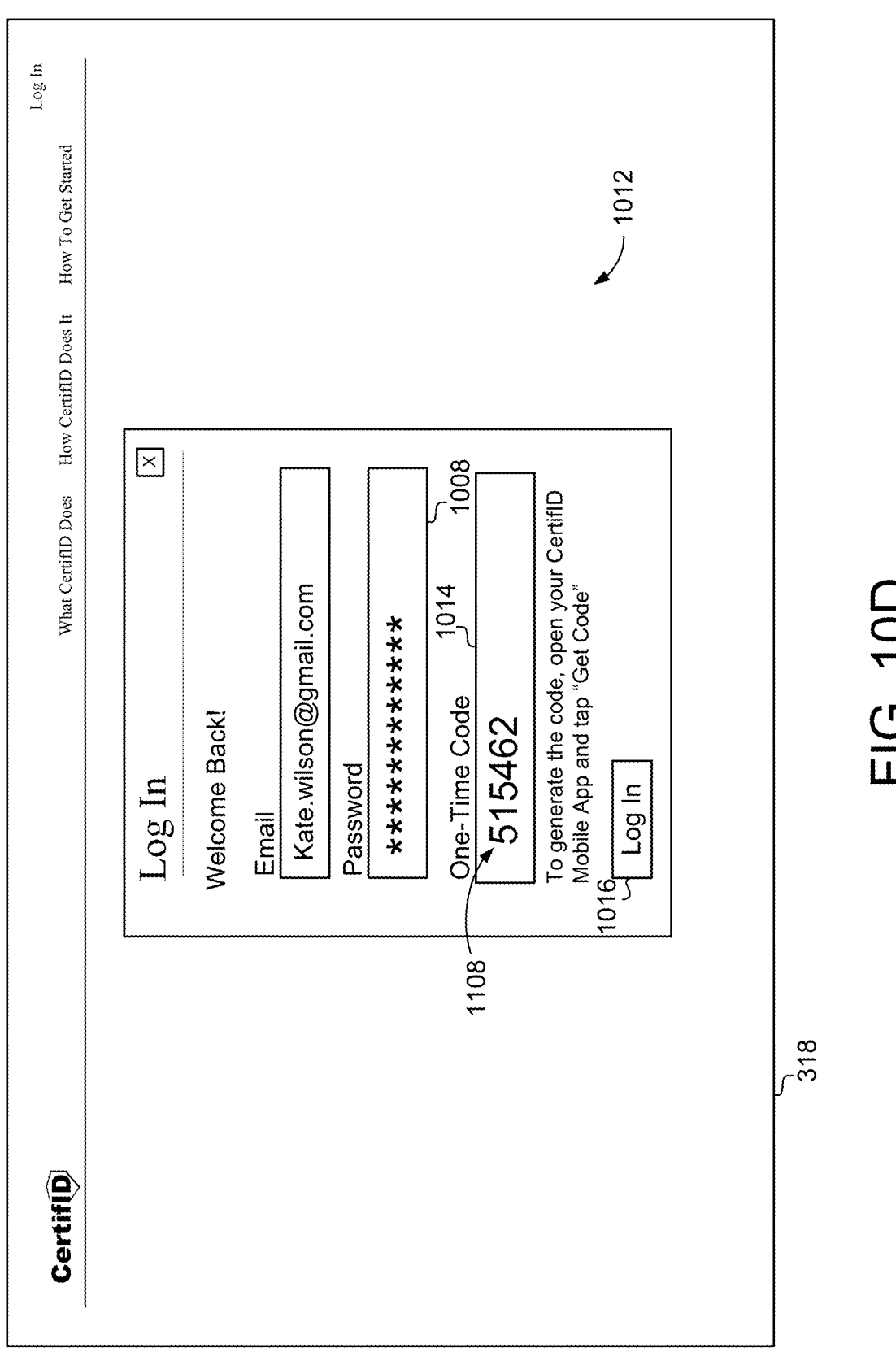
FIG. 10D is a schematic view of an example user login GUI with a one-time code entered in a corresponding GUI field as part of a user login process.
Figure 11A:
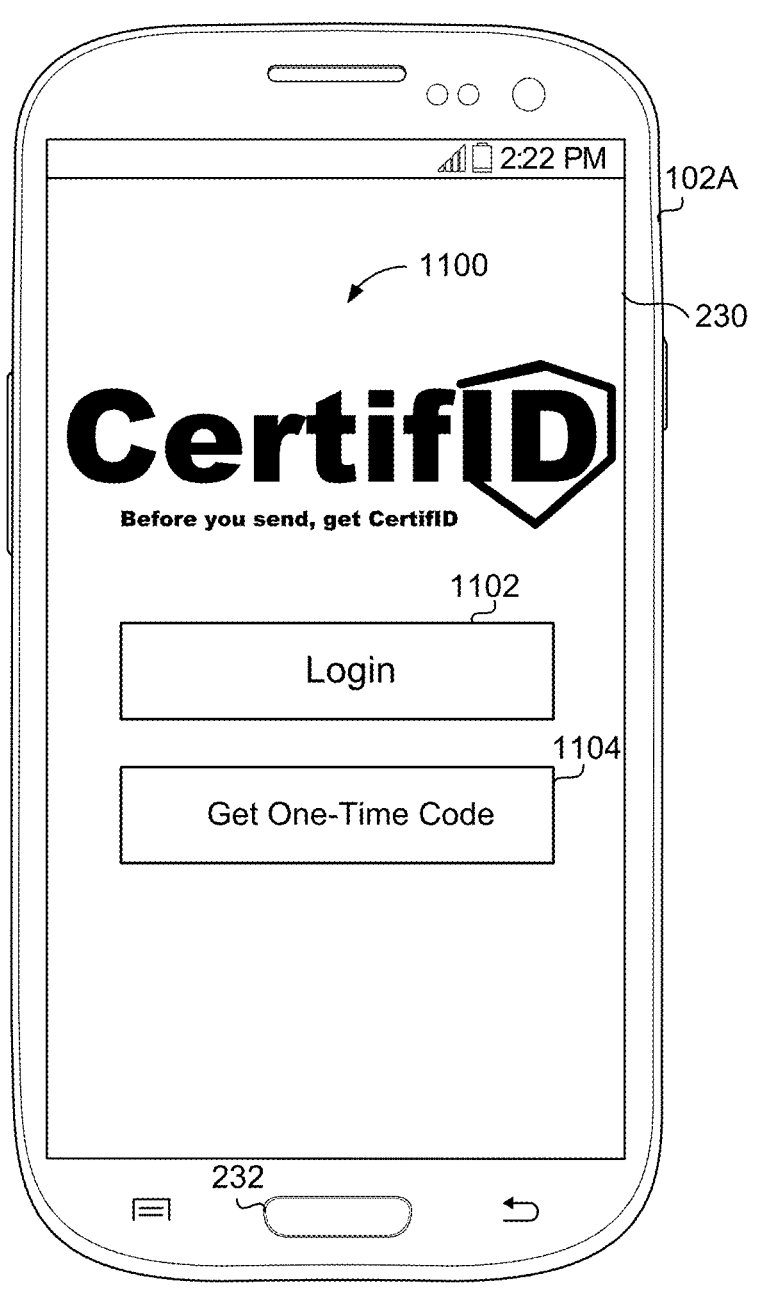
FIG. 11A is a schematic view of an example home GUI produced by a secure transaction application executed by a mobile communication device.
Figure 11B:
FIG. 11B is a schematic view of an example one-time code as part of a user login process.

While discussing various steps of the login process 900, reference may be made to FIGS. 10A-10D and 11-11B. FIGS. 10A-10D are example graphical representations in the form of screenshots of the secure transaction web interface or website hosted by the ST server 104. Where included, the screenshots are shown in the form of GUIs generated and controlled by the ST server 104 and displayed on the monitor 318 of the user computer 102B. FIGS. 11A and 11B illustrate steps of the login process 900 in the form of screenshots produced by the processor 200 of the registered user's mobile communication device 102A and displayed on the device screen 230. FIGS. 11A and 11B are shown in the form of GUIs generated by the processor 200 of the registered user's mobile communication device 102A during execution of the ST App 220.

Referring to FIG. 9, at step 902 of the login process 900, a registered user of the secure transaction system 100 controls a user computer 102B to access the secure web page or web interface hosted by the ST server 104. For example, the registered user types the URL of the secure web page into the web browser 304. At step 904, the ST server is operable to control the secure web page or web interface to display a user selectable login GUI. For example, FIGS. 7A and 10A illustrate the ST server 104 controlling secure web page to display a home page 700 (FIG. 7A) including selectable login GUI element 701. In response to a user selection of the login GUI element 701, the ST server 104 is operable to control the secure web page display login page or GUI 1000 (FIG. 10A) including a user email GUI field 1002 and a selectable "next" GUI element 1004.

At step 906, the registered user controls user's computer 102B to enter the registered user's email into the GUI field 1002 and to select the "next" GUI element 1004. In response, the ST server 104 is operable to control the secure web page to display (e.g., shown in FIG. 10B) another login page (e.g., represented by GUI 1006) that includes the registered user's email in the email GUI field 1002, a user password field 1008, and another selectable "next" GUI element 1010. The user's email and the user's passwords may be considered a security credential for logging in to the secure transaction environment. At step 906, the registered user controls the user's computer 102B in order to enter the registered user's password into the GUI field 1008 and to select the "next" GUI element 1010, as shown by FIG. 10B. In response to the selection of the GUI element 1010, the ST server 104 may compare the user entered email and password to the user's account data. For example, the security credential is a login attempt from the mobile communication device where the process 900 determines whether the security credential is authentic by determining that the login and the password satisfy stored user account data within a secure transaction database. In other examples, the login process 900 includes a password free login page that utilizes a PIN, biometrics, or security tokens as a form of security credentials.

When the match is not found at step 910, the login process 900 and loops back to step 904. When the match is found at step 910, the login process 900 advances to steps 912A and 912B where the ST server 104 is operable to control the secure webpage to display another login page represented by GUI 1012A. As depicted by example FIG. 10C-1, GUI 1012A may include the registered user's email in the email GUI field 1002, generic symbols in the password GUI field 1008, a one-time code field 1014, and a selectable "login" GUI element 1016. In some implementations, as shown by FIG. 10C-2, the GUI 1012B is another login page that includes a selectable "request one-time code" GUI element 2000 where the user can request the one-time code by SMS or voice call.

At step 914 of the login process 900, the registered user accesses the ST app on the mobile communication device 102A of the registered user. In some examples, such as FIG. 10C-1, the login GUI 1012 instructs the registered user to launch the ST app to retrieve the one-time code by selecting a one-time code GUI element displayed in the ST app. FIG.

11A is an example home GUI 1100 displayed by the processor 200 on the display screen 230 of the mobile communication device 102A of the registered user. In some examples, the home GUI 1100 displays on the mobile communication device 102A only after a user registration process has been successfully completed with the mobile communication device 102A tethered to the registered user's account. Referring to FIG. 11A, the home GUI 1100 includes a user selectable "login" GUI element 1102 and a user selectable "get one time code" GUI element 1104. The purpose of the "login" GUI element 1102 will be described below with respect to FIG. 14. In any case, further at step 914 of the process 900 illustrated in FIG. 9, the registered user selects the "get one-time code" GUI element 1104, and thereafter at step 916 the processor 200 of the registered user's mobile communication device 102A controls the communication circuitry 210 to transmit the one-time code (OTC) request, along with the MCD information of the registered user's mobile communication device 102A, to the ST server 104.

At step 918, the ST server 104 receives the OTC request and the MCD information transmitted by the registered user's mobile communication device 102A and compares the received MCD information to MCD information stored in the user's account data 502. At step 920, the login process 900 determines whether the received MCD information matches or satisfies the stored MCD information, when no match or satisfaction is found at step 920, the process 900 advances to step 922 where the ST server 104 is operable to control the secure web page or web interface to display a message and to terminate the login process 900. When, at step 920, the ST server 104 finds a match between the received MCD information and the MCD information stored in the user's account data 502, the process 900 advances to step 924 where the ST server 104 is operable to generate a one-time code and to transmit the generated OTC to the matching mobile communication device 102A. For example, the ST server transmits the generated OTC to the registered user's mobile communication device 102A that transmitted the OTC request. At step 926, the processor 200 of the registered user's mobile communication device 102A receives the transmitted OTC and controls the display screen 230 to display a GUI 1106 that includes a display of the received OTC 1108 (e.g., FIG. 11B).

At step 928, the process 900 advances to step 928 where the registered user enters the OTC 1108 displayed on the display screen 230 of the registered user's mobile communication device 102A into the OTC GUI field 1104 of the login GUI 1012 displayed by the ST server 104 on the registered user's computer 102B (e.g., FIG. 10D) and then selects the "login" GUI element 1016. At step 930, the ST server 104 is operable to compare the OTC generated at step 924 with the OTC entered by the user at step 928. When no match is found, the login process 900 advances to step 932 where the ST server 104 determines whether the OTC comparison executed at step 930 represents a first comparison attempt during the current login session of the login process 900. When the OTC comparison is the first comparison attempt, the process 900 loops back to step 924 where the ST server generates a new OTC and transmits the newly generated OTC to the registered user's mobile communication device 102A. Otherwise, when the OTC comparison is not the first comparison attempt, the process 900 advances to step 934 where the ST server 104 is operable to display a failure message and to terminate the login process 900. When, at step 930, the ST server 104 determines that the OTC entered by the user at step 928 matches or satisfies the OTC generated at step 924, the login process 900 is successful and the process 900 advances to step 936. At step 936, the ST server 104 is operable to control the SWP to grant access by the registered user to the secure transaction environment and display the secure transaction environment home GUI 770 (e.g., FIG. 7K).

FIGS. 9-11B represent some examples of the registered user login process 900. In other implementations, variants of the process 900 require a greater, lesser, and/or different number and/or type(s) of security features in order to complete the login process 900. For example, the registered user login process 900 may include some or all of the steps of the user information verification process 616A, 616B illustrated in FIG. 6B. As one specific example, the process 900 may be modified to require generation of, and registered user answering of, one or more private questions as depicted by example in FIG. 7F. Additionally or alternatively, the registered user login process 900 includes some or all of the steps of the user authentication process 620 illustrated in FIG. 6C. In yet other examples, the registered user login process 900 requires (for example, upon first and/or periodic login attempts by a registered user) the registered user to select one or more security questions and answers. The process 900 may be further modified to require, periodically or otherwise, a registered user executing the login process 900 to answer one or more such security questions as part of the login process 900. Examples of security questions may include a name of a first family pet, a name of a favorite high school teacher, a first name of a favorite aunt or uncle, etc.

User Registration Process: 2nd Example

In some examples, the system 100 provides for an alternative or additional user registration process that is conducted by and between the ST server 104 and the registering user's mobile communication device 102A. In this user registration process, the registering user may optionally access and control a user computer 102B. FIG. 12 is an example flow diagram of a registration process 1200 where new users of the system 100 establish and set up a user account.

Like FIG. 9, FIG. 12 is divided into columns corresponding to operations performed by components (e.g., user device, mobile communication device, and ST server(s)) within the registration process 1200. The column with the heading "ST Server," located to the right of the right-most vertical line in FIG. 12 represents one or more software applications executed by the processor(s) 400 of the ST server 104. In some examples, this portion of the process 1200 is stored in the user registration module 512 (see FIG. 5) in the form of instructions executable by the processor(s) 400 of the ST server.

Another portion of the process 1200, depicted as the middle column under the heading "Mobile Communication Device," represents operations executed by a registering user's mobile communication device 102A and/or operations carried by the registering user via interaction by the user with the user's mobile communication device 102A. In some implementations, this portion of the process 1200 includes the ST App 220 stored in the memory 204 (and/or data storage 206) of the registering user's mobile communication device 102A in the form of instructions executable by the processor 200 of the registering user's mobile communication device 102A.

FIG. 12 also depicts that some step(s) of the registration process 1200 may be executed by the registering user either via a user computer 102B or the registering user's mobile communication device 102A. For example, FIG. 12 illustrates a step straddling the left-most vertical line between the headings "User Computer" and "Mobile Communication Device."

While discussing various steps of the registration process 1200, reference may be made to FIGS. 13A-13D, which are graphical representations of screenshots produced by the processor 200 of the registering user's mobile communication device 102A and displayed on the display screen 230. Where included, such screenshots are shown in the form of GUIs generated by the processor 200 of the registering user's mobile communication device 102A during execution of the ST App 220.

The process 1200 begins at step 1202 where a new user of the secure transaction system 100 downloads the ST App 220 to the user's mobile communication device 102A and launches or activates the ST App 220 on the registering user's mobile communication device 102A (e.g., as described with respect to steps 672 and 674 of the user authentication process 620 illustrated in FIG. 6C). As described above with respect to FIG. 8A, the launch or activation of the ST App 220 on the mobile communication device 102A of an unregistered user displays the home screen 800, including a selectable GUI element a "Create New Account" GUI element 802. In other examples, the user receives an invite (e.g., via email) to create an account. At step 1202 of the user registration process 1200, the registering user selects the GUI element 802. At step 1204, the processor 200 is responsive to user selection of the "Create New Account" GUI element 802 from step 1202 to produce successive screens, GUI fields, and/or selectable elements that the registering user enters user information as described above with respect to steps 606-612 of the user registration process 600 illustrated in FIGS. 6A and 7A-7E. At step 1206, the processor 200 of the registering user's mobile communication device 102A is operable to control the communication circuitry 210 to transmit the user information entered into the registering user's mobile communication device 102A.

Following step 1206, the process 1200 advances to step 1208 where the ST server 104 is operable to create a user account for the registering user in the user account data 502 and to store the registering user's information in the user's account data 502. At step 1210, the ST server 104 is operable to execute a user information verification process 1210. In some examples, the user information verification process 1210 is identical to the user information verification process 616A, 616B illustrated by example in FIGS. 6B-1 and 6B-2 with the exception that the processor 200 of the registering user's mobile communication device 102A is operable to execute step 652 by controlling the display screen 230 to display some or all of the user questions and with the further exception that the registering user executes step 654 by interacting with the registering user's mobile communication device 102A to select answers to a displayed question. Here, the registering user's mobile communication device 102A transmits answers of the displayed questions to the ST server 104. For example, the mobile communication device 102A transmits the answers in response to user selection of a displayed "send" GUI element or other input peripheral. In other examples, the user information verification process 1210 includes more, fewer, and/or different steps than those illustrated in FIG. 6B.

Figure 13A:
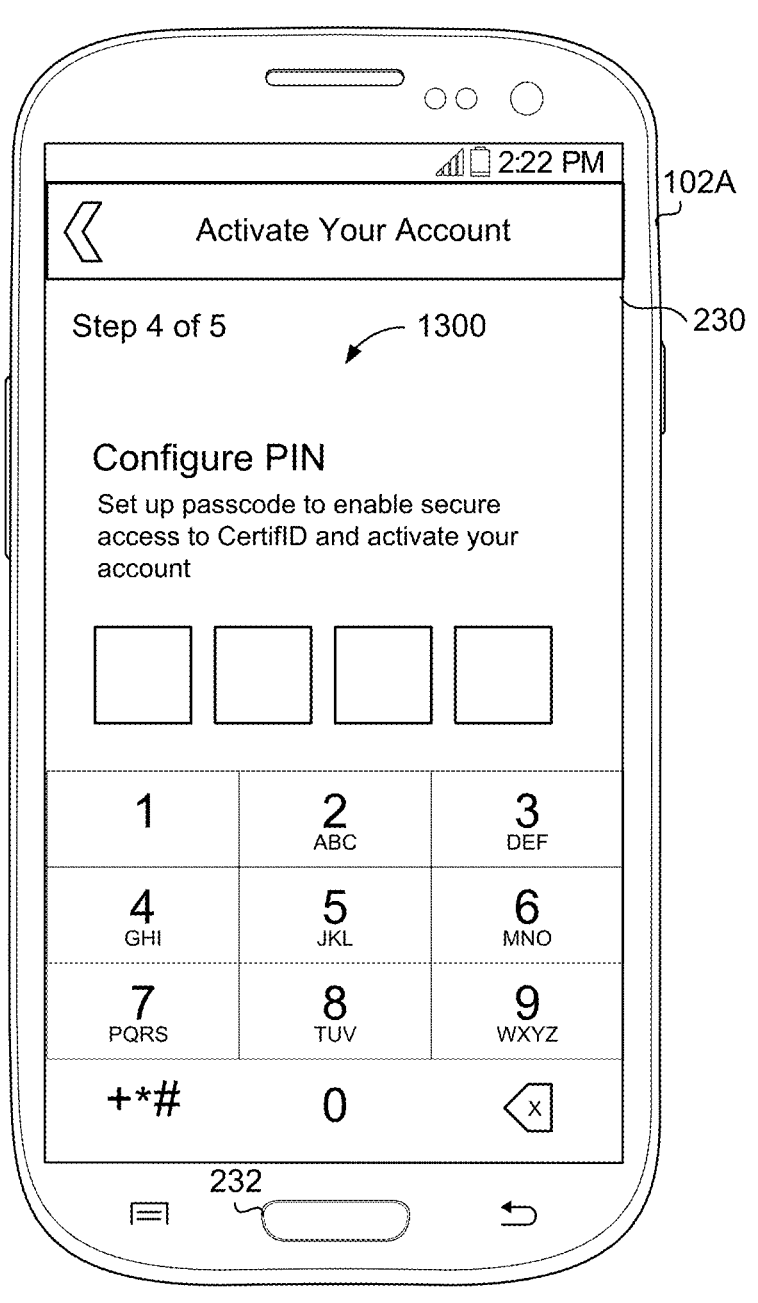
FIG. 13A is a schematic view of an example PIN configuration GUI produced by the secure transaction application executed by the mobile communication device as part of a user authentication portion of the user registration process illustrated in FIG. 12.
Figure 13B:
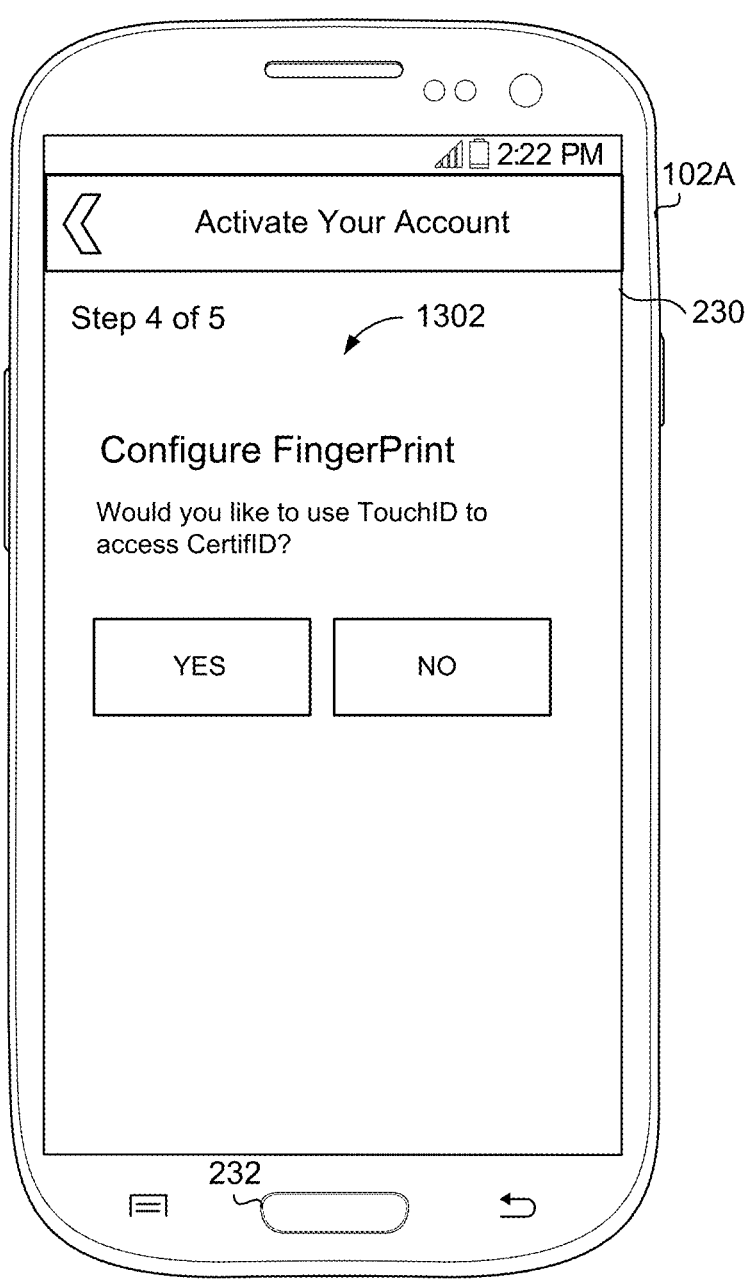
FIG. 13B is a schematic view of an example fingerprint access configuration GUI produced by a secure transaction application in a user registration process.

At step 1212 of the user registration process 1200, the ST server 104 is operable to determine whether the user verification flag (UVF) is set to pass, "P," or fail, "F." When the UVF is set to F, the ST server 104 is operable at step 1214 to transmit UVF=F to the registering user's mobile communication device 102A, and the registering user's mobile communication device 102A is operable to display the failure message and terminate the user registration process 1200. When, at step 1212, the ST server 104 determines that UVF=P, the user registration process 1200 advances to steps 1218A and 1218B where the ST server 104 is operable to transmit UVF=P to the registering user's mobile communication device 102A. In response to receipt of UVF=P by the registering user's mobile communication device 102A, the processor 200 is operable at step 1218B to control the display screen 230 to display a personal identification (PIN) selection GUI 1300 as illustrated by FIG. 13A. At step 1220, the registering user selects a PIN and enters the selected PIN into the PIN selection GUI 1300. Following the selection and entry of the PIN, at step 1222 the processor 200 of the registering user's mobile communication device 102A controls the communication circuitry 210 to transmit the user-selected PIN to the ST server 104.

FIG. 13A is an example PIN selection GUI 1300. In this example, the user selectable PIN is four-digits. Yet in other examples the user-selectable PIN includes more or fewer digits and/or requires one or more alphabetic characters and/or symbols. In some implementations, the user registration process 1200 requires the user-selected PIN to be entered more than once (e.g., twice) before transmitting the PIN to the ST server 104. In other implementations, the process 1200 requires the user-selected PIN to be entered fewer times before transmitting the PIN to the ST server 104.

Optionally, the process 1200 includes a step 1224 (e.g., following step 1222), where the registering user is provided with a selectable option to tie the user-entered PIN to a biometric identifier ("biometric ID") or to setup a biometric identifier or secure token in lieu of the user-entered PIN. A secure token may generate a private key unique to the user with possession of the secure token. For example, during a login attempt with a security credential such as the private key, the ST Sever 104 determines whether the private key is authentic by determining that the secure token matches at least one secured token stored in a secure token database accessible to the ST server 104 and that the private key matches the private key associated with the user. In some examples, such as FIG. 13B, the registering user encounters a choice to tie the user-entered PIN to a fingerprint ID. In these examples, the biometric identification device 232 (see FIG. 2) is provided in the form of a fingerprint detection sensor as illustrated by example in the fingerprint configuration GUI 1302 depicted in FIG. 13B. For example, the registering user elects to tie the user-entered PIN to the registering user's fingerprint(s) or thumbprint(s), by selecting the "YES" GUI element displayed in the GUI 1302. Here, the processor 200 is responsive to the "YES" selection to execute a fingerprint and/or thumbprint learning process where the registering user holds a finger or thumb in contact with the sensor 232 while the processor 200 learns the print and couples or ties the learned print to the user-selected PIN. The user registration process 1200 advances to step 1226 after the fingerprint or thumbprint learning process, or advances based on the user-selection of the "NO" GUI element displayed in GUI 1302. In some examples of the process 1200, step 1222 is configured to offer the registering user the option to tie the user-selected PIN to one or more biometric identifiers.

Figure 13C:
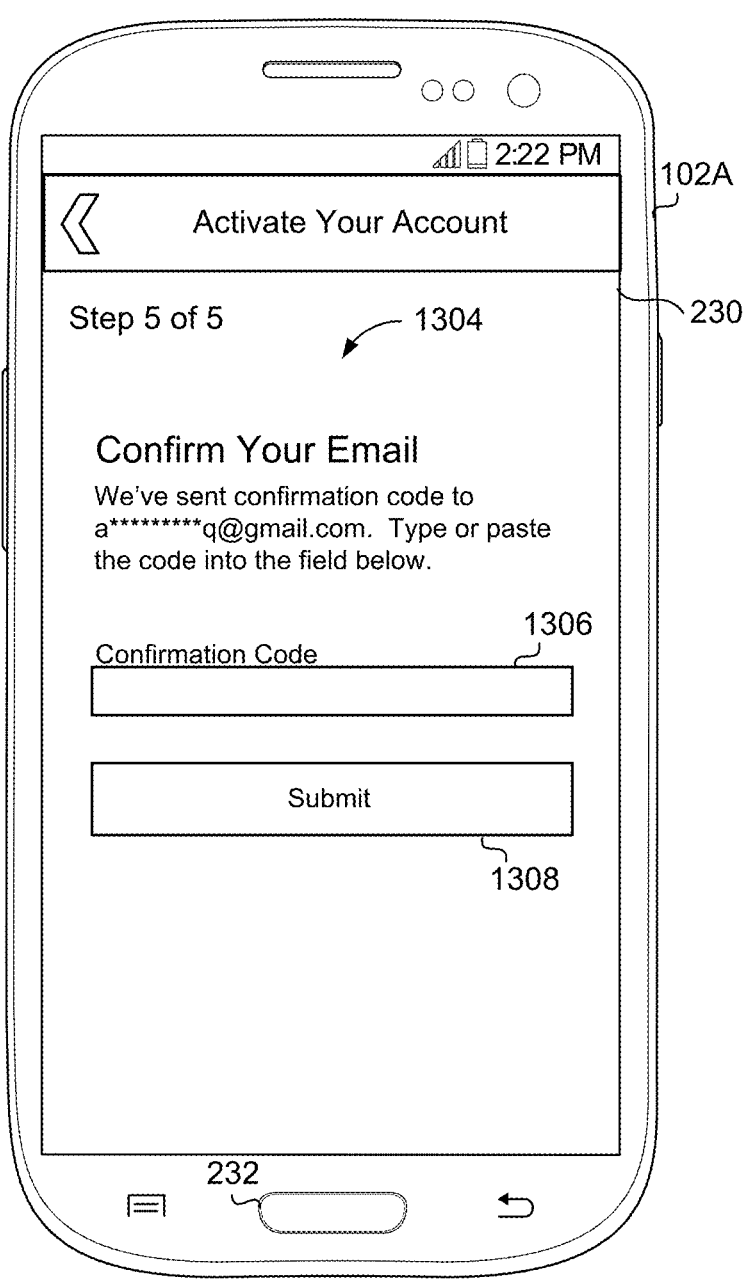
FIG. 13C is a schematic view of an example confirmation code entry GUI produced by a secure transaction application as part of a user registration process.
Figure 13D:
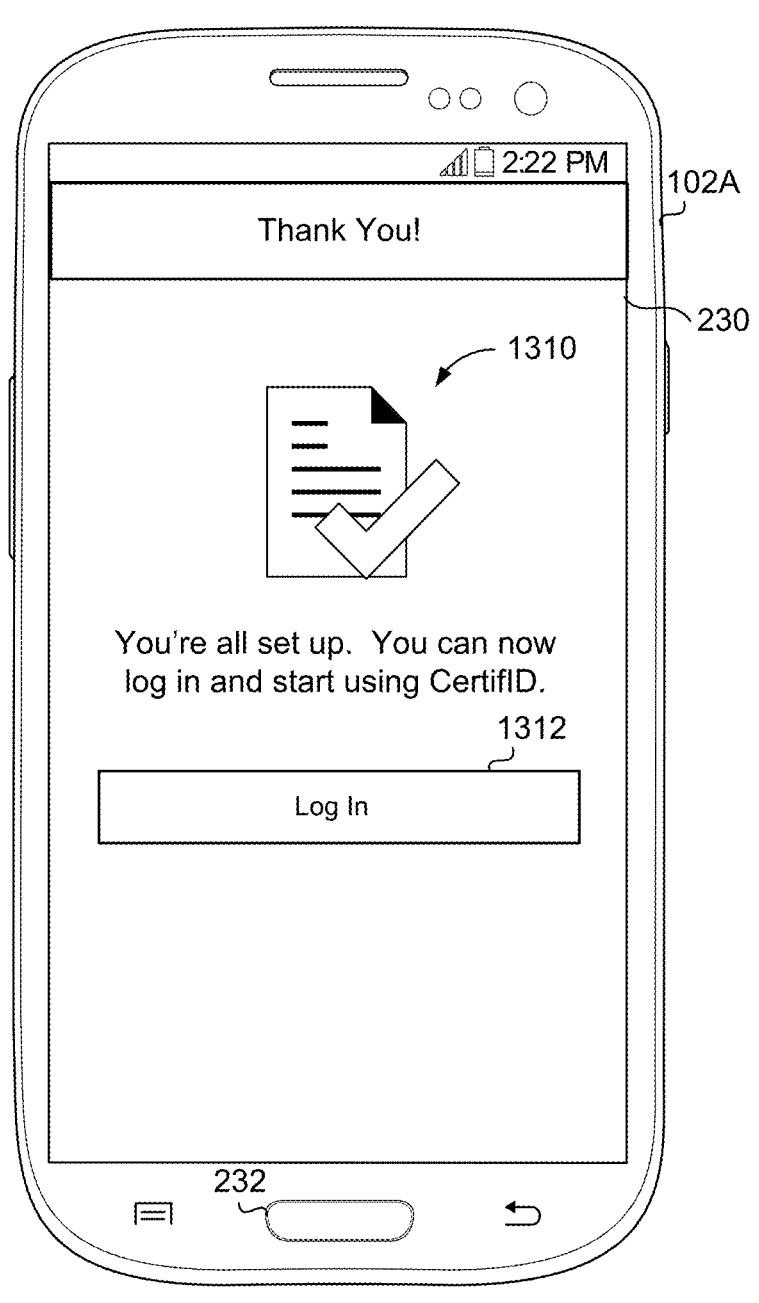
FIG. 13D is a schematic view of an example registration success GUI produced by a secure transaction application.

In some examples following either step 1222 or step 1224, at step 1226, the processor 200 of the registering user's mobile communication device 102A is operable to control the display screen 230 to display a confirmation code (CC)

entry GUI 1304. For example, FIG. 13C depicts a confirmation code GUI 1304 that includes a confirmation code GUI field 1306 and a selectable "submit" GUI element 1308.

The user registration process 1200 also advances from step 1222 to step 1228 where the ST server 104 receives and stores the user-selected PIN, secure token and/or biometric ID in the user's account data 502. At step 1230, the ST server 104 is operable to generate a confirmation code (CC) and to transmit the confirmation code to the registering user's email address stored in the user's account data 502. Although in some examples, the confirmation code (CC) is a multiple-digit numerical code, in other examples the confirmation code includes any number of digits, letters, symbols, or any combination thereof. The user registration process 1200 advances from step 1230 to step 1232 where the registering user accesses the registering user's email account and opens the email message with the confirmation code sent by the ST server 104. The registering user may access the registering user's email account via any electronic device. Some examples include the registering user's mobile communication device 102A or the registering user's computer 102B. For example, FIG. 12 depicts step 1232 as straddling the left-most vertical line to illustrate that the registering user may access the registering user's email account via either device 102A, 102B.

In some implementations, the ST server 104 is operable to generate the confirmation code (CC) that includes MCD information for the registering user's mobile communication device 102A. Inclusion of MCD information in the CC may replace or supplement the mobile communication device identification and comparison steps 640, 642 executed as part of the user information verification process 1210 (e.g., FIGS. 6B and 9). In other implementations, the ST server 104 is operable to generate the confirmation code (CC) that includes other information relating to the registering user, or no information relating to the registering user, or information relating to the registering user's mobile communication device 102A. The confirmation code (CC) may be unique or random to prevent duplication and fraud.

With confirmation code sent by the ST server 104, at step 1234, the registering user enters the received confirmation code into the confirmation code GUI field 1306 displayed on the display screen 230 of the registering user's mobile communication device 102A, and selects the "Submit" GUI element 1308. In response, the processor 200 of the registering user's mobile communication device 102A controls the communication circuitry 210 at step 1236 to transmit the user-entered confirmation code to the ST server 104.

Following step 1236, the process 1200 advances to step 1238 where the ST server 104 is operable to compare the user-entered confirmation code with that generated by the ST server 104 at step 1230 to determine whether a match exists. When the comparison does not yield a match, the process 1200, at step 1240, determines whether the code comparison at step 1238 represents a first comparison. When the code comparison represents the first comparison attempt, the process 1200 loops back to step 1230 where the ST server 104 is operable to generate and transmit a new confirmation code. When instead the ST server 104 determines at step 1240 that the code comparison at step 1238 represents a second comparison attempt, the process 1200 advances to step 1242 where the ST server 104 is operable to set the user authentication flag UAF=Fail or "F," and to transmit the UAF to the registering user's mobile communication device 102A. At step 1244, the registering user's mobile communication device 102A receives UAF, displays a failure message, and terminates the user registration process 1200. When, at step 1238, the comparison instead yields a match, the ST server 104 sets UAF=Pass or "P" at step 1246 and transmits the UAF to the registering user's mobile communication device 102A. When the UAF is a pass, the user registration process 1200 advances to step 1248. At step 1248, the registering user's mobile communication device 102A receives the UAF and the processor 200 controls the display screen 230 to display a registration success message. For example, the processor 200 displays the message illustrated in the example GUI 1310 in FIG. 13D. Besides the registration success message, the GUI 1310 may further include a selectable login GUI element 1312 such as FIG. 13D. With a successful registration, the processor 200 of the now registered user's mobile communication device 102A is responsive to a user-selection of the login GUI element 1312 to transmit the user selection to the ST server 104. Upon the user selection, the ST server 104 may login the registering user and may grant access by the now-registered user to the secure transaction environment. The ST server may also transmit an indicator or message of the login grant to the registered user's mobile communication device 102A. In some examples the processor 200 of the registered user's mobile communication device 102A is responsive to the secure transaction environment grant indicator or message to control the display screen 230 to display a secure transaction environment home GUI similar to the home GUI 770 illustrated by FIG. 7K. FIG. 15C is an example of the home GUI 1514. In FIG. 15C, the home GUI 1514 displayed by the processor 200 of the registered user's mobile communication device 102A upon successful login by a registered user includes a user-selectable transaction start GUI element 1516, a user-selectable send request GUI element 1518, and a user-selectable dashboard GUI element 1520 similar or identical to the GUI elements illustrated in FIG. 7K.

Registered User Login Process: 2nd Example

Figure 14:
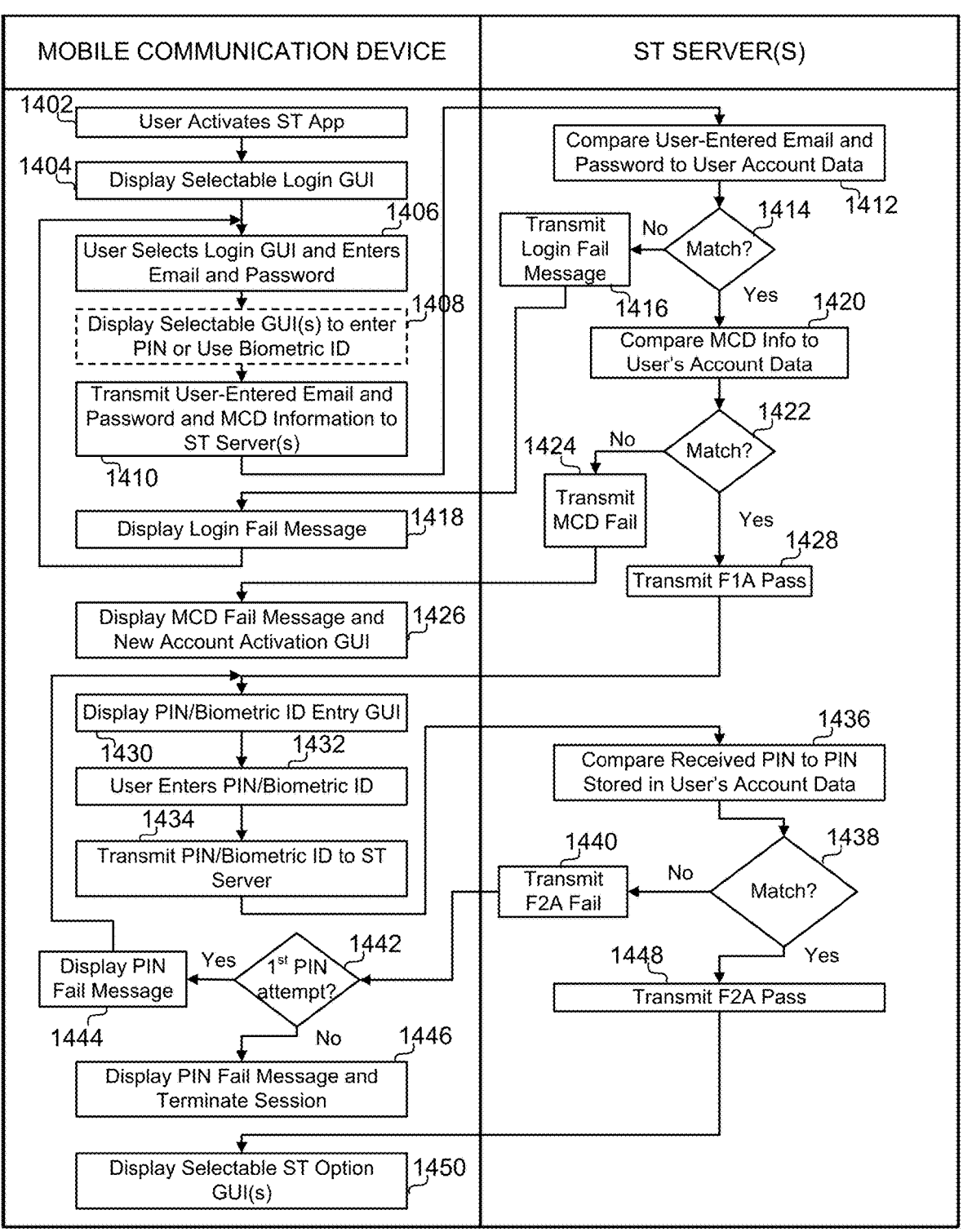
FIG. 14 is a flow diagram of an example of a user login process for accessing a secure transaction environment by a registered user via a secure transaction application.

In some examples, the system 100 further provides for an alternative or additional registered user login process that is conducted between the ST server 104 and the registered user's mobile communication device 102A. In these examples, the registering user does not need access to a user computer 102B. FIG. 14 is an example flow diagram of such a registered user login process 1400 where registered users may access the secure transaction environment managed and controlled by the ST server 104.

As illustrated by FIG. 14, the process 1400 may be divided into columns (e.g., mobile communication device, ST server(s)) where each column corresponds to a step of the process 1400 performed by the component. A portion to the right of the central vertical line under the heading "ST Server," represents one or more software applications executed by the processor(s) 400 of the ST server 104. In some examples, this portion of the process 1400 is stored in the user login management module 516 (see FIG. 5) in the form of instructions executable by the processor(s) 400 of the ST server.

Another portion of the process 1400 located to the left of the central vertical line under the heading "Mobile Communication Device," represents operations executed by a registered user's mobile communication device 102A and/or operations carried out by the registered user's interaction with the registered user's mobile communication device 102A. In some examples, this portion includes the ST App 220 stored in the memory 204 (and/or data storage 206) of the registered user's mobile communication device 102A in the form of instructions executable by the processor 200 of the registered user's mobile communication device 102A.

Figure 15A:
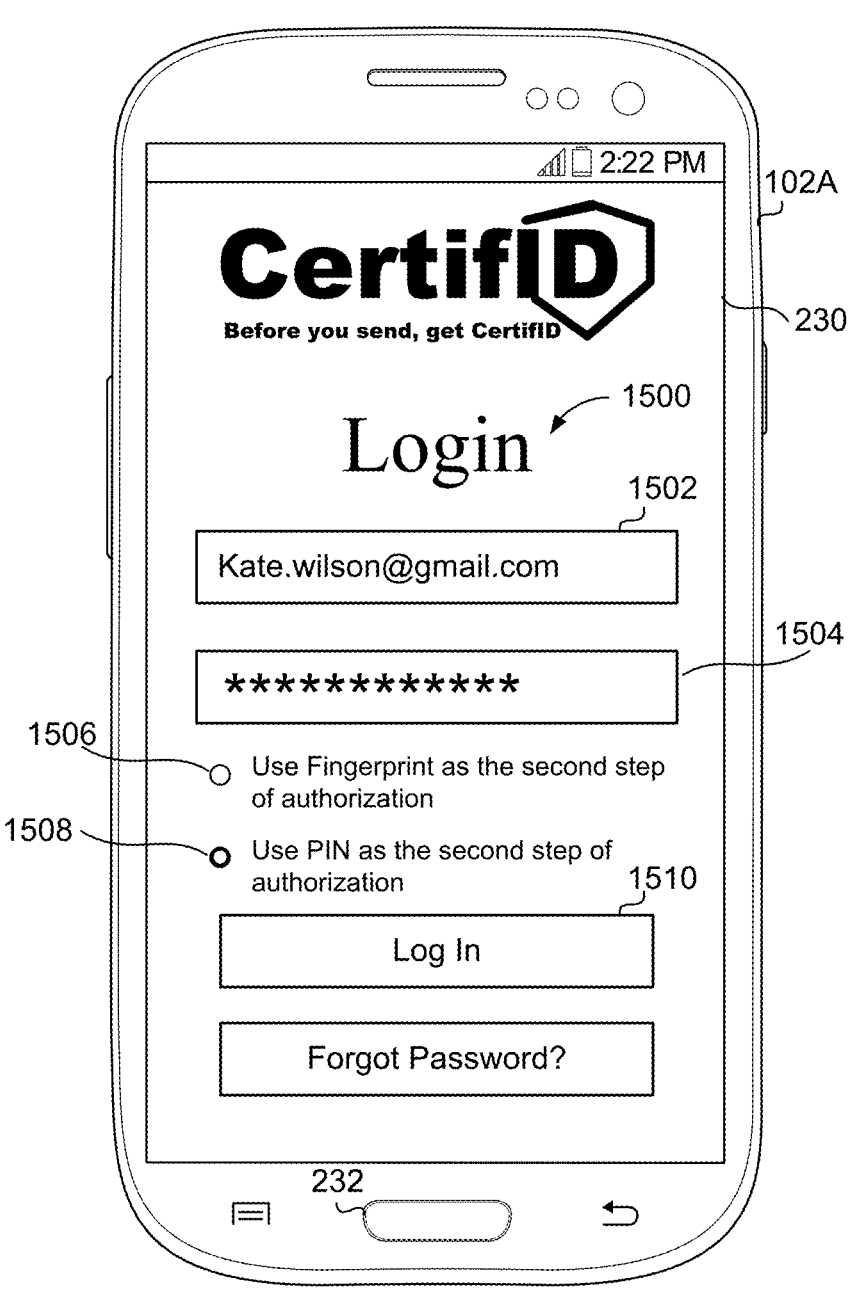
FIG. 15A is a schematic view of an example user login GUI produced by the secure transaction application as part of a user login process.
Figure 15B:
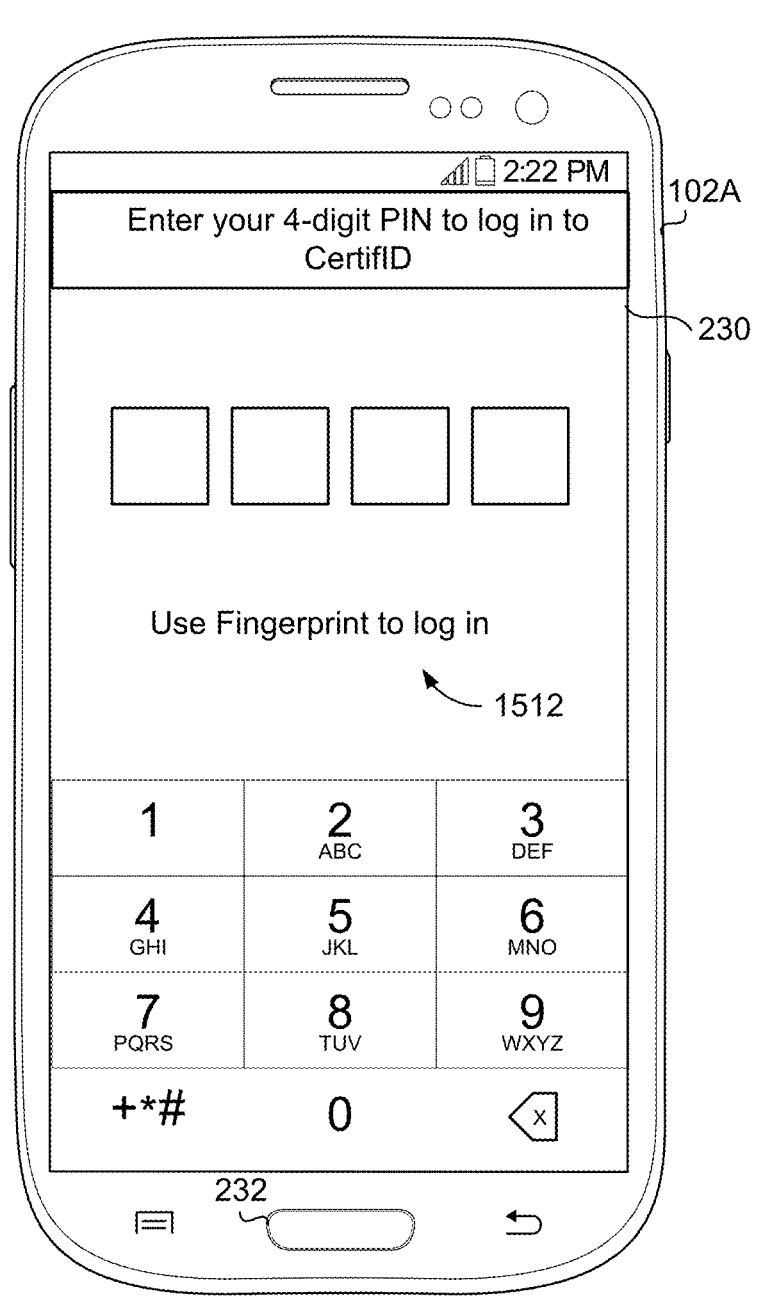
FIG. 15B is a schematic view of an example user PIN GUI produced by a secure transaction application as part of a user login process.
Figure 15C:
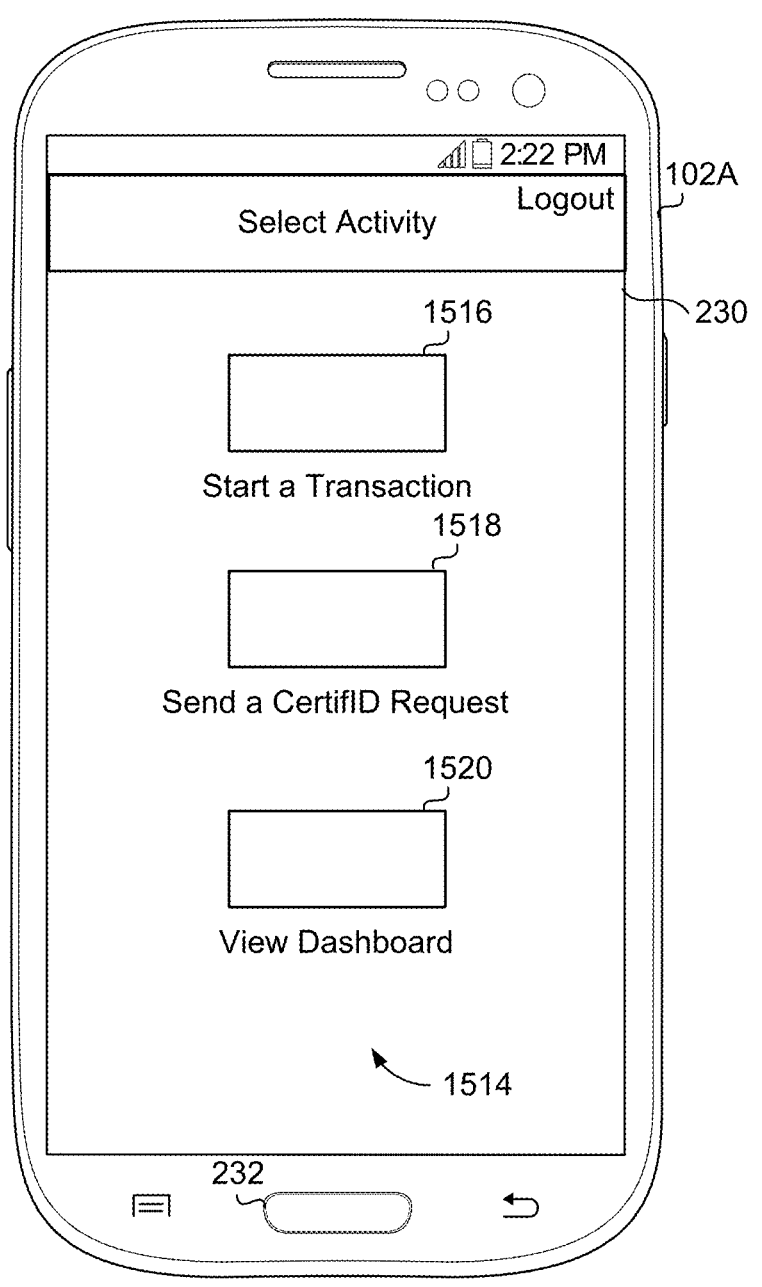
FIG. 15C is a schematic view of an example secure transaction home page, as part of a secure transaction environment.
Figure 16:
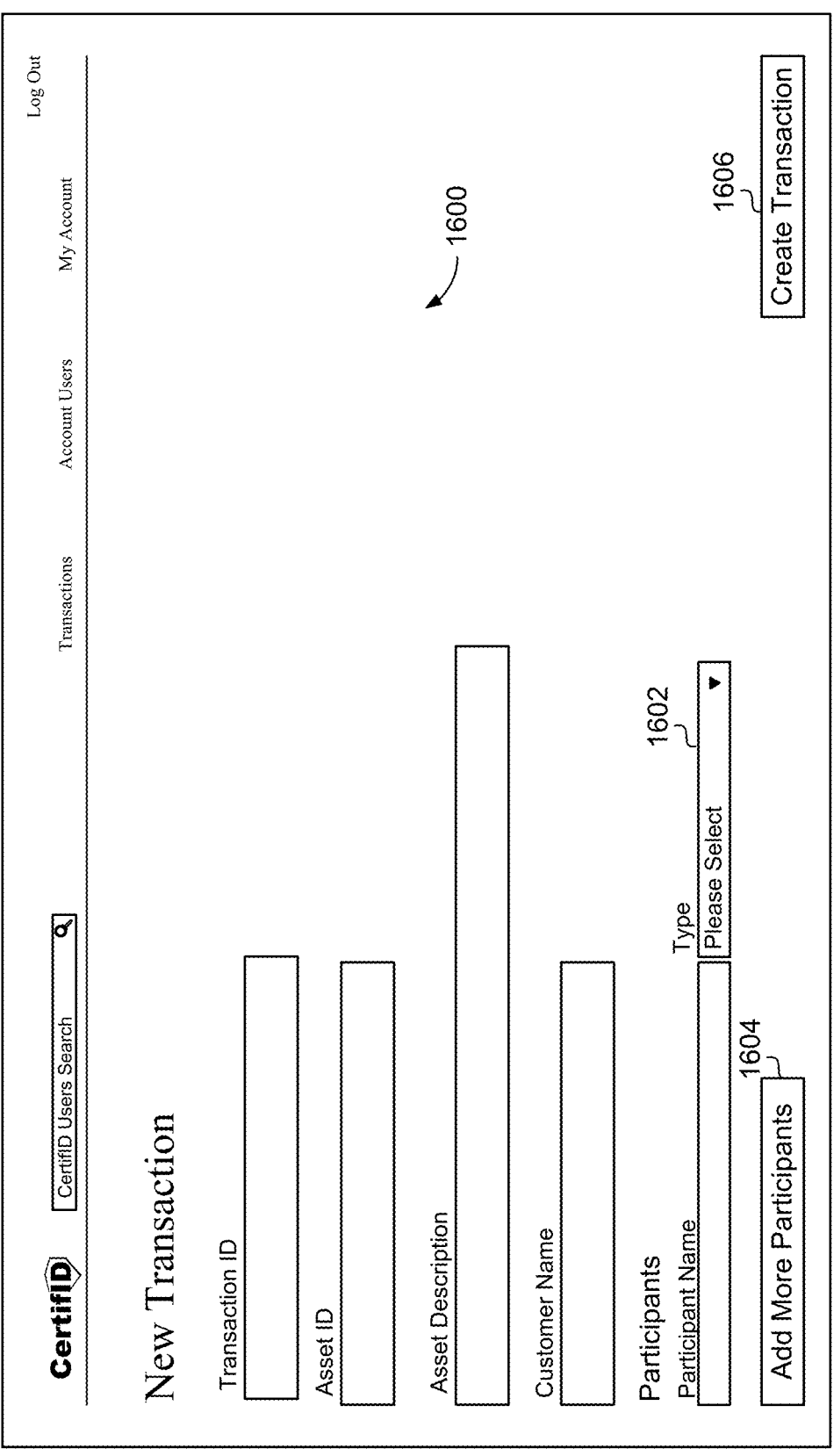
FIG. 16 is a schematic view of an example new transaction GUI produced by one or more secure transaction servers or by a secure transaction application as part of the new transaction portion of the secure transaction environment.

FIGS. 15A-15C are graphical representations in the form of screenshots produced by the processor 200 of the registered user's mobile communication device 102A and displayed on the display screen 230 to illustrate some steps of the process 1400. Where included, these screenshots are shown in the form of GUIs generated by the processor 200 of the registered user's mobile communication device 102A during execution of the ST App 220.

The process 1400 begins at step 1402 where the registered user launches or activates the ST App 220 stored on the registered user's mobile communication device 102A. At step 1404, the registered user's mobile communication device 102A displays a selectable login GUI. For example, as described above, FIG. 11A is an example home GUI 1100 displayed on the display screen 230 in response to step 1404. At step 1406, the processor 200 of the registered user's mobile communication device 102A displays a login GUI 1500 based on the registered user's selection of the login GUI element 1102 displayed on the home GUI 1100 (e.g., FIG. 15A). The login GUI 1500 may include user email and password GUI fields 1502 and 1504, respectively, as well as a selectable "Log In" GUI element 1510. At step 1406, the registered user enters the registered user's email and password into the respective GUI fields 1502 and 1504 and selects the "Log In" GUI element 1510.

Optionally, the login GUI 1500 includes user-selectable GUI elements 1506 and 1508 for user selection of login via biometric ID, such as fingerprint ID, or login via user entry of the registered user's PIN. In some examples, the process 1400 includes an optional step 1408 which allows the user to select the GUI element 1506 or 1508. When the user selects the GUI element 1506, the processor 200 of the registered user's mobile communication device 102A executes a fingerprint or thumbprint learning process and couples or ties the learned fingerprint or thumbprint to the registered user's PIN. In other examples, the process 1400 may offer the registered user the option to tie the user-selected PIN to one or more alternate or additional biometric identifiers (e.g., biometric identifiers described above with respect to FIG. 2). In the example login GUI 1500 in FIG. 15A, the registered user has elected, based on the selection of the GUI element 1508, to use the registered user's PIN in the second stage of the user authorization process.

The process 1400, as depicted by FIG. 14, may advance to step 1410 from step 1406 or step 1408. At step 1410, the registered user's mobile communication device 102A transmits to the ST server 104 the user-entered email and password, along with the mobile communication device (MCD) information of the registered user's mobile communication device 102A. At step 1412, the ST server 104 is operable to compare the user-entered email and password to the registered user's account data 502. At step 1414, the process 1400 determines whether the user-entered email and password match the user's account data. When no match is found, the process 1400 advances to step 1416 where the ST server transmits a login fail message to the registered user's mobile communication device 102A. At step 1418, the registered user's mobile communication device 102A receives and displays the login fail message, and the processor 200 loops back to step 1402.

When a match is found at step 1414, the process 1400 advances to step 1420 where the ST server 104 is operable to compare the received MCD information to MCD information stored in the registered user's account data 502. At step 1422, the process 1400 determines whether the comparison at step 1420 results in a match. When no match is found, the process 1400 advances to step 1424 where the ST server 104 is operable to transmit an MCD fail message to the registered user's mobile communication device 102A. At step 1426, the registered user's mobile communication device 102A receives and displays the MCD fail message, and the processor 200 controls the display 230 to display the new account activation GUI 800 illustrated by FIG. 8A. Thus, if the registered user attempts to log into the secure transaction environment managed and controlled by the ST server 104 using a substitute mobile communication device 102A that is different than that used by the registered user to execute the user registration process 1200, the user is required to re-execute the user registration process 1200 with the substitute mobile communication device 102A to tether the substitute mobile communication device 102A by the registration process 1200 to the registered user's account as described above. Thus, if a fraudster somehow gains access to a registered user's email and password, the fraudster will not be able to gain access to the secure transaction environment managed and controlled by the ST server 104 because the MCD information of the fraudster's mobile communication device will not match that of the registered user's mobile communication device 102A. Additionally, it is unlikely the fraudster will be able to successfully pass the new user registration process posing as the registered user as the fraudster will not be able to successfully answer the private questions related to the registered user as part of the user information verification process 616A, 616B, 1210 described above.

When, at step 1422, the ST server 104 finds a match between the MCD information transmitted by the registered user's mobile communication device 102A at step 1410 and that stored in the registered user's account data 502, the process 1400 advances to step 1428 where the ST server 104 is operable to transmit a pass message. For example, FIG. 14 illustrates a factor 1 authentication "F1A Pass" message as the pass message to the registered user's mobile communication device 102A. At step 1430, the registered user's mobile communication device 102A receives the "F1A Pass" message, and, in response, the processor 200 of the registered user's mobile communication device 102A is operable to display a PIN/Biometric ID entry GUI. As depicted by the example in FIG. 15A, the registered user has selected the PIN entry GUI element 1508, and at step 1430 the processor 200 of the registered user's mobile communication device 102A controls the display screen 230 to display a PIN entry GUI 1512 as shown in FIG. 15B. At step 1432, the registered user enters the registered user's PIN into the PIN entry GUI 1512, and at step 1434 the processor 200 of the registered user's mobile communication device 102A transmits the user-entered PIN to the ST server 104.

At step 1436, the ST server 104 receives the user-entered PIN from the registered user's mobile communication device 102A and compares the received PIN to the PIN stored in the registered user's account data 502. At step 1438, the process 1400 determines whether the comparison results in a match. When a match is not found, at step 1438, the process 1400 advances to step 1440 where the ST server 104 is operable to transmit a fail message, such as a factor 2 authentication message "F2A Fail," to the mobile communication device 102A from which the PIN was transmitted at step 1434. Based on the match failure, at step 1442, the mobile communication device 102A that originated the PIN receives the F2A Fail message, and the processor 200 thereof determines whether the transmission at step 1434 represents a first transmission of a PIN during the current execution of the process 1400. When the pin is the first transmission, the processor 200 controls the display screen 230 to display a PIN fail message and the process 1400 loops back to step 1430. When the processor 200 determines at step 1442 that the transmission at step 1434 does not represent a first transmission of a PIN during the current execution of the process 1400, the process 1400 advances to step 1446 where the processor 200 is operable to control the display screen 230 to display a PIN failure message and to terminate the login process 1400.

When, at step 1438, the ST server 104 determines a match between the PIN transmitted at step 1434 and the PIN stored in the registered user's account data 502, the ST server 104 grants access to the mobile communication device 102A that transmitted the PIN at step 1434, such as the registered user's mobile communication device 102A. At step 1448 of the process 1400, the ST server 104 is operable to transmit a pass message, such as a factor 2 authentication message "F2A Pass," to the registered user's mobile communication device 102A. At step 1450, the registered user's mobile communication device 102A, receives the F2A Pass message, and is operable to control the display screen 230 to display the secure transaction environment home (e.g., the secure transaction environment home GUI 1514 of FIG. 15C).

Although FIGS. 14-15C represent some examples of the registered user login process 1400, other variants of the process 1400 may require a greater, lesser, and/or different number and/or type(s) of security features in order to complete the login process. For example, the registered user login process 1400 may be modified to include some or all of the steps of the user information verification process 616A, 616B illustrated in FIG. 6B. In other examples, the process 1400 is modified to require generation of, and registered user answering of, one or more private questions as described above by example FIG. 7F. Additionally or alternatively, the registered user login process 1400 may be modified to include some or all of the steps of the user authentication process, such as the PIN selection and/or confirmation code process illustrated in FIG. 12. Additionally or alternatively still, the registered user login process 1400 may be modified to require (e.g., upon first and/or periodic login attempts by a registered user) the registered user to select one or more security questions and answers thereto. The process 1400 may be further modified to require, periodically or otherwise, a registered user executing the login process 1400 to answer one or more such security questions as part of the login process 1400 (e.g., FIG. 9).

Described above are several processes that may take place within the secure transaction system 100 (e.g., the registration processes 600, 1200, the verification process 616, the authentication process 620, the login processes 900, 1400, etc.). Security credentials, such as usernames, emails, passwords, PINs, secure tokens, biometric identifiers, or other types of user information and/or mobile communication device information, may be used throughout these processes to access, initiate, or conduct transactions within the secure transaction environment. These security credentials may be stored in one or more locations or transmitted between locations within the environment 500. As one such example, the security credentials are predominantly stored within the user account data 502, but communicated to the third party database integration module 506 or the user login management module 516. Although different types of security credentials are interwoven within the examples described above and associated with depicted GUI fields and/or entry fields, design of the system 100 may vary and/or interchange the type of security credentials related to different steps of the processes (e.g., the registration processes 600, 1200, the verification process 616, the authentication process 620, the login processes 900, 1400, etc.).

The Secure Transaction Environment

Upon grant of access to the secure transaction environment managed and controlled by the ST server 104 as described above, one or more verifier users and one or more client users may conduct secure transactions. The identities of participants within the secure transaction environment are secure due to the rigorous user registration and login processes previously described. Each time a registered user logs into the secure transaction environment, that user's identity is authenticated by the system 100. For example, the registered user login requests use of a mobile communication device registered to the user as part of the registration process, re-authenticating the user by sending certain digital identity attributes from the user's device and comparing it to the digital records of a third party data provider.

Several transaction-related processes are available within the secure transaction environment managed and controlled by the ST server 104. As illustrated in each of FIGS. 7K and 15C, for example, new transactions may be started, requests may be sent by one or more transaction participants to one or more other participants of the same transaction within the secure transaction environment, and/or a secure transaction environment dashboard may be viewed by transaction participants. With the aid of the screenshots illustrated in FIGS. 16-20, examples of the foregoing transaction-related processes will be described below.

The screenshots illustrated in FIGS. 16-20 may be accessed in some examples by a registered user via the registered user's mobile communication device 102A. For example, the processor 200 of the registered user's mobile communication device 102A is operable to control the display screen 230 thereof to display screens corresponding to the screenshots. The user may select displayed GUI elements and/or enter information into displayed GUI fields by user interaction with the registered mobile communication device 102A. Generally, information exchange between the registered user's mobile communication device 102A and the ST server 104 is carried out by the communication network 106. In some implementations, the processes illustrated by example in FIGS. 16-20 are illustratively stored in the secure transaction management module 518 (see FIG. 5) in the form of instructions executable by the processor(s) 400 of the ST server and/or in the ST App 220 in the form of instructions executable by the processor 200 of the registered user's mobile communication device 102A.

Additionally or alternatively, the screenshots illustrated in FIGS. 16-20 may be accessed by a registered user through the registered user's computer 102B. Here, the processor 300 of the user computer 102B is operable to access a secure web page or website hosted by the ST server 104 via the communication network 106. The ST server 104 is operable to control the secure web pages accessed by the user computer 102B. The user may select GUI elements and/or enter information into GUI fields displayed by the ST server 104 on the secure web pages by user interaction with the user's computer 102B (e.g., typing, selecting with a mouse, etc.). In some implementations, the processes illustrated by the examples in FIGS. 16-20 are stored in the secure transaction management module 518 (e.g., FIG. 5) in the form of instructions executable by the processor(s) 400 of the ST server.

The example transaction-related processes depicted in FIGS. 16-20 and described below are illustrated in the context of real estate transactions (e.g., the buying and selling of real property). This disclosure is not limited to such transactions or transaction-related processes. Moreover, the processes illustrated in FIGS. 16-20 are provided only by way of example and should not be considered to be limiting in any way.

Start A Transaction

In some examples, only verifiers or verifier users may start a new transaction. For example, the "Start a Transaction" GUI element 772 or 1516 is provided only to registered verifiers or verifier users in the secure transaction environment GUI or web page 770 or 1514. In other examples, however, clients or client users start transactions, and therefore the "Start a Transaction" GUI element 772 or 1516 is available to both registered verifiers and registered clients. In any case, selection by a registered user of the "Start a Transaction" GUI element 772 or 1516 illustrated in FIG. 7K or 15C may produce the new transaction GUI or web page 1600 illustrated in FIG. 16. In some examples such as FIG. 16, new transactions are assigned an identifier, such as an EventID, a Property ID, or a customer name, and may include any number of participants. Each participant may be further classified by user-selected participant type according to a pulldown menu of participant types 1602. Examples of such participant types in real estate transactions include borrower, buyer, seller, lender, agent, attorney, representative, Title Company and others. In some examples, the ST server 104 is operable during the new transaction process to flag any existing transactions involving the same identified asset and/or customer such that any existing transactions may be investigated prior to creating the new transactions to prevent duplicate transactions.

Send a Request

Figure 17A:
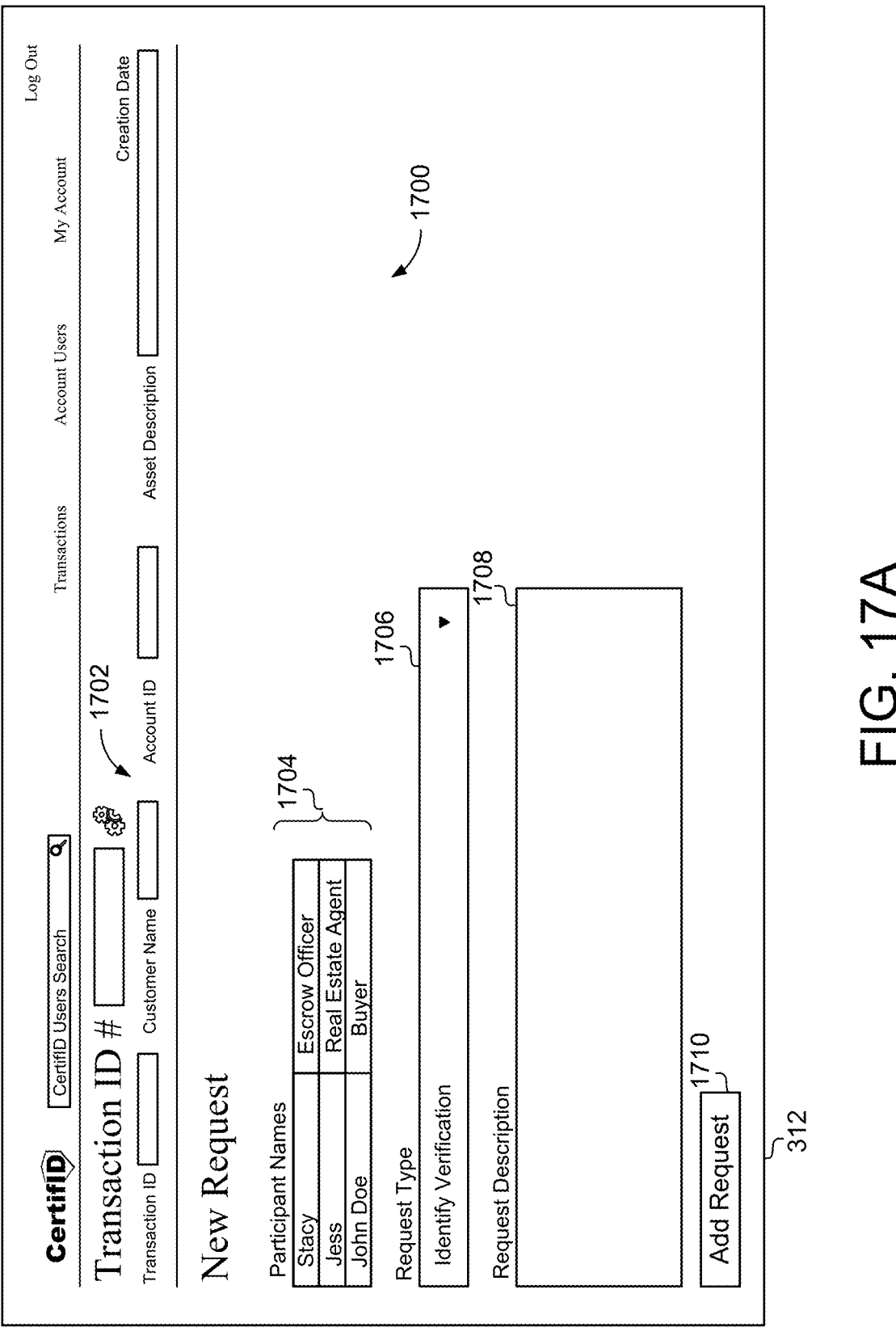
FIG. 17A is a schematic view of an example identity verification request GUI produced by one or more secure transaction servers or by a secure transaction application within a secure transaction environment.

One or more participants in any particular transaction may send a request to another participant in the transaction. The ST server 104 is operable to store all such requests, and information relating thereto, in the transaction data 504. Selection by a registered user of the "Send a Request" GUI element 774 or 1518 illustrated in FIG. 7K or 15C respectively produces the "Send Request" GUI or web page 1700 illustrated in FIG. 17A. Referring to FIG. 17A, each request is associated with a particular transaction ID 1702, and may be selectively sent to one or more identified participants 1704 in the identified transaction. As depicted by FIG. 17A, the new request is to be sent to transaction participants Stacy, Jess, and John Doe, identified in the "Send Request" GUI as an Escrow Officer, Real Estate Agent, and Buyer respectively in the transaction.

The new request may be one of a number of different request types, and the request type may be user-selectable by a pulldown menu 1706. Some examples of request types in real estate transactions may include identity verification, document verification, or other information. For example, FIG. 17A depicts the new request being generated as an identity verification request. Additionally or alternatively, the "Send Request" GUI or web page 1700 further includes a description GUI field 1708 in which the requestor can enter a description of one or more items of information requiring identity verification. When all such information is entered, the user may illustratively select the "Send Request" GUI element 1710 to create the new request for the identified transaction in the transaction data 504 of the ST server 104.

Figure 17B:
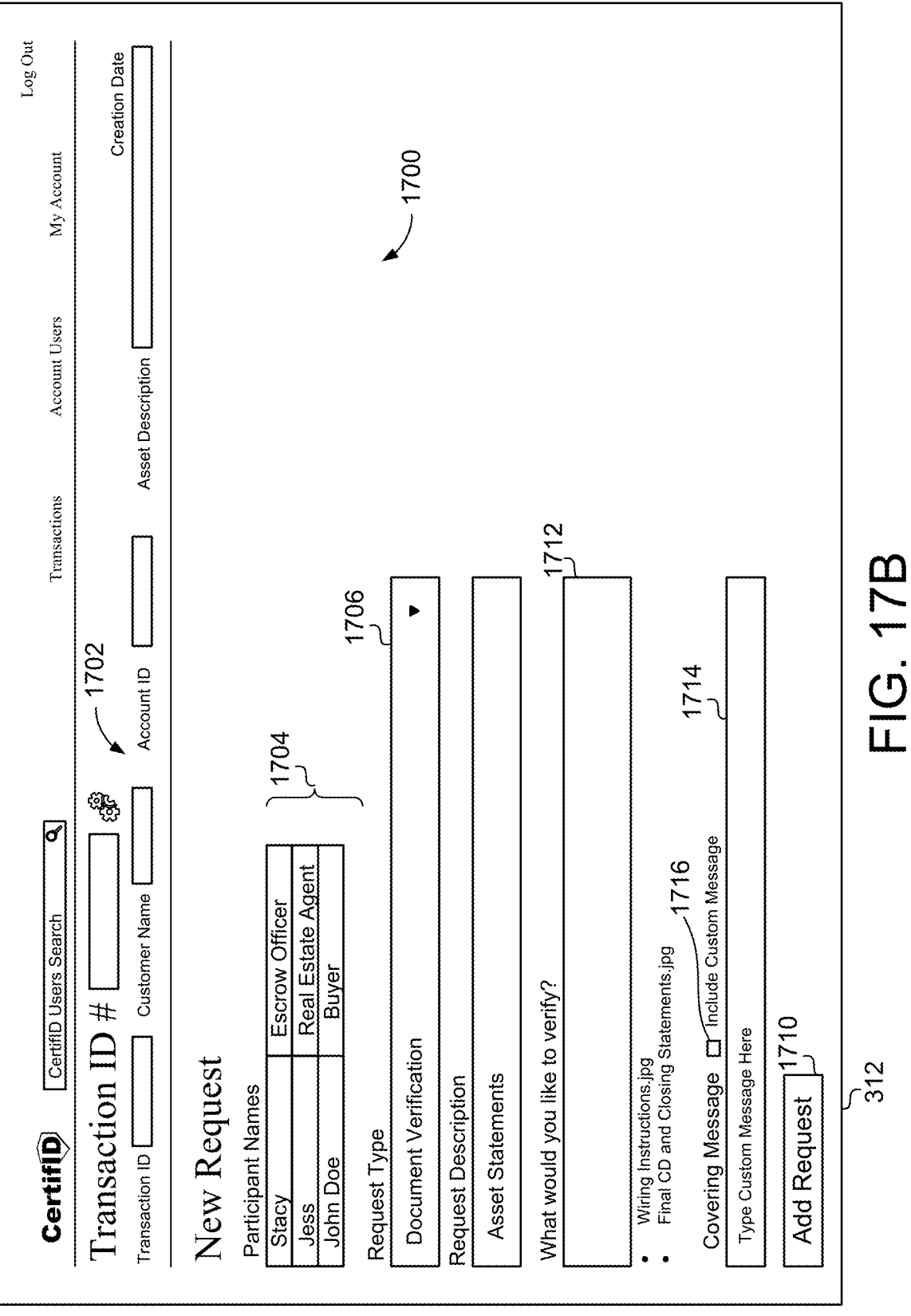
FIG. 17B is a schematic view of an example documentation verification request GUI produced by one or more secure transaction servers or by a secure transaction application within a secure transaction environment.
Figure 17C:
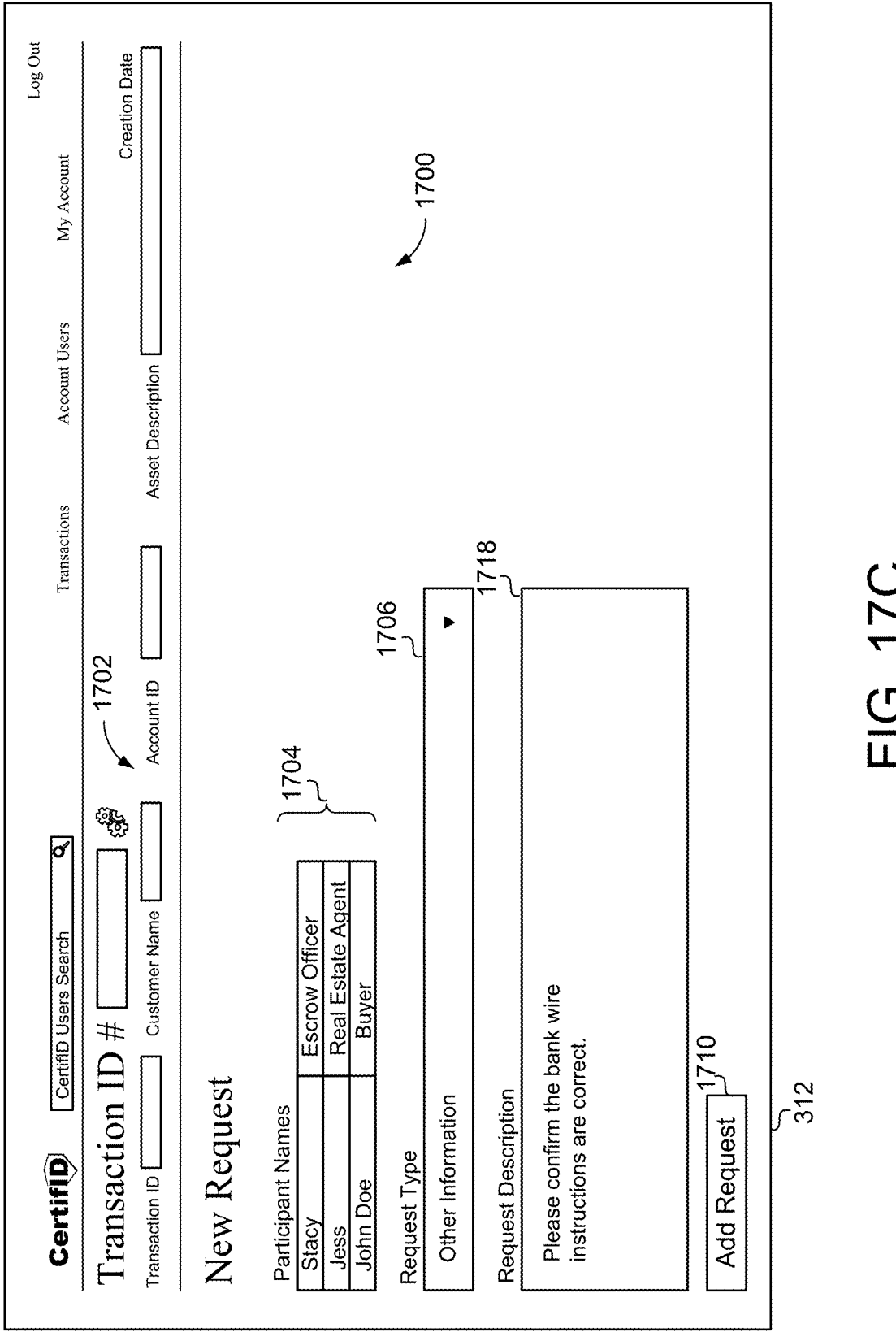
FIG. 17C is a schematic view of an example information verification request GUI produced by one or more secure transaction servers or by a secure transaction application within a secure transaction environment.

FIG. 17B is another example of a new request for a document verification request. Here, the "Send Request" GUI or web page 1700 may include a drag and drop/browse GUI field 1712 where documents can be loaded for verification. Referring to FIG. 17B, the documents Wiring Instructions and Final CD and Closing Statement have been loaded for subsequent verification. The "Send Request" GUI or web page 1700 for document verification requests may also include a pre-written covering message 1714 which will accompany the request. In some examples, a user customizes the covering message by selecting a "Custom Covering Message" GUI element 1716 and then modifying the text of the pre-written covering message 1714. When all such information is entered, the user selects the "Add Request" GUI element 1710 to create the new request for the identified transaction in the transaction data 504 of the ST server 104. FIG. 17C is an example of the new request being generated as an "Other Information" request to be sent to transaction participants Jean and John Doe, the Buyer. In the "Request Description" field 1718 accompanying the "Send Request" GUI or web page 1700 for "Other Information" requests, the requestor enters a description of the request. In FIG. 17C, the Request Description field 1718 includes a request for confirmation of an identified Bank Wire. As in the above examples, when all information is entered, the user selects the "Add Request" GUI element 1710 to create the new request for the identified transaction in the transaction data 504 of the ST server 104.

Figures 1, 17D:
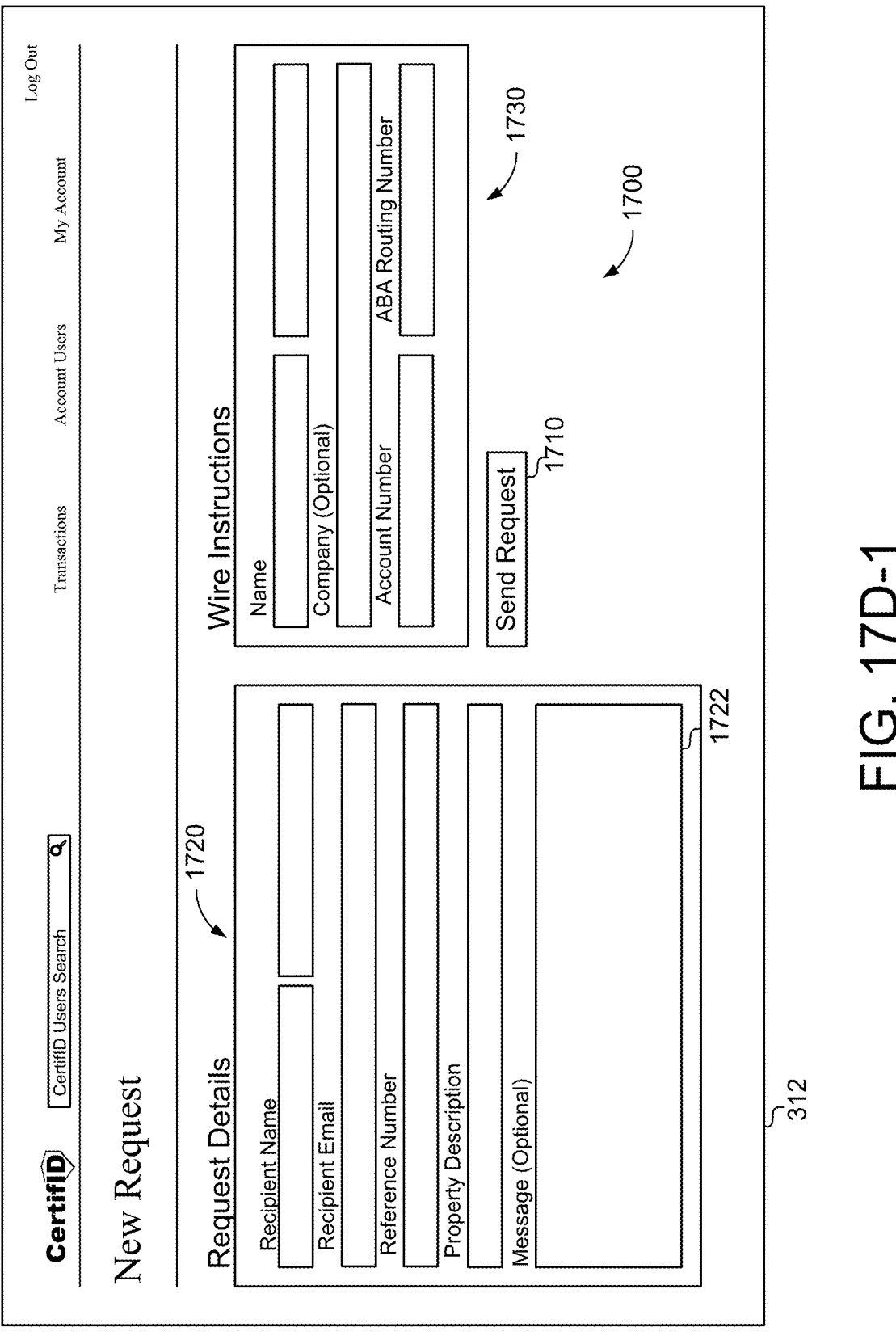
Figures 2, 17D:
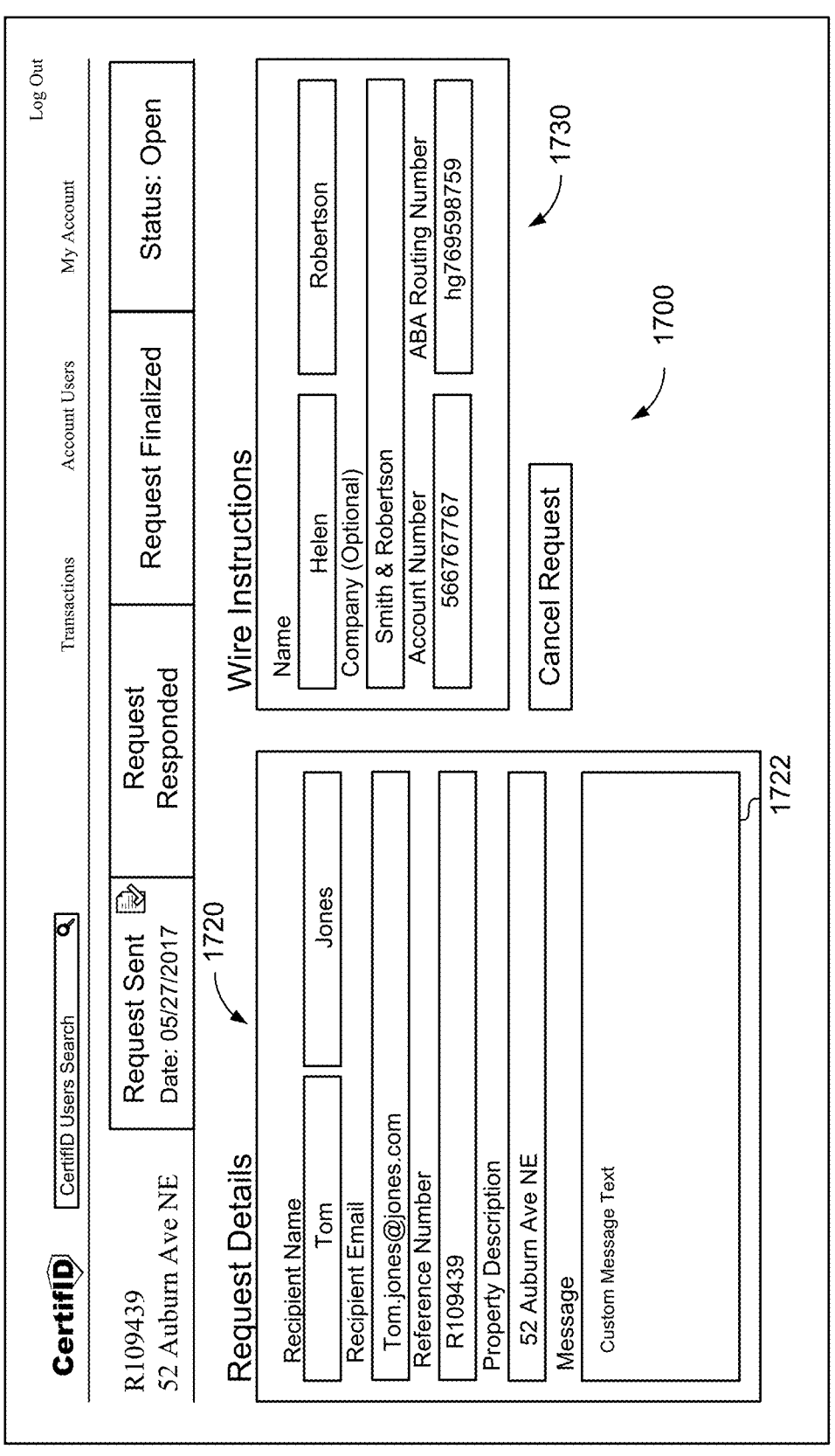

FIGS. 17D-1 and 17D-2 are examples of the new request being generated as a bank account verification request. In these examples, the "Send Request" GUI or web page 1700 further includes a series of fields where bank account information may be added by the person sending the request. Some example fields as shown in FIGS. 17D-1 and 17D-2 are request details 1720 (e.g., recipient name, recipient email, reference number, property descriptions, etc.) and wiring instructions 1730 (e.g., name, company, account number, ABA routing number, etc.). In some configurations, the secure transaction environment is configured such that verification requests are inbound, outbound, or both inbound and outbound (e.g., wiring instructions 1730). The "Send Request" GUI or web page 1700 for document verification requests may also include a field 1722 where the user sending the request may include a message to the recipient. When all such information is entered (FIG. 17D-2), the user selects the "Send Request" GUI element 1710 to create the new request for the identified transaction in the transaction data 504 of the ST server 104.

View Dashboard

In some examples of the secure transaction environment, users may view a transaction dashboard, and the ST server 104 is operable to store all such activity, and information relating to the dashboard, in the transaction data 504. For example selection by registered users of the "View Dashboard" GUI element 776 or 1520 illustrated in FIG. 7K or 15C respectively produces the Dashboard GUI or web page 1800 as illustrated by FIGS. 18A and 18B. Referring to FIG. 18A, the Dashboard GUI or web page 1800 includes at least one user-selectable GUI element 1802 for displaying transaction information, a user-selectable GUI element 1804 for displaying account user information, and a user-selectable GUI element 1806 for displaying personal user account information. In some examples, such as FIG. 18A, the transaction GUI element 1802 is the default selection for the Dashboard GUI or web page 1800. In some implementations, the corresponding Dashboard GUI or web page 1800 displays, for example, graphical data such as open transactions, open requests, and open actions.

Figure 18:
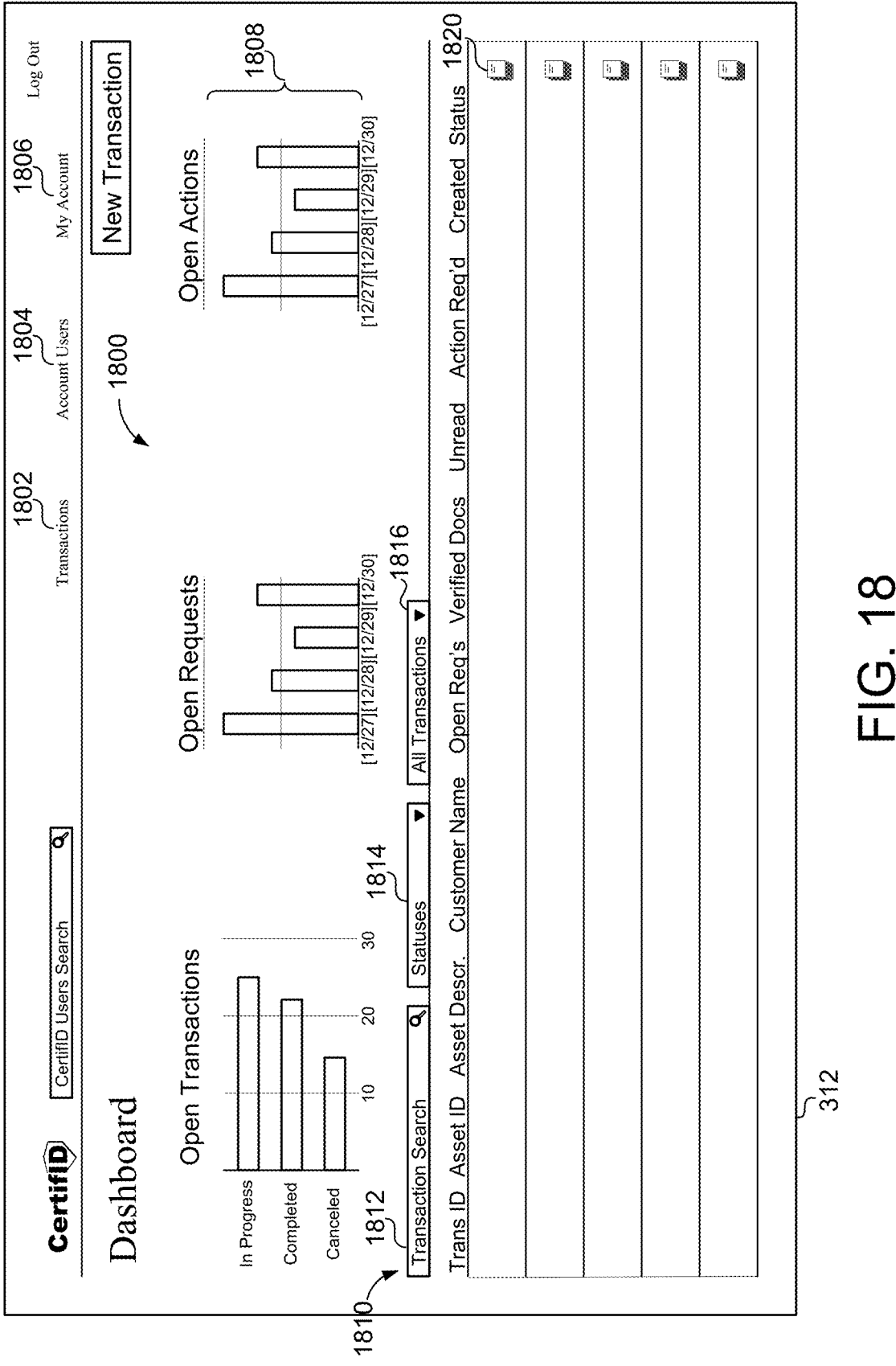
FIG. 18 is a schematic view of an example transaction dashboards GUI produced by one or more secure transaction servers or by a secure transaction application within a secure transaction environment.

The Dashboard GUI or web page 1800 may further include a transaction search bar 1810 configured to search transactions. The search bar 1810 may include a general a search field 1812, a transaction status pulldown menu 1814 for selectively displaying transactions by status (e.g., all transactions, transactions in progress, completed transactions, or declined transactions), and a transaction type pulldown menu 1816 for selectively displaying transactions by type (e.g., all transactions, transactions in which the registered and logged in user is involved, or transactions which the registered and logged in user is currently supporting). Below the transaction search bar 1810 is a listing field showing details of transactions corresponding to a search performed by a user. Some examples of the listing field as shown in FIG. 18, include ST server ID, transaction ID, asset ID, asset description, customer name, number of open requests, number of verified requests, number of unread messages, number of actions required, date created, and transaction status.

Depending on user access or other design factors not all transactions will be viewable in the Dashboard by all registered users. Rather, users will typically have Dashboard access to transactions in which they are involved. At the client level, for example, client users will typically be participants in a relatively small number of transactions at any one time, and only such transactions may be accessible to client users via the Dashboard. At the verifier level, some verifiers will typically be participants in many different transactions at any given time and all such transactions will be accessible to such verifiers via the Dashboard. Other verifiers, such as supervisors, management, etc., may not be direct participants in various transactions, but may have responsibility for supporting or overseeing transactions of multiple verifier employees. Therefore all such transactions being supported by such verifiers may be accessible to such verifiers via the Dashboard.

Each transaction listed in the transaction listing field may further include a pulldown transaction information GUI 1820 where specific information about that transaction can be viewed. Some example transaction information includes transaction details, internal notes, push notifications and removed transactions. FIGS. 19A-19F discussed below depict example GUIs or web pages for each such category of transaction information in the pulldown transaction information GUI 1820.

Figure 19A:
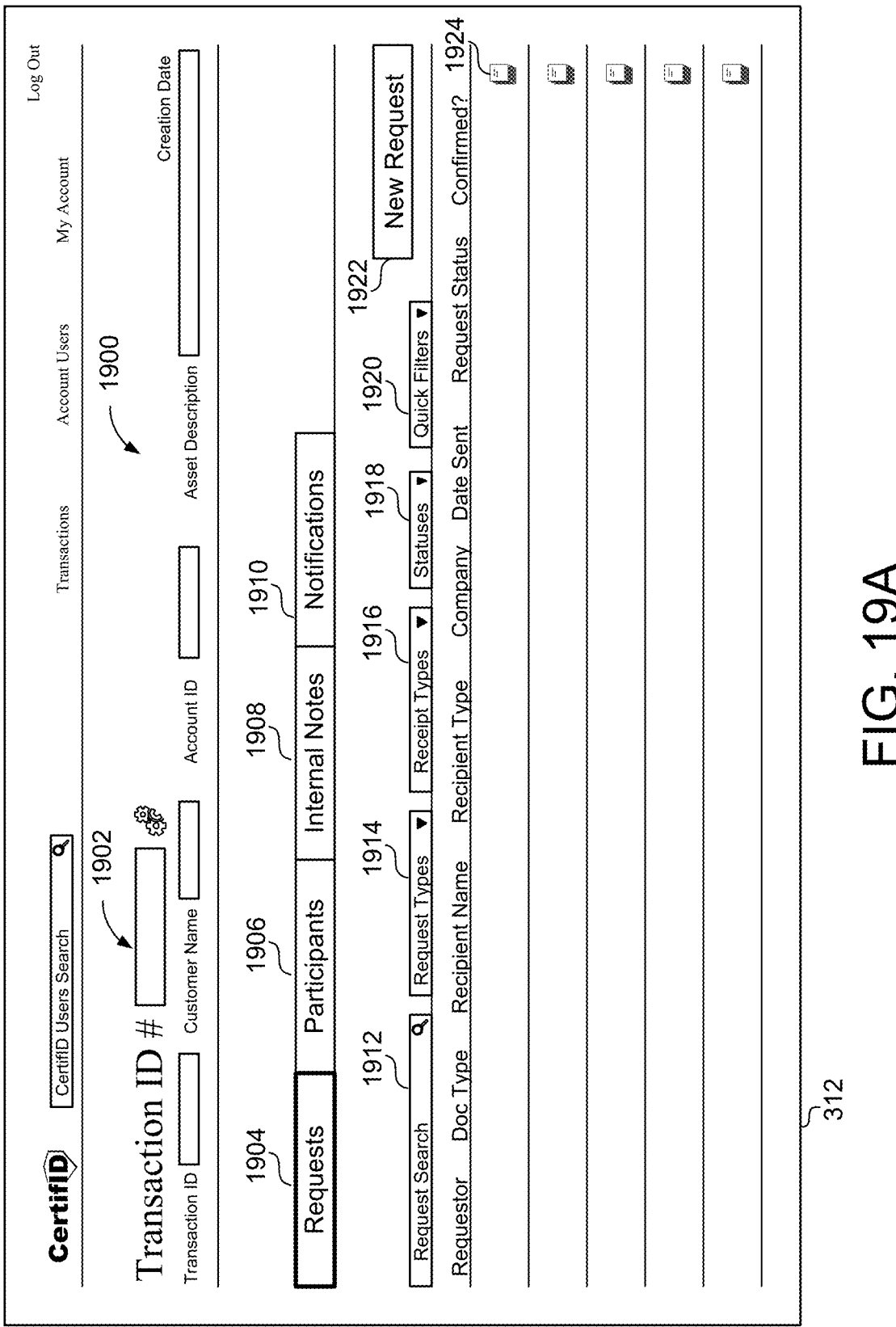
FIG. 19A is a schematic view of an example request history associated with a selected transaction.

Referring now to FIG. 19A, an example GUI or web page 1900 is shown illustrating a transaction information summary for a particular transaction in the Dashboard GUI or web page 1800. The transaction information summary GUI or web page 1900 may include a transaction identification area 1902 and a number of user-selectable tabs 1904, 1906, 1908 and 1910 each containing details for a different aspect of the identified transaction. In the GUI or web page 1900 illustrated in FIG. 19A, the "Requests" tab 1904 is selected. The "Requests" tab 1904 may include a search field 1912 for conducting request searches, a request type pulldown menu 1914 for selectively displaying requests by type (e.g., identity verification, document verification, or other information), a recipient type pulldown menu 1916 for selectively displaying requests by recipient type (e.g., borrower, buyer, seller, lender, agent, attorney, Title Company, representative, or other), a request status pulldown menu 1918 for selectively displaying request status (e.g., all, not viewed, viewed, approved, or declined), a quick filter pulldown menu 1920 for selectively displaying certain request categories (e.g., unverified requests, or requests waiting on action), and/or a "New Request" GUI element 1922 for entering new requests. Below the GUI elements 1912-1922 is a listing field showing details of requests that meet the filtering requirements 1912-1920. In FIG. 19A, for example, the transaction listing field includes Requestor, Request type, Recipient Name, Recipient Type, Recipient Company, date Sent, Request Status, and Confirmation Status.

Figure 19B:
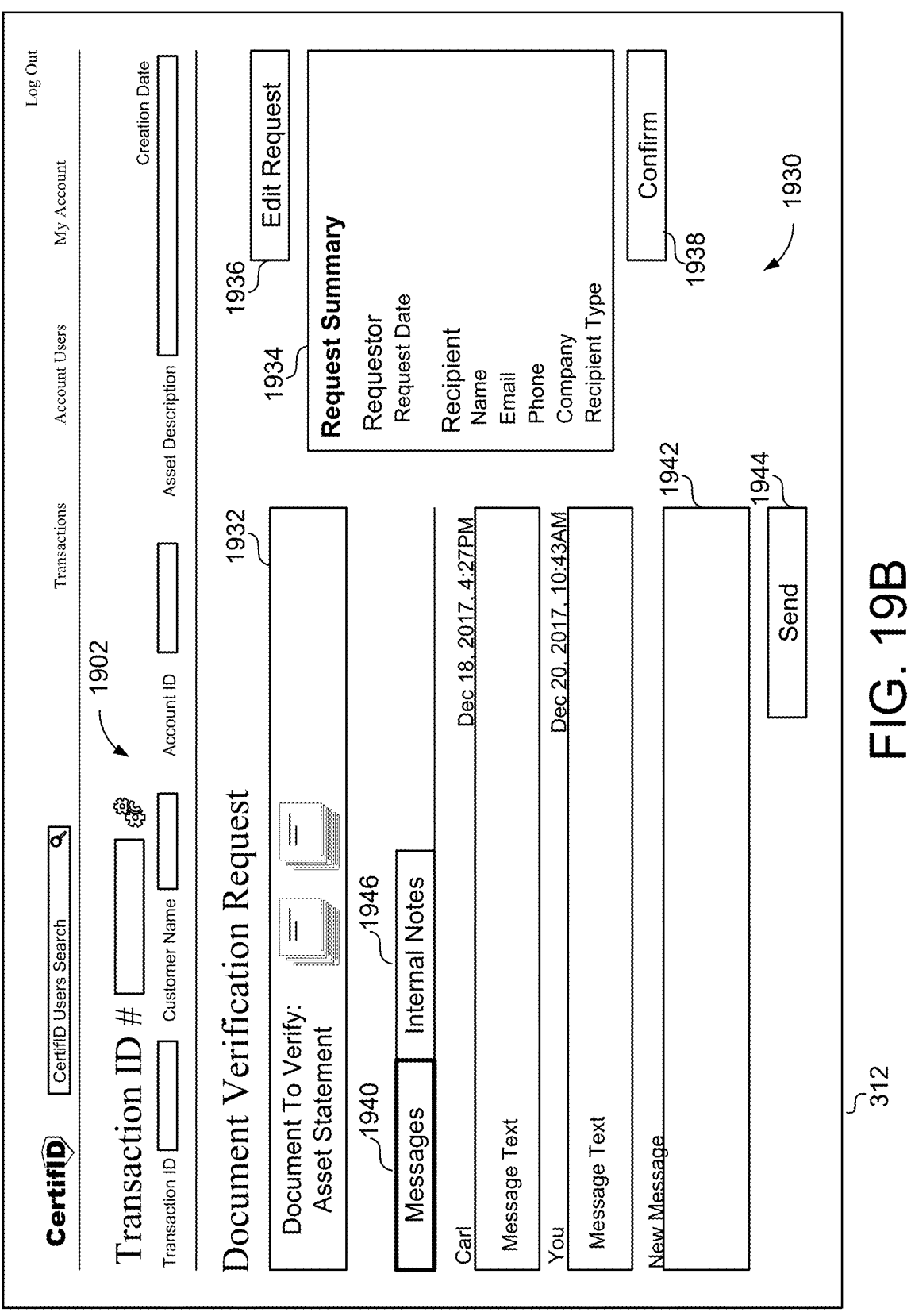
FIG. 19B is a schematic view of an example detailed history of a selected request.

As shown by FIG. 19A, each request listed in the Request listing field may further include a pulldown Request information GUI 1924 with specific details to view about a respective Request. FIG. 19B illustrates some example Request details for a Document Verification Request in the Request listing field of FIG. 19A within the Document Verification Request detail GUI or web page 1930. Referring to FIG. 19B, the GUI or web page 1930 may include a transaction ID field 1902, a document field 1932 including one or more documents loaded by a requestor for verification, a request summary field 1934 including request details, a selectable "Edit Request" GUI element 1936 for editing the displayed request, a selectable "Confirm" GUI element 1938 for confirming the request as approved, message tab 1940 detailing a history of messages between the user and other participants, a new message field 1942 for composing and sending a new request (e.g., with a selectable "send" GUI element 1944), and/or an Internal Notes tab 1946 detailing a history communication and/or configured to communicate relating to the request.

Figure 19C:
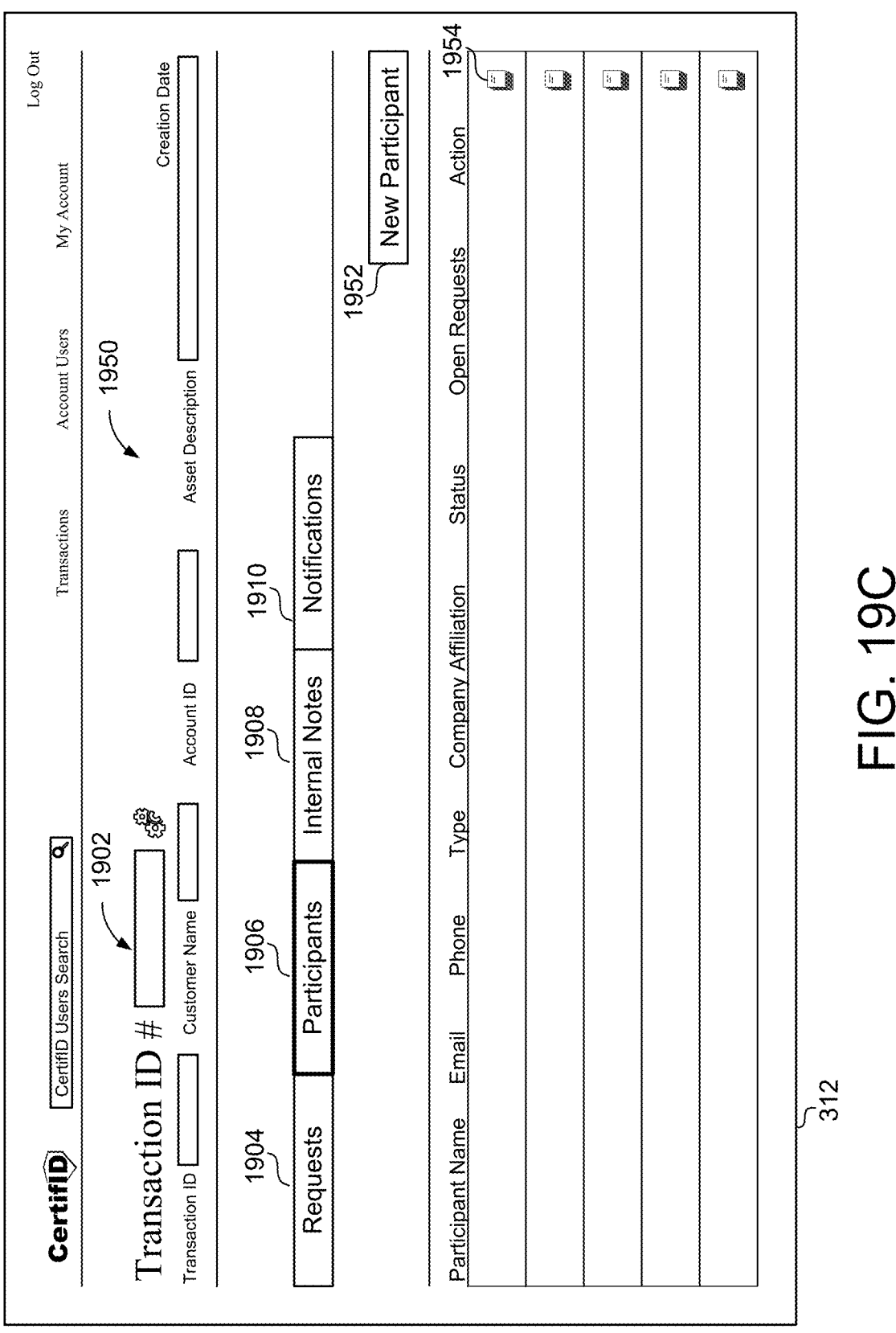
FIG. 19C is a schematic view of an example list of participants associated with a selected transaction.
Figure 19D:
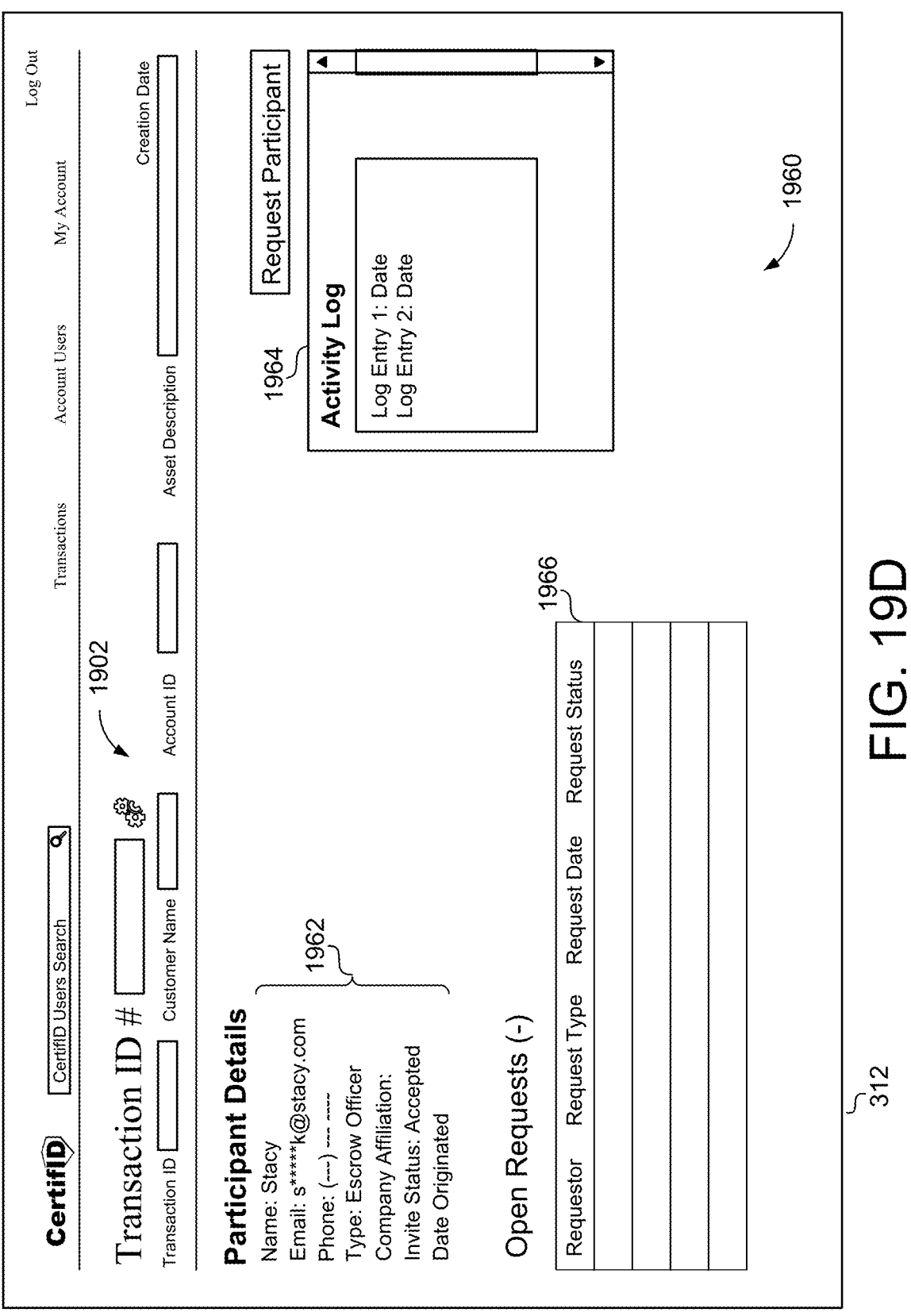
FIG. 19D is a schematic view of example detailed information relating to a selected participant.

In the example GUI or web page 1950 illustrated by FIG. 19C, the "Participants" tab 1906 of the transaction information summary GUI or web page 1900 is selected. The Participants tab 1906 may include a selectable "New Participant" GUI element 1952 for selecting one or more new participants and a participant listing field showing details of participants involved in the particular transaction identified by the transaction ID in the transaction identification field 1902. In some examples as depicted by FIG. 19C, the participant listing field may include, Participant Name, Email, Phone Number, Participant Type, Company Affiliation, Invite Status, Number of Open Requests or Actions Required. Each participant listed in the Participant listing field may further include a pulldown Participant information GUI 1954 where specific details about that Participant can be viewed. FIG. 19D is an example of Participant details for a specific participant in the Participant listing field of FIG. 19C. Referring to FIG. 19D, the Participant detail GUI or web page 1960 includes a transaction ID field 1902, a participant identification/information field 1962, an activity log field 1964 showing historical activity of the participant, and/or an open request listing field listing the identified participant's currently open requests.

Figure 19E:
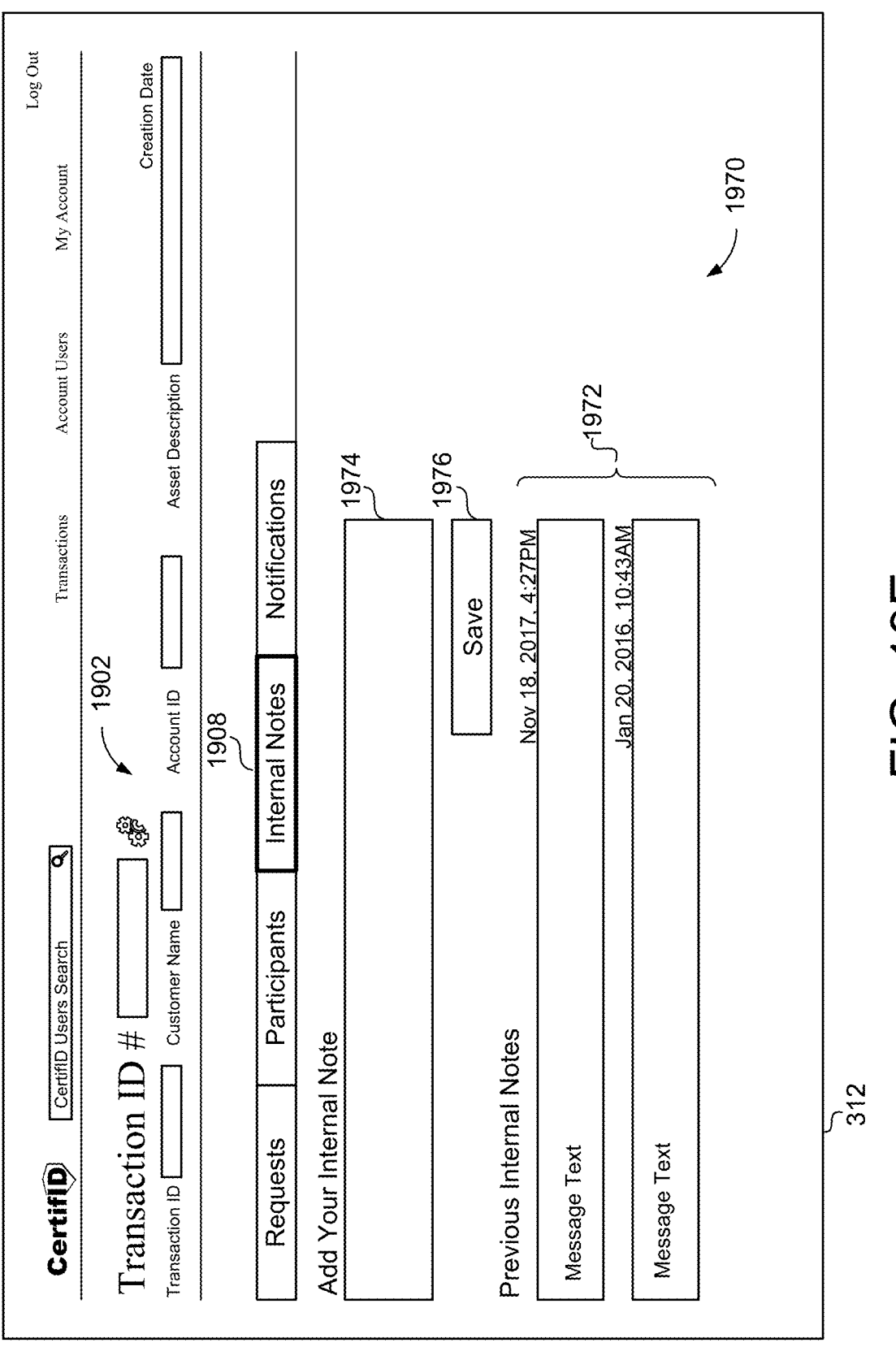
FIG. 19E is a schematic view of an example internal note history associated with a selected transaction.

FIG. 19E is an example GUI or web page 1970, the "Internal Notes" tab 1908 of the transaction information summary GUI or web page 1900. The Internal Notes tab 1908 may include a new internal note GUI field 1974 for entering new internal notes and a selectable "Save" GUI element 1976 for saving notes, and a Previous Internal Notes field 1972 including a historical listing of internal notes relating to the transaction specified in the transaction ID field 1902.

Figure 19F:
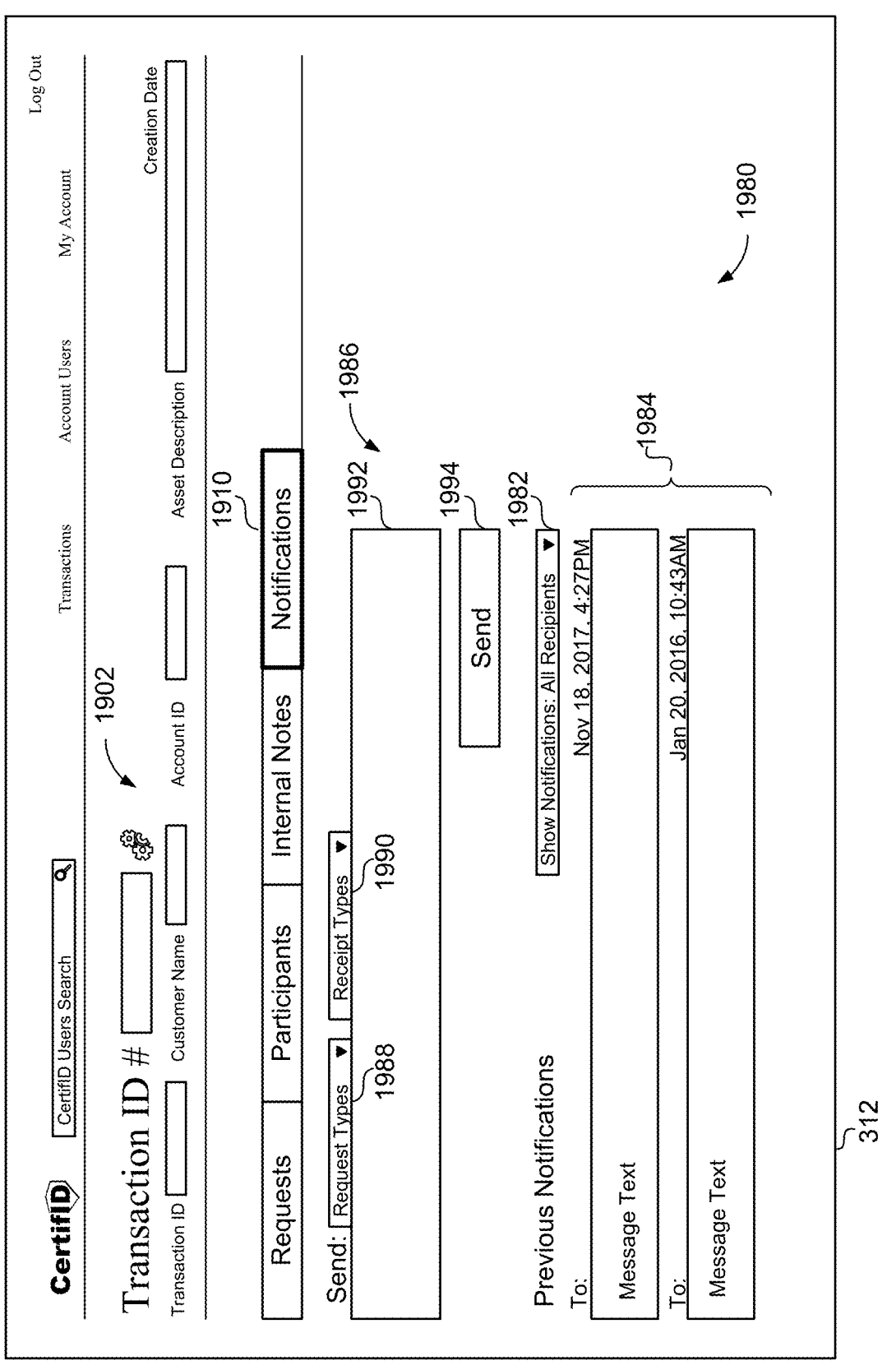
FIG. 19F is a schematic view of an example push notification history associated with a selected transaction.

FIG. 19F is an example of a GUI or web page 1980 of the "Push Notifications" tab 1910 of the transaction information summary GUI or web page 1900. The Push Notifications tab 1910 may include a Previous Notifications field 1984 including a historical listing of push notifications relating to the transaction specified in the transaction ID field 1902 and/or a pulldown tab 1982 for filtering the historical listing of push notifications (e.g., according to all participants or any particular participant of the identified transaction). The Push Notifications Tab 1910 may further include a new push notification GUI field 1986 including a pulldown menu 1988 for selecting a notification type (e.g., a request approval reminder or a custom notification), a recipient pulldown menu 1990 for selecting a recipient (e.g., from among the participants of the transaction identified in the transaction ID field 1902), a text field 1986 for entering notification text, and/or a selectable "Send" GUI element 1994 for sending the push notification.

Figure 20:
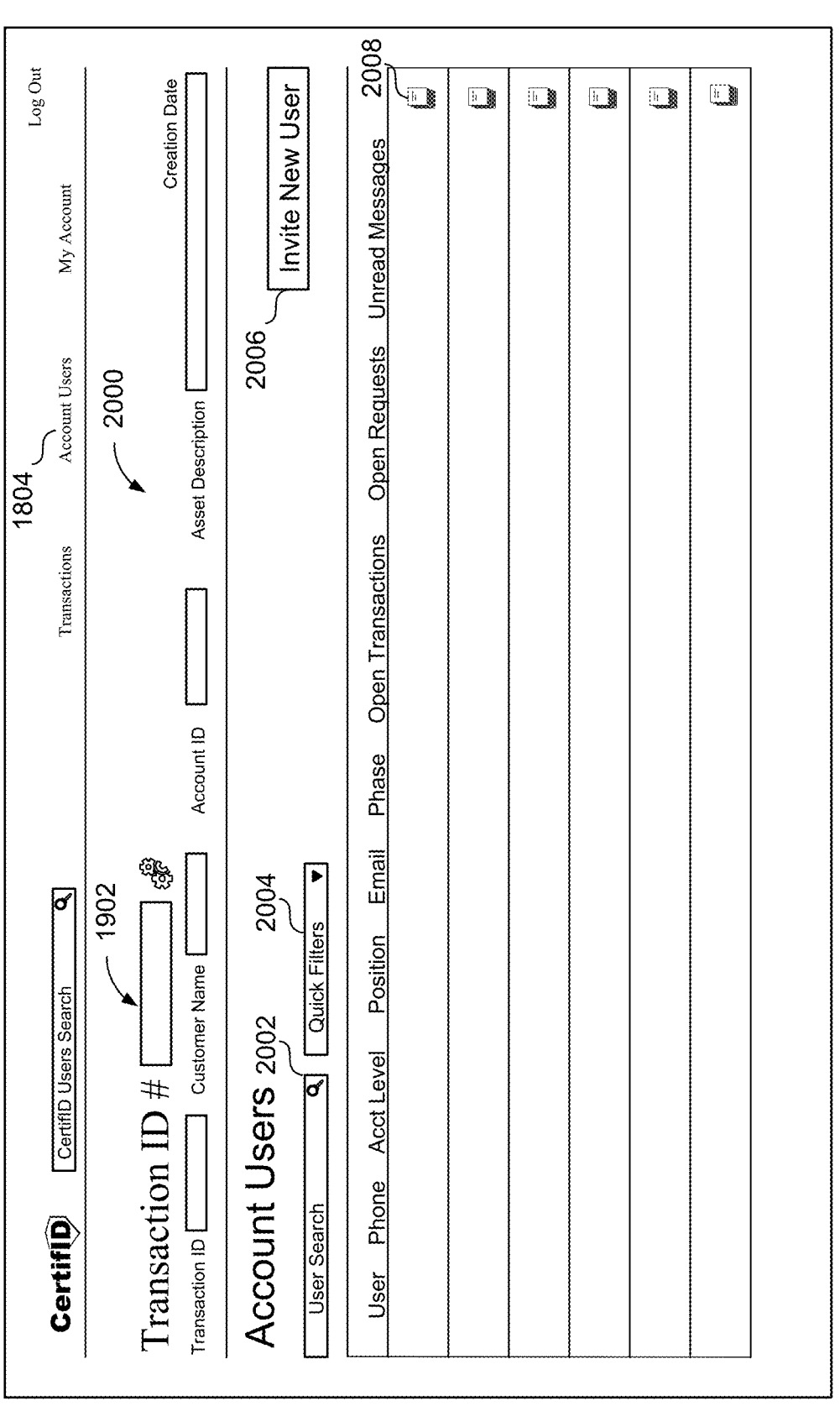
FIG. 20 is a schematic view of an example registered user dashboard GUI produced by one or more secure transaction servers or by a secure transaction application within a secure transaction environment.

Referring now to FIG. 20, an Account Users GUI or web page 2000 is shown illustrating an example account user listing displayed upon selection of the "Account Users" GUI element 1804 of the Dashboard GUI or web page 1800. In this example, the Account User's GUI or web page 2000 includes a search field 2002 for searching for account users, a quick filters pulldown menu 2004 for identifying account users having specific attributes, such as those with unread messages, required actions, open requests, or open transactions. The Account User's GUI or web page 2000 may further include a listing of account users that satisfy the criteria of the search field 2002 and/or quick filters menu selection 2004. For example, each listed account user includes a user ID, a user Name, a user Access Level, a user position or title, a user email address, a user phone number, a total number of open transactions associated with the user, a total number of open requests associated with the user, a total number of unread messages associated with the user, a total number of action items associated with the user, and/or an average transaction age associated with the user. Each listed user may further include a selectable user edit pulldown menu 2008 to edit or remove the user information.

The example transaction-related processes illustrated in FIGS. 16-21 and described above are in the context of example real estate transactions. It will be understood, however, that this disclosure is not limited to such transactions or transaction-related processes, and that the processes illustrated in FIGS. 16-21 are provided only by way of example and should not be considered limiting in any way. Rather the concepts illustrated and described in this disclosure may be used in myriad other transaction scenarios, both financially and non-financially related, such that in other transaction scenarios more, fewer, and/or different transaction-related processes may be made available in the secure transaction environment and the number and types of transaction-related processes that may be made available in any particular transaction will typically be dictated by the nature of the transaction.

Storage of Information

Figure 21:
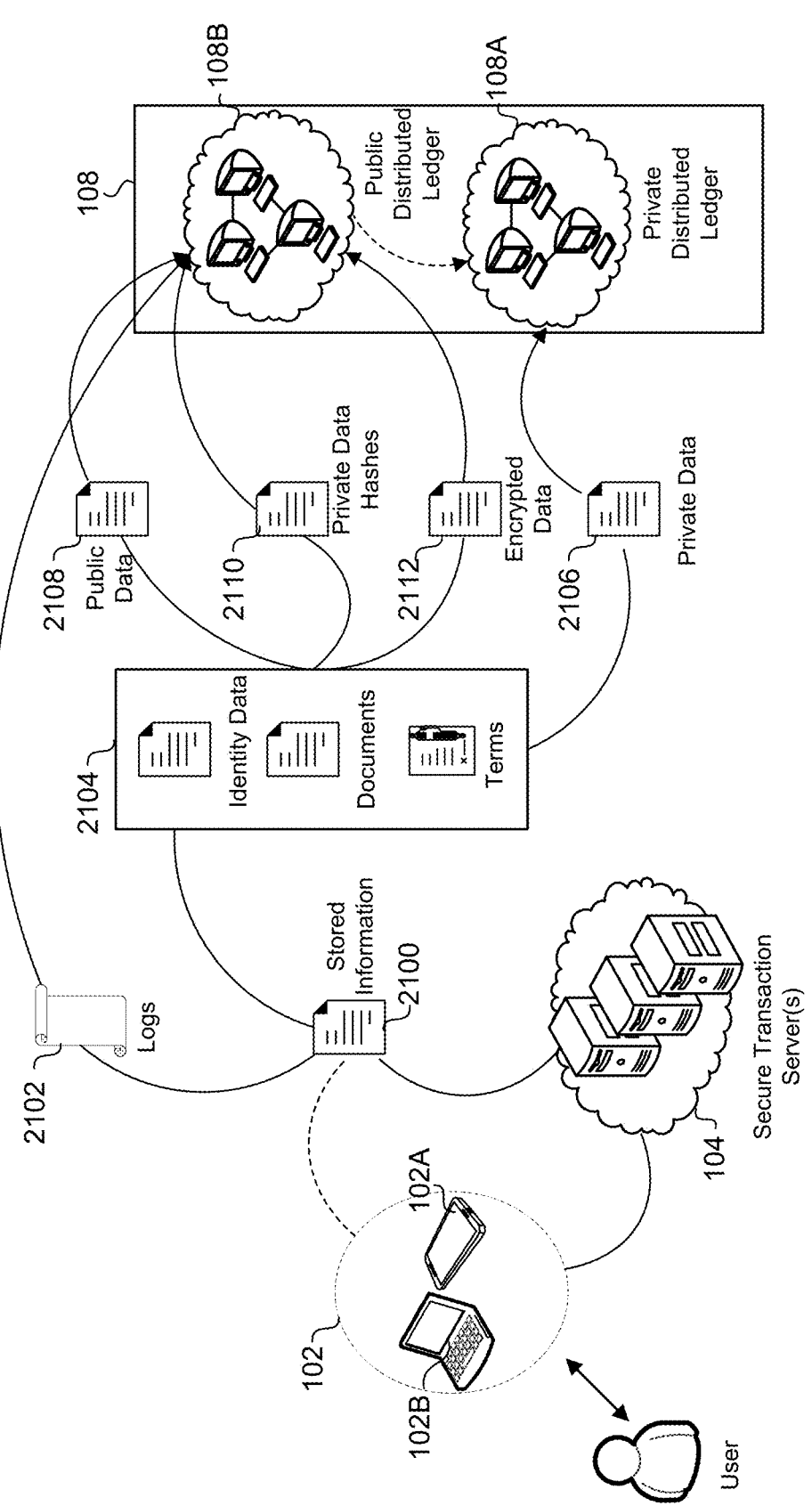
FIG. 21 is a schematic view of an example flow of storage of information by illustrated system components to private and/or public portions of the distributed ledger.

As described briefly above, information stored by the various components of the system 100 may additionally be stored to the distributed ledger 108 to provide for highly secure and immutable storage and record keeping. FIG. 21 is an example depicting that at least some information 2100 stored by the ST server 104 to the user account data 502 and/or to the transaction data 504 may additionally be stored by the ST server 104 to the distributed ledger 108. In these examples, the processor 400 of the ST server 104 is operable to store such information 2100 in the distributed ledger 108 in accordance with instructions stored in the distributed ledger interface module 508. Additionally or alternatively, the information 2100 may include at least some information stored by the user mobile communication device(s) 102A and/or the user computer(s) 102B. In these examples, the user mobile communication device(s) 102A and/or the user computer(s) 102B is configured to store such information to the distributed ledger 108 as illustrated by dashed-line in FIG. 21.

The information 2100 stored to the distributed ledger 108 may include log information 2102 and other information

2014. The other information 2104 may include identity data, documents, transaction terms and the like. The distributed ledger 108 may be partitioned, for purposes of storing information therein, into a private distributed ledger 108A and/or a public distributed ledger 108B. In some examples, the log data 2102 is stored in the public distributed ledger 108B. Yet in other examples, log data 2102 is additionally or alternatively stored in the private distributed ledger 108A (e.g., as illustrated by dashed-line representation in FIG. 21). Referring further to FIG. 21, the other information 2104 may include private data 2106, public data 2108, private data hashes 2110, and/or encrypted data 2112. In some implementations, the private data 2106 is stored in the private distributed ledger 108A, and the public data 2108, private data hashes 2110 and encrypted data 2112 are stored in the public distributed ledger 108B. Additionally or alternatively, any one or combination of the public data 2108, private data hashes 2110 and encrypted data 2112 may be stored in the private distributed ledger 108A as shown by dashed line representation in FIG. 21.

Unregistered Users

Figure 22:
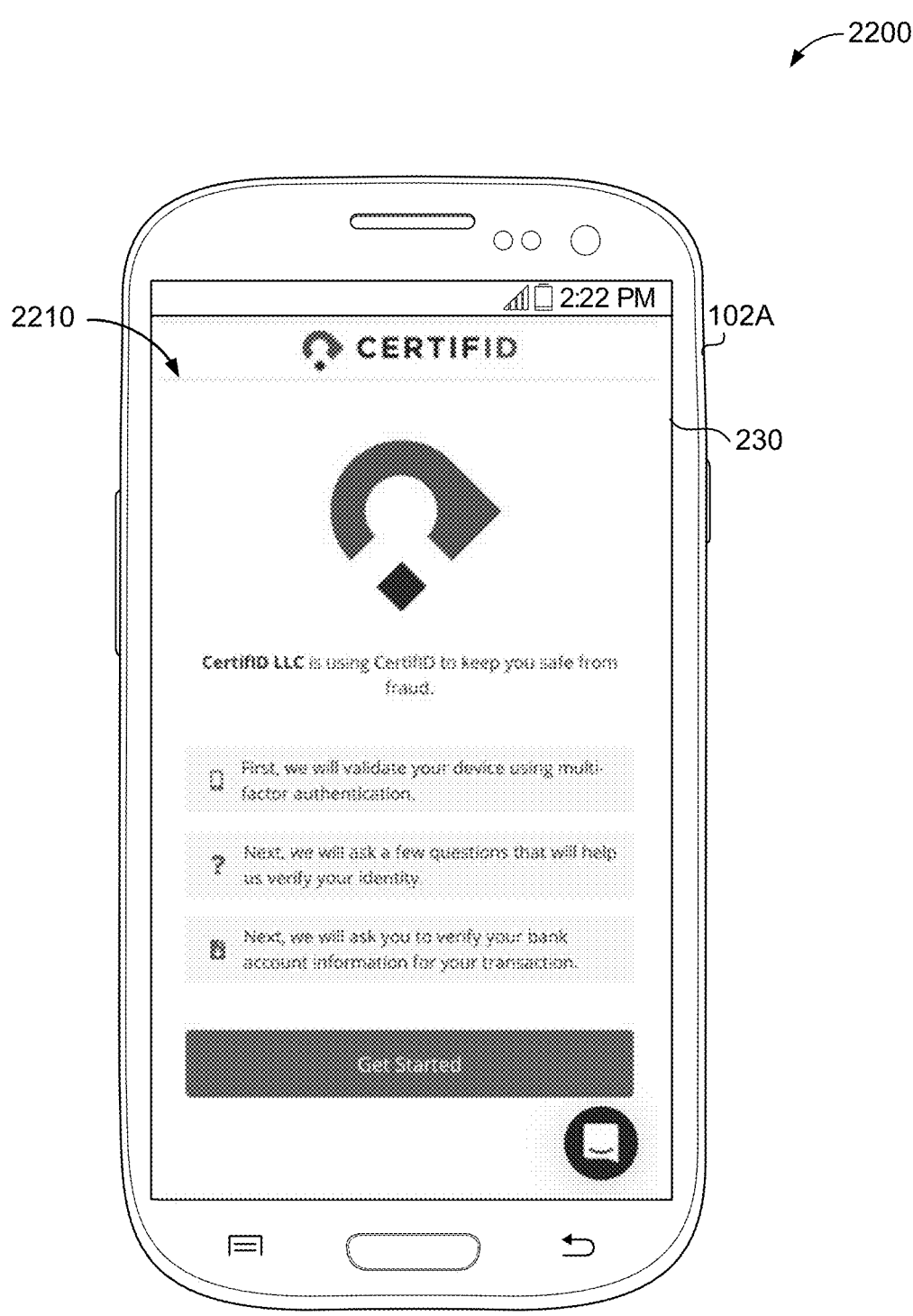
FIG. 22 is a schematic view of an example introduction image for an unregistered user.

Referring now to FIG. 22, in some implementations, unregistered users may require limited access to the secure environment system 100. For example, an unregistered user intends to participate in only a single transaction (e.g., with another registered user) via the secure environment system and thus does not require or desire to undergo the registration process. In these implementations, the unregistered user completes some or all of the authentication process without undergoing user registration. In some examples, the amount or intensity of authentication is variable or conditional based on the type of transaction and the role of the unregistered user in the transaction.

In some examples, a verified user (e.g., a verifier or client) initiates a new transaction (e.g., FIGS. 15A-15C) with an unregistered user. The verified user may direct the transaction to the unregistered user via any appropriate contact information (e.g., using an email, a phone number, by sharing a link, or any other means to direct the unregistered user to the system). At schematic view 2200, after the unregistered user selects the link sent by the verified user (or otherwise selects the transaction offered by the verified user), the user device 102A displays (e.g., on the display screen 230) an introduction image 2210. Here, the introduction image 2200 includes notifications that summarize the process for the initiated transaction. Specifically, the introduction image 2200 explains that the user device 102A will be validated, then knowledge-based authentication will be employed to validate the user, and then bank information will be verified.

Figure 23A:
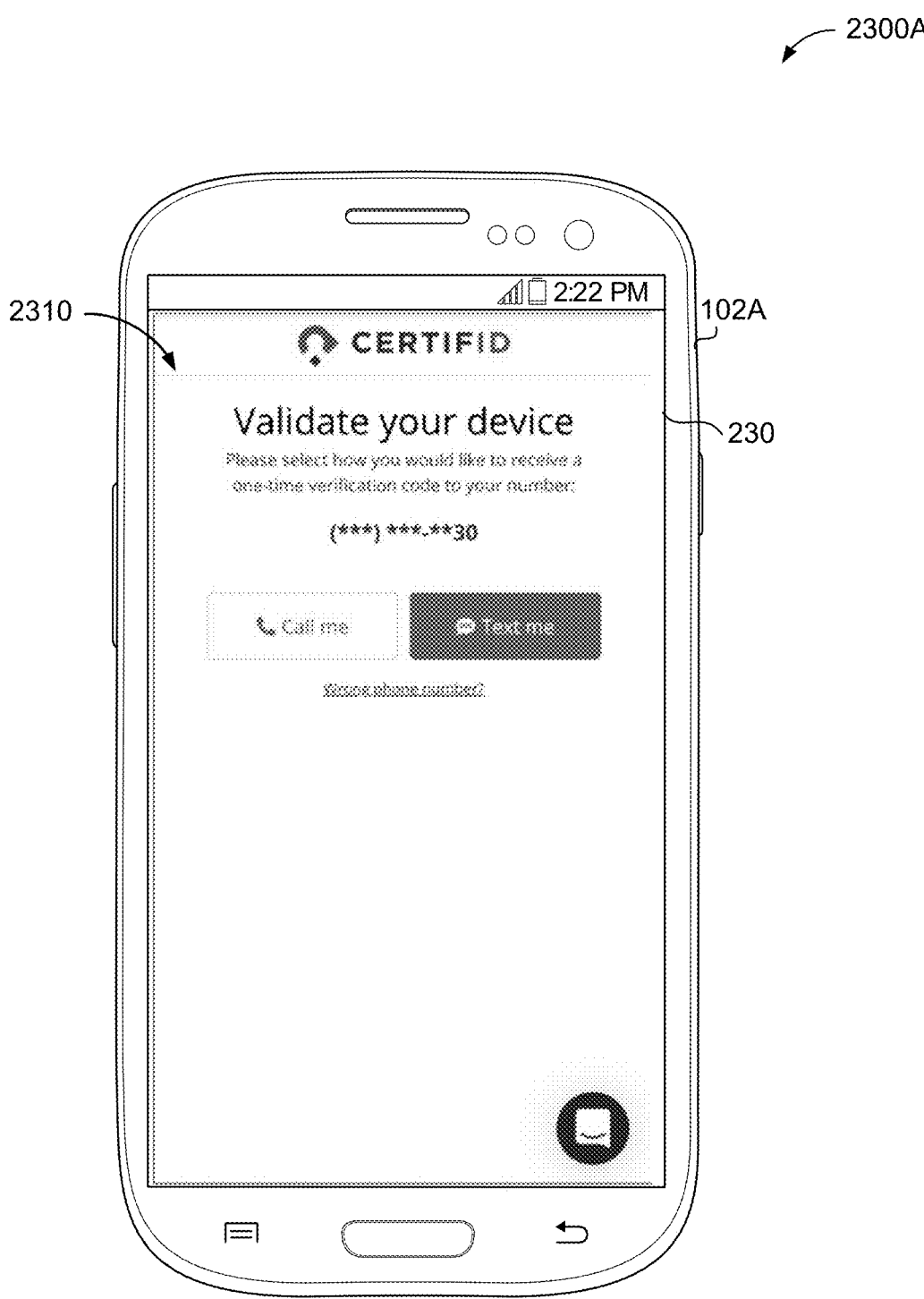
FIGS. 23A and 23B are schematic views of validating a device of an unregistered user.

Referring now to FIG. 23A, a schematic view 2300 includes the user device 102A displaying, on the display screen 230, a first device validation selection image 2310. In some examples, the unregistered user initially validates the user device 102A by selecting whether to receive a call or a text message via the contact information (e.g., a phone number) provided by the verified user when initiating the transaction. For example, when the verified user initiates the transaction with the unregistered user, the verified user provides a phone number (or other identifying information) of the unregistered user. The system verifies that the unregistered user accessing the validation screen 2310 has access to the phone number, in this case, via a phone call or a text message (e.g., an SMS or MMS message).

Figure 23B:
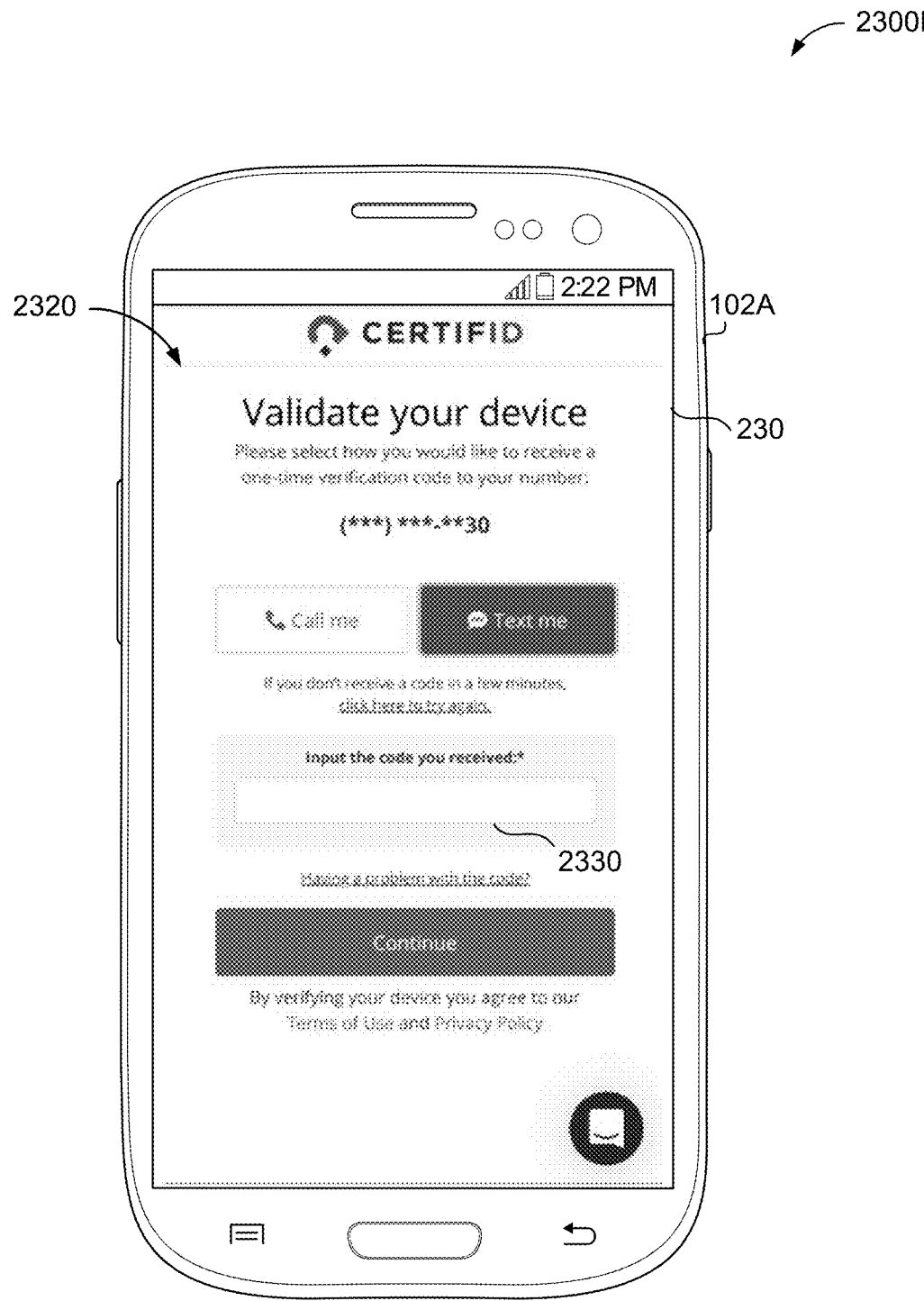

As shown in FIG. 23B, a schematic view 2300B includes a second device validation image 2320. In some implementations, after the unregistered user selects a validation method (e.g., a text or a phone call) the unregistered user receives an input code directed to the phone number (or email, etc.) provided by the verified user via the means selected by the unregistered user. For example, the user device 102A receives a text message that includes an alphanumeric one-time code. The user device 102A displays the second device validation selection image 2320 and the unregistered user may enter the received code via text input box 2330, thus verifying that the unregistered user has possession of the user device 102A associated with the phone number or other contact information provided by the verified user.

In some examples, the system may also receive other user device verification information. For example, the system may receive mobile communication device information such as previously described in FIGS. 6B-1 and 6B-2 (e.g., carrier information, etc.) from the user device 102A and may compare the received mobile communication device information to one or more databases (e.g., private databases, carrier databases, etc.) to additionally or alternatively validate the unregistered user's device.

Figure 24A:
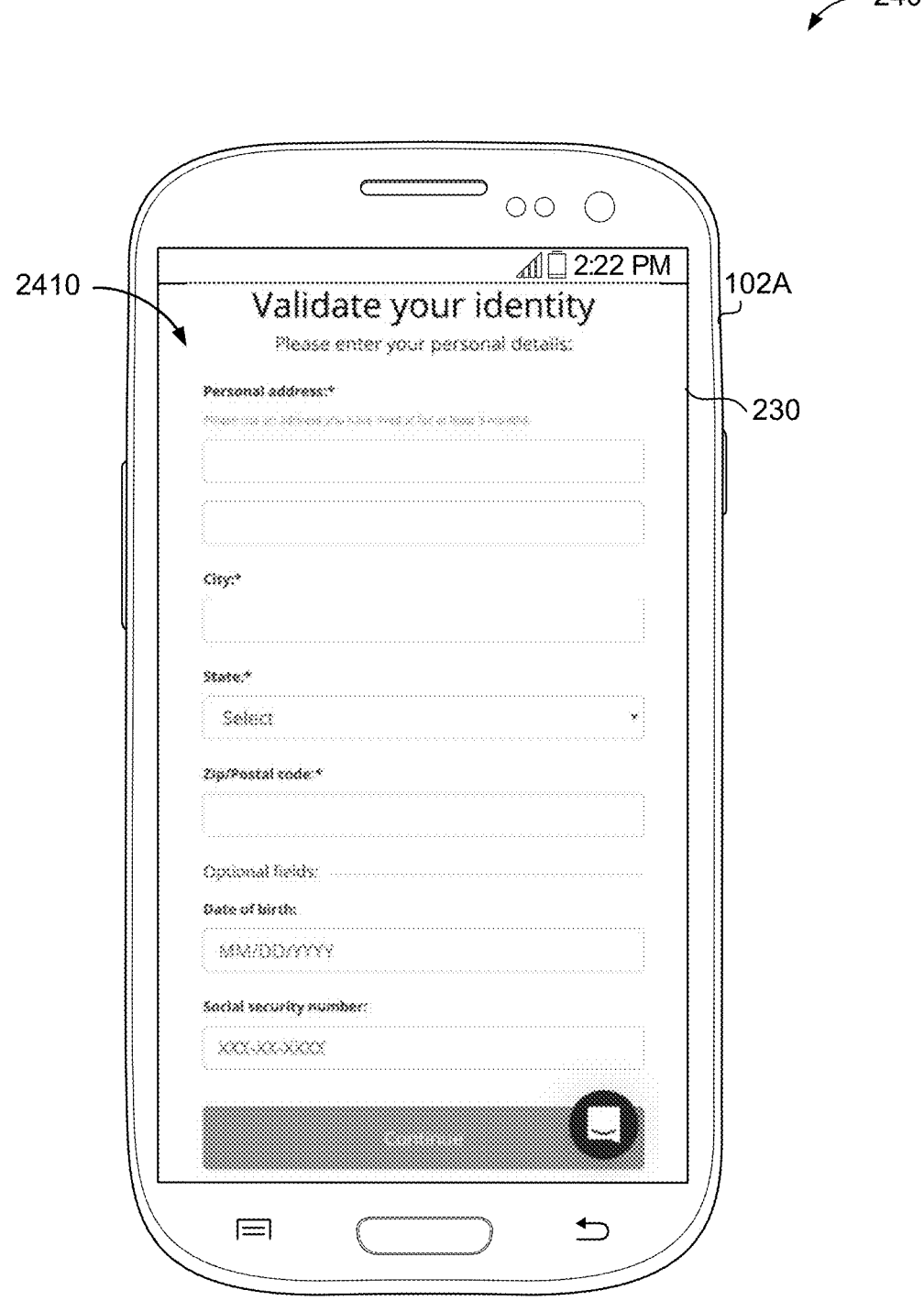
FIGS. 24A and 24B are schematic views of validating an identity of an unregistered user.

Referring now to FIG. 24A, schematic view 2400A includes the device 102A displaying, via the display screen 230, the next step of validation for the unregistered user. Here, a first user validation image 2410 includes a number of text box entries to allow the unregistered user to enter common and easily verifiable identifying information such as the unregistered user's home address, date of birth, and/or social security number. The first user validation image 2410 is exemplary only, and the system may request more or less personal information, such as the example shown in FIGS. 7D-1 and 7D-2. Once the system receives the personal information from the unregistered user, the system may perform some or all of the user information verification process described with regards to FIGS. 6B-1 and 6B-2. For example, the system accesses one or more private consumer database services and/or compares the personal information to one or more fraud databases.

Figure 24B:
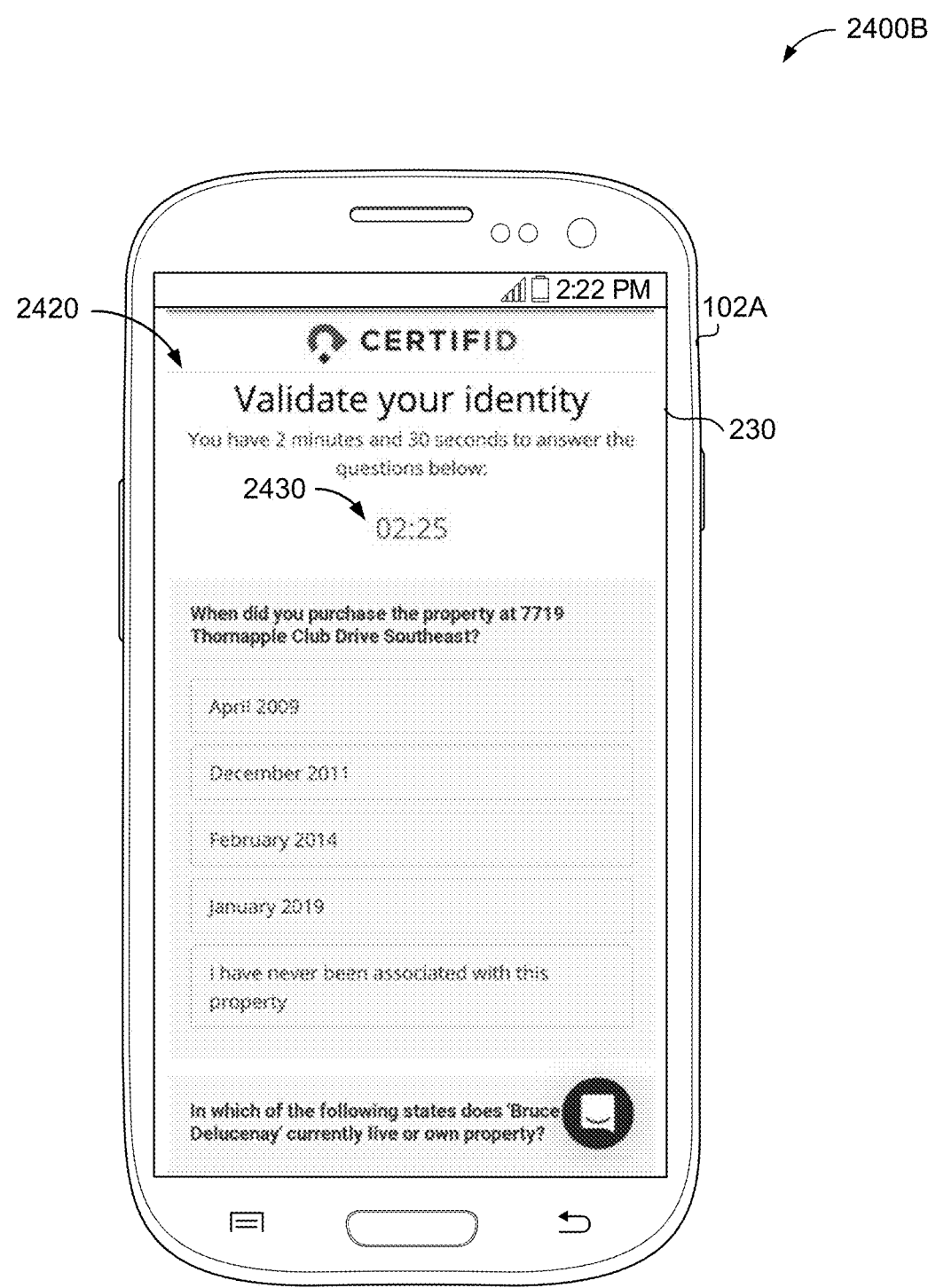

Referring now to FIG. 24B, in some examples, the system continues the validation of the unregistered user by displaying a second user validation image 2420. The second user validation image 2420 may include additional knowledge-based authentication techniques by providing one or more user questions (e.g., as described with regards to FIGS. 6B-1, 6B-2, and 7F). In this example, the user device 102A displays a question regarding when a property associated with the unregistered user was purchased. The second user validation image 2420 may include a countdown 2430 indicating an amount of time remaining for the unregistered user to complete the user questions. This countdown limits the possibilities of a malicious user circumventing the user questions by attempting to acquire the information from external sources. The system may validate the unregistered user's identity based on the user's responses to the personal information and the user questions. Thus, in two separate steps, the system validates the unregistered user's user device 102A (FIGS. 23A and 23B) and the unregistered user's identity (FIGS. 24A and 24B).

Figure 25:
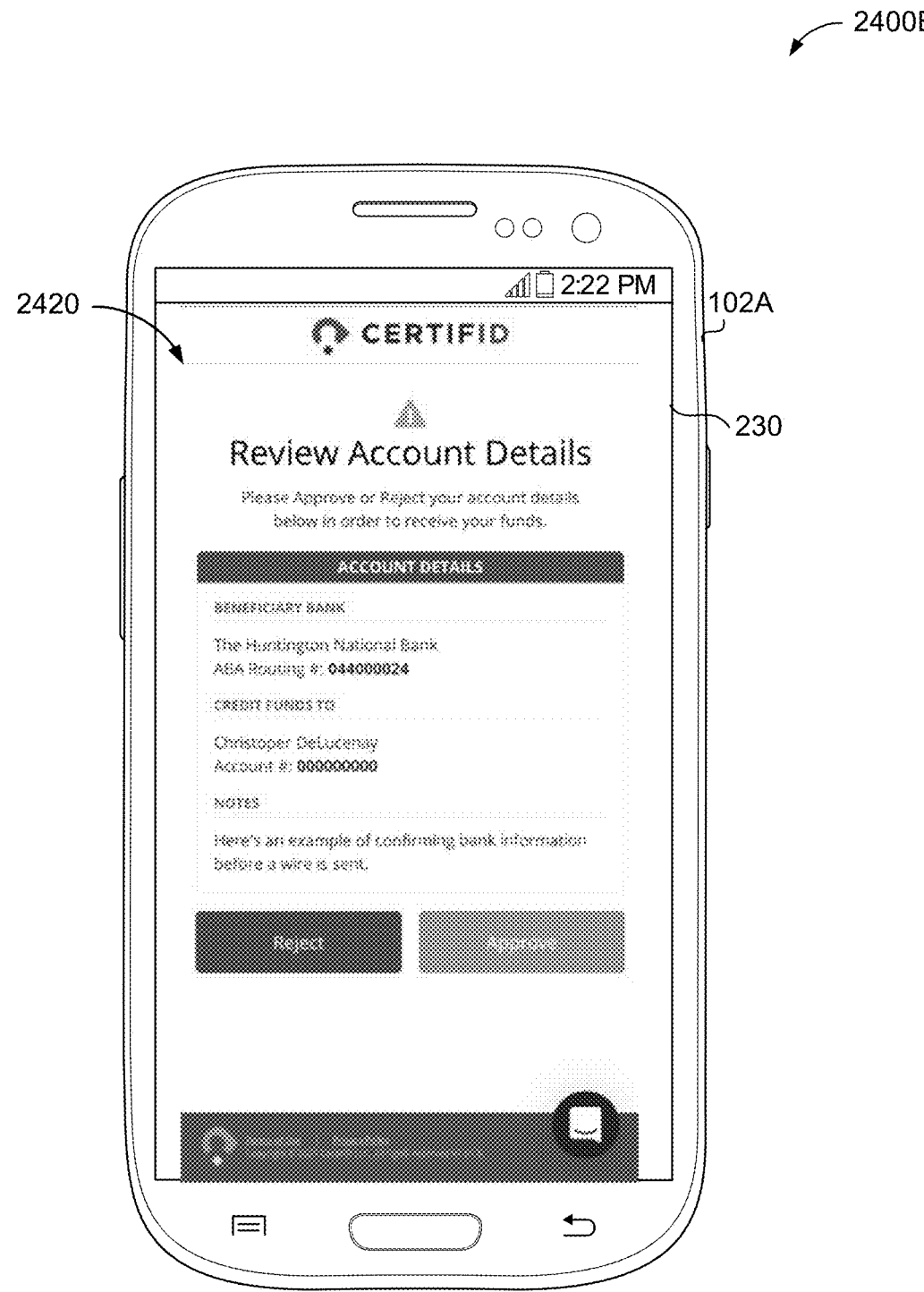
FIG. 25 is a schematic view of a transaction review for an unregistered user.

Referring now to FIG. 25, once the user device 102A and the identity of the unregistered user are validated (i.e., the system has confirmed that the user and the user device 102A match the user and the user device associated with the transaction), the user device 102A displays a review image 2420 that includes a summary of the transaction and allows the registered a final review prior to either approving or rejecting the transaction. Thus, the system provides an unregistered user an option to perform a one-time validation (of both the user's device and the user's identity) in order to receive transaction requests without undergoing the user registration process. Here, the review image 2420 displays bank account information for the unregistered user (i.e., the routing number and account number). The review image 2420 may include a notes section that allows the initiator of the transaction to provide additional information or context for the transaction.

In some examples, the system tailors or adjusts the validation of the user device 102A and/or the unregistered user based on a transaction role of the unregistered user in the transaction. That is, based on the role of the user in the transaction (e.g., sending money, receiving money, verifying information, etc.), the system may increase or decrease the amount of validation necessary. For example, when a transaction is initiated to send money to an unregistered user, the system may incorporate additional validation requirements. In some implementations, the system requests more or less additional personal information, generates more or less user questions, reduces or increases countdowns, verifies information via additional databases, etc. to increase or decrease the difficulty of validation. In some examples, the system skips portions of the validation entirely based on the transaction role of the unregistered user.

That is, the system may implement conditional knowledge-based authentication. For example, when an unregistered user is to receive funds via a transaction, the system performs additional validation steps (e.g., requires the user to correctly answer additional user questions), as it may be of critical importance that the correct person receives funds. On the other hand, when an unregistered user is to transmit funds via a transaction, the system may perform less validation steps (e.g., not require the user to answer user questions or reduce the number of user questions), as it is less likely and/or damaging for the wrong person to transmit funds. In some examples, an unregistered user that is receiving funds must complete device validation, provide user information, and complete knowledge-based authentication via the user questions while an unregistered user that is transmitting funds must complete device validation and provide user information without completing the knowledge-based authentication.

In some examples, the system automatically initiates transfers on behalf of the users (registered or unregistered). For example, the system, after validating each of the users of a funds transfer transaction (e.g., to transfer funds from a buyer of property to a seller of the property), the system may initiate a wire transfer, an Automated Clearing House (ACH) transfer, or a Real-Time Payment (RTP) transfer. For example, after validating the users, the system confirms the details of the transactions (e.g., FIG. 25) and, after all parties have approved the transaction, automatically initiates the transaction. In some examples, the system interfaces with banking portals or other entities on behalf of the users. For example, the system, via an application programming interface (API) or integration with other platforms (e.g., Dwolla), connects to a financial institution and initiates transactions (e.g., depositing or withdrawing funds) on behalf of the user(s).

The system may monitor a status of the transaction. In some examples, the system transmits a transaction notification to some or all of the parties of the transaction whenever the status of the transaction changes (e.g., when the transaction is initiated, completed, delinquent, failed, etc.). For example, the system monitors balances of accounts and automatically provides notification when funds have been withdrawn and/or deposited. The system may automatically start an inquiry when the status of a transaction has not updated within a threshold amount of time. In some implementations, when the system initiates a wire transfer, the system may start an inquiry with one or more of the parties and/or with one or more institutions (e.g., financial institutions) regarding the status of the transaction. For example, when funds are not deposited within an account within a threshold amount of time (e.g., 1 hour, 1 day, 1 week, etc.), the system automatically opens an inquiry with the responsible parties and/or escalates the transaction. The system may implement a wide variety of transactions, such as financial transactions, real estate transactions (title transfers, etc.), mortgage payoffs, etc.

In some implementations, the system insures the transactions between the parties (e.g., registered and unregistered uses). For example, the system may insure that funds are transferred successfully to the correct party. In some examples, the system may insure that the transaction completes within a threshold period of time. The system may insure one or more parties of the same transaction (e.g., both the party transferring funds and the party receiving funds).

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:

receiving a transaction initiation from a communication device of a registered user comprising contact information for an unregistered user, the transaction initiation requesting initiation of a transaction between the registered user and the unregistered user;

transmitting a one-time access code to a mobile communication device of the unregistered user using the contact information;

receiving, from the mobile communication device of the unregistered user, a one-time entry code;

determining that the one-time entry code from the mobile communication device satisfies the transmitted one-time access code;

in response to determining that the one-time entry code from the mobile communication device satisfies the transmitted one-time access code, transmitting a user information verification request to the mobile communication device of the unregistered user;

receiving user verification information from the mobile communication device of the unregistered user, the user verification information comprising user personal information;

verifying, using a third party database, the user verification information; and in response to verifying the user verification information, initiating the transaction between the registered user and the unregistered user.

2. The method of claim 1, wherein the operations further comprise:

receiving, from the mobile communication device of the unregistered user, mobile communication device information; and determining that the mobile communication device information satisfies predetermined user mobile communication device information.

3. The method of claim 2, wherein the mobile communication device information comprises at least one of:

a unique telephone number assigned to the mobile communication device;

an electronic serial number;

an international mobile equipment indicator unique to the mobile communication device;

a cellular provider of the mobile communication device;

an internet protocol address from the mobile communication device; or a service provider providing internet services to the mobile communication device.

4. The method of claim 1, wherein the user personal information comprises at least one of a name, an address, a date of birth, a biometric identifier, or a portion of a social security number.

5. The method of claim 1, wherein transmitting the user information verification request to the mobile communication device of the unregistered user comprises:

determining a transaction role for the unregistered user in the transaction between the registered user and the unregistered user; and generating the user information verification request based on the transaction role.

6. The method of claim 5, wherein the transaction role comprises one of sending funds or receiving funds.

7. The method of claim 5, wherein, when the transaction role for the unregistered user comprises receiving funds, the user information verification request comprises a plurality of private information questions corresponding to private information of the unregistered user.

8. The method of claim 7, wherein verifying the user verification information comprises correct answers to the plurality of private information questions.

9. The method of claim 5, wherein:

when the transaction role for the unregistered user comprises transmitting funds, the user information verification request comprises a personal information request; and when the transaction role for the unregistered user comprises receiving funds, the user information verification request comprises the personal information request and a plurality of private information questions corresponding to private information of the unregistered user.

10. The method of claim 1, wherein the operations further comprise, after initiating the transaction between the registered user and the unregistered user, transmitting a transaction notification to the registered user and to the unregistered user.

11. A system comprising:

data processing hardware; and memory hardware in communication with the data processing hardware, the memory hardware storing instructions that when executed on the data processing hardware cause the data processing hardware to perform operations comprising:

receiving a transaction initiation from a communication device of a registered user comprising contact information for an unregistered user, the transaction initiation requesting initiation of a transaction between the registered user and the unregistered user;

transmitting a one-time access code to a mobile communication device of the unregistered user using the contact information;

receiving, from the mobile communication device of the unregistered user, a one-time entry code;

determining that the one-time entry code from the mobile communication device satisfies the transmitted one-time access code;

in response to determining that the one-time entry code from the mobile communication device satisfies the transmitted one-time access code, transmitting a user information verification request to the mobile communication device of the unregistered user;

receiving user verification information from the mobile communication device of the unregistered user, the user verification information comprising user personal information;

verifying, using a third party database, the user verification information; and in response to verifying the user verification information, initiating the transaction between the registered user and the unregistered user.

12. The system of claim 11, wherein the operations further comprise:

receiving, from the mobile communication device of the unregistered user, mobile communication device information; and determining that the mobile communication device information satisfies predetermined user mobile communication device information.

13. The system of claim 12, wherein the mobile communication device information comprises at least one of:

a unique telephone number assigned to the mobile communication device;

an electronic serial number;

an international mobile equipment indicator unique to the mobile communication device;

a cellular provider of the mobile communication device;

an internet protocol address from the mobile communication device; or a service provider providing internet services to the mobile communication device.

14. The system of claim 11, wherein the user personal information comprises at least one of a name, an address, a date of birth, a biometric identifier, or a portion of a social security number.

15. The system of claim 11, wherein transmitting the user information verification request to the mobile communication device of the unregistered user comprises:

determining a transaction role for the unregistered user in the transaction between the registered user and the unregistered user; and generating the user information verification request based on the transaction role.

16. The system of claim 15, wherein the transaction role comprises one of sending funds or receiving funds.

17. The system of claim 15, wherein, when the transaction role for the unregistered user comprises receiving funds, the user information verification request comprises a plurality of private information questions corresponding to private information of the unregistered user.

18. The system of claim 17, wherein verifying the user verification information comprises correct answers to the plurality of private information questions.

19. The system of claim 15, wherein:

when the transaction role for the unregistered user comprises transmitting funds, the user information verification request comprises a personal information request; and when the transaction role for the unregistered user comprises receiving funds, the user information verification request comprises the personal information request and a plurality of private information questions corresponding to private information of the unregistered user.

20. The system of claim 11, wherein the operations further comprise, after initiating the transaction between the registered user and the unregistered user, transmitting a transaction notification to the registered user and to the unregistered user.

* * * * *